(12) United States Patent
Tomolillo et al.

(10) Patent No.: US 7,883,136 B2
(45) Date of Patent: Feb. 8, 2011

(54) TWO-WHEELED VEHICLE

(75) Inventors: Vittorio Tomolillo, Stillwater, MN (US); Andrew M. Otterson, Marshall, NC (US); Michael J. Hanten, Delano, MN (US); Michael M. Song, Maple Grove, MN (US)

(73) Assignee: Polaris Industries Inc., Medina, MN (US)

( * ) Notice: Subject to any disclaimer, the term of this patent is extended or adjusted under 35 U.S.C. 154(b) by 266 days.

(21) Appl. No.: 12/015,435

(22) Filed: Jan. 16, 2008

(65) Prior Publication Data
US 2008/0169134 A1 Jul. 17, 2008

Related U.S. Application Data

(60) Provisional application No. 60/880,909, filed on Jan. 17, 2007.

(51) Int. Cl.
B62J 17/04 (2006.01)
(52) U.S. Cl. .................. 296/78.1; 296/180.5
(58) Field of Classification Search .............. 296/180.5, 296/78.1, 91
See application file for complete search history.

(56) References Cited

U.S. PATENT DOCUMENTS

| | | | |
|---|---|---|---|
| 4,066,291 A | 1/1978 | Hickman | |
| 4,353,590 A | 10/1982 | Wei-Chuan | |
| 4,355,838 A | 10/1982 | Hickman | |
| 4,489,973 A | 12/1984 | Willey | |
| 4,615,556 A | 10/1986 | Stahel | |
| 4,696,509 A | 9/1987 | Yagasaki et al. | |
| 4,707,017 A | 11/1987 | Minobe et al. | |
| 4,799,569 A | 1/1989 | Hattori | |
| 4,830,423 A | 5/1989 | Nebu et al. | |
| 4,911,494 A | 3/1990 | Imai et al. | |
| 5,490,573 A | 2/1996 | Hagiwara et al. | |
| 5,730,483 A | 3/1998 | Greger | |
| 5,855,404 A | 1/1999 | Saunders | |
| 5,857,727 A | 1/1999 | Vetter | |
| 6,254,166 B1 | 7/2001 | Willey | |
| 6,293,606 B1 | 9/2001 | Jarosz et al. | |
| 6,505,877 B1 | 1/2003 | Devlin et al. | |

(Continued)

FOREIGN PATENT DOCUMENTS

DE 11 18 632 B 11/1961

(Continued)

OTHER PUBLICATIONS

International Search Report and Written Opinion for PCT/US2008/000536 issued by the European Patent Office on Aug. 27, 2008.

(Continued)

Primary Examiner—Jason S Morrow
(74) Attorney, Agent, or Firm—Baker & Daniels LLP

(57) ABSTRACT

A vehicle may include multiple fuel storage tanks arranged in a split side-by-side configuration. The vehicle may include a rear suspension having a linkage which moves in a direction not parallel with a centerline plane of the vehicle. The vehicle may include a tip-over structure which prevents unwanted tip-over of the vehicle. The vehicle may have moveable foot control levers to accommodate different size riders. The vehicle may include a moveable windshield.

12 Claims, 53 Drawing Sheets

U.S. PATENT DOCUMENTS

| | | | |
|---|---|---|---|
| 6,543,831 B2 | 4/2003 | Takemura et al. | |
| 6,619,415 B1 | 9/2003 | Hasumi et al. | |
| 6,641,196 B1 | 11/2003 | Hanagan | |
| 6,666,503 B1 | 12/2003 | Sorensen | |
| 6,709,042 B2 | 3/2004 | Takemura et al. | |
| 6,905,160 B2 | 6/2005 | Yoshida et al. | |
| 7,281,750 B1* | 10/2007 | Wise | 296/78.1 |
| 7,347,485 B1* | 3/2008 | Saunders | 296/180.5 |
| D567,715 S | 4/2008 | Brew et al. | |
| 7,552,960 B2* | 6/2009 | Yoshitake et al. | 296/78.1 |
| 2003/0062740 A1* | 4/2003 | Takemura et al. | 296/78.1 |
| 2004/0080175 A1 | 4/2004 | Wegener et al. | |
| 2005/0174787 A1 | 8/2005 | Uemoto et al. | |
| 2008/0169148 A1 | 7/2008 | Hoeve et al. | |
| 2008/0169149 A1 | 7/2008 | Holroyd et al. | |
| 2008/0169627 A1 | 7/2008 | Bagnariol et al. | |
| 2008/0173122 A1 | 7/2008 | Bagnariol | |
| 2009/0195011 A1* | 8/2009 | Tsuda et al. | 296/78.1 |

FOREIGN PATENT DOCUMENTS

| | | | |
|---|---|---|---|
| FR | 1 111 887 A | 3/1956 | |
| GB | 19436 A | 10/1912 | |
| JP | 59 106380 A | 6/1984 | |
| JP | 403065483 A * | 3/1991 | 296/78.1 |
| WO | WO2008088809 | 7/2008 | |

OTHER PUBLICATIONS

John Valk BMC Article—The New BMW R 1200 RT, www.johnvalkbmw.ca/2005/BMW/R1200RT/General-R1200RT-More.htm; printed Jul. 8, 2005, 11 pages.

* cited by examiner

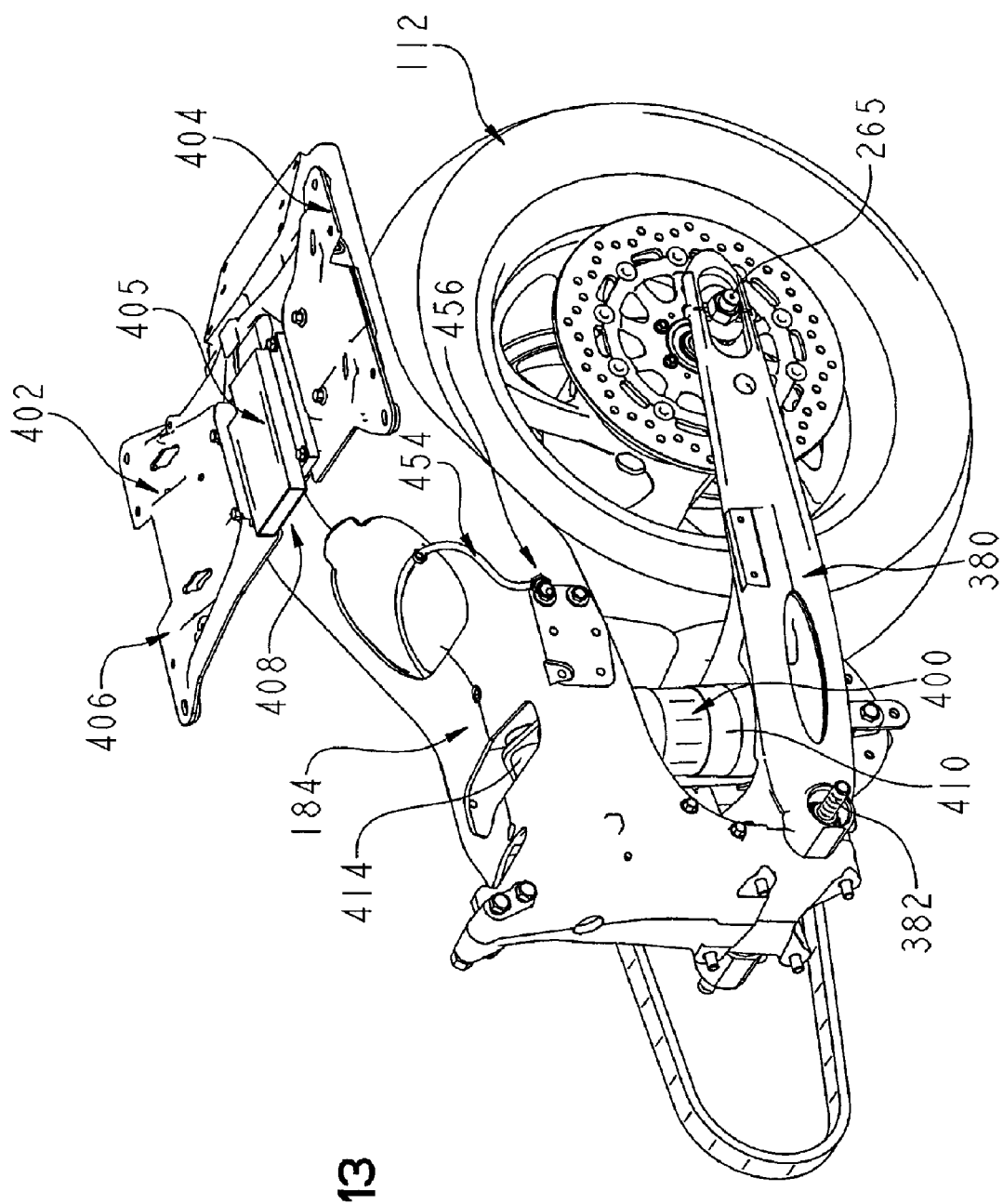

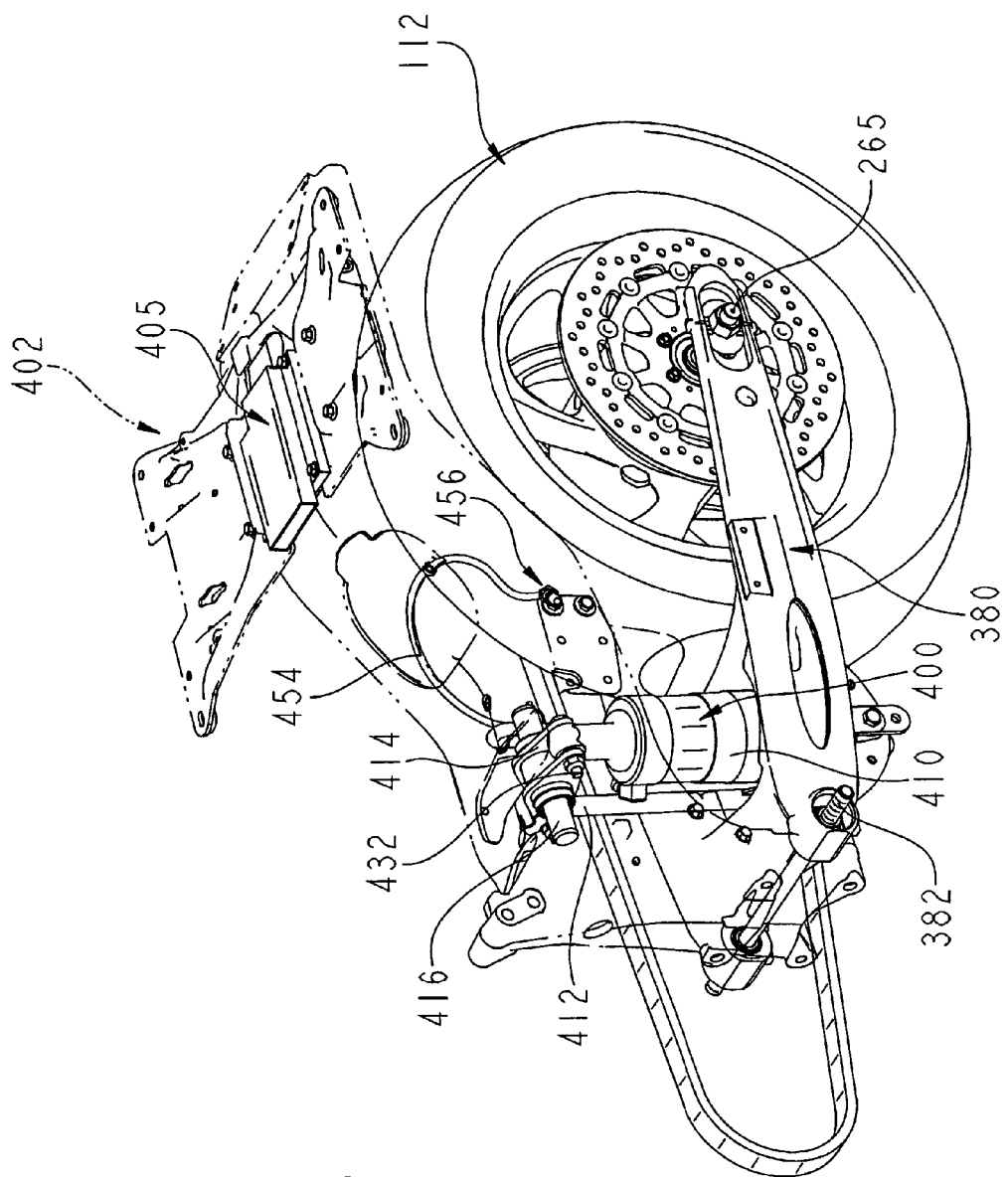

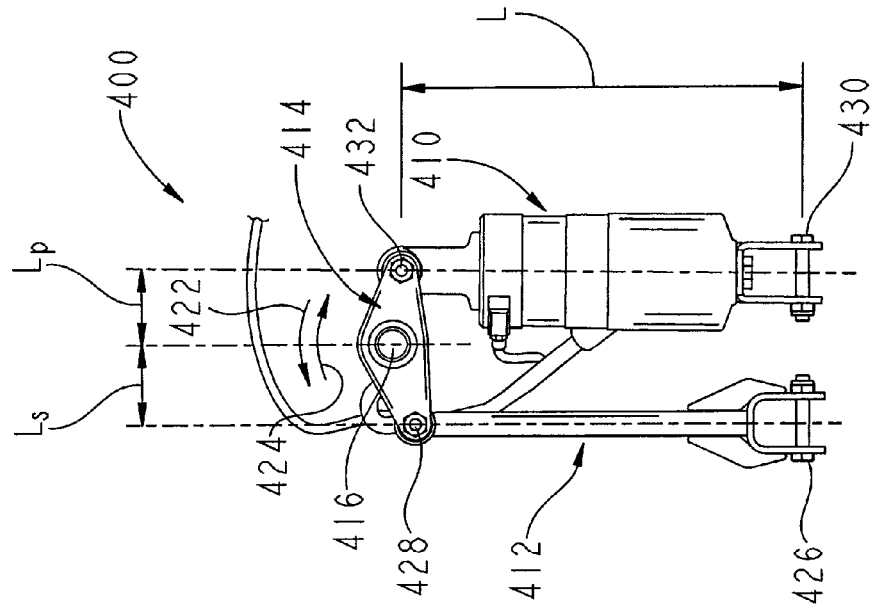
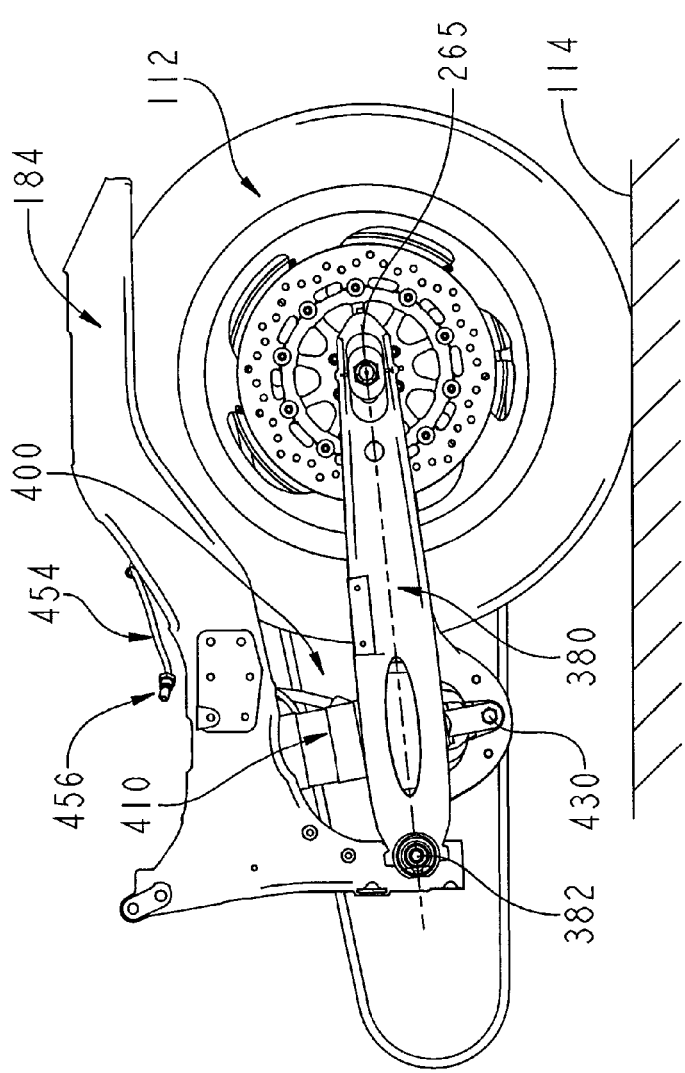
FIG. 18B
FIG. 18A

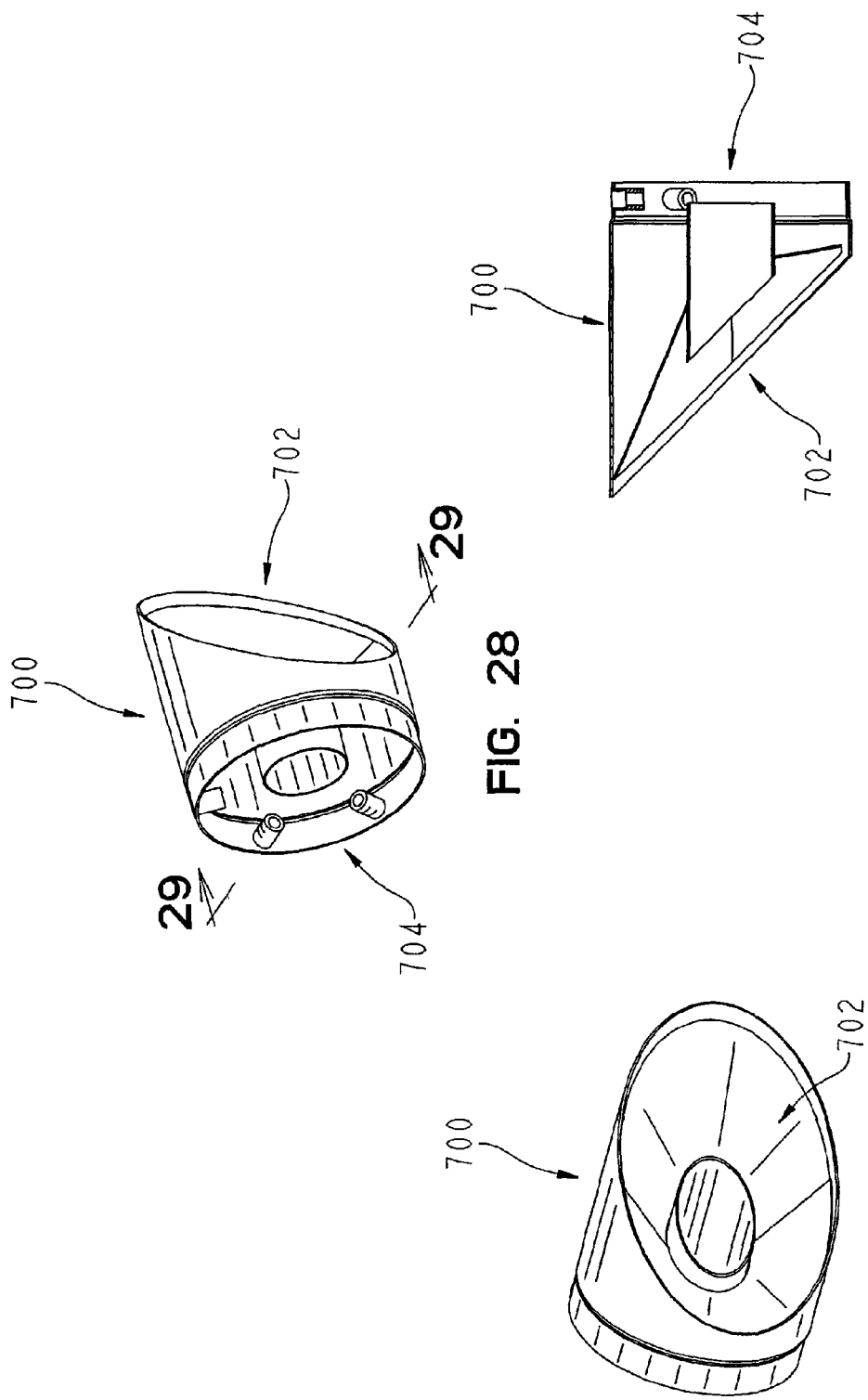

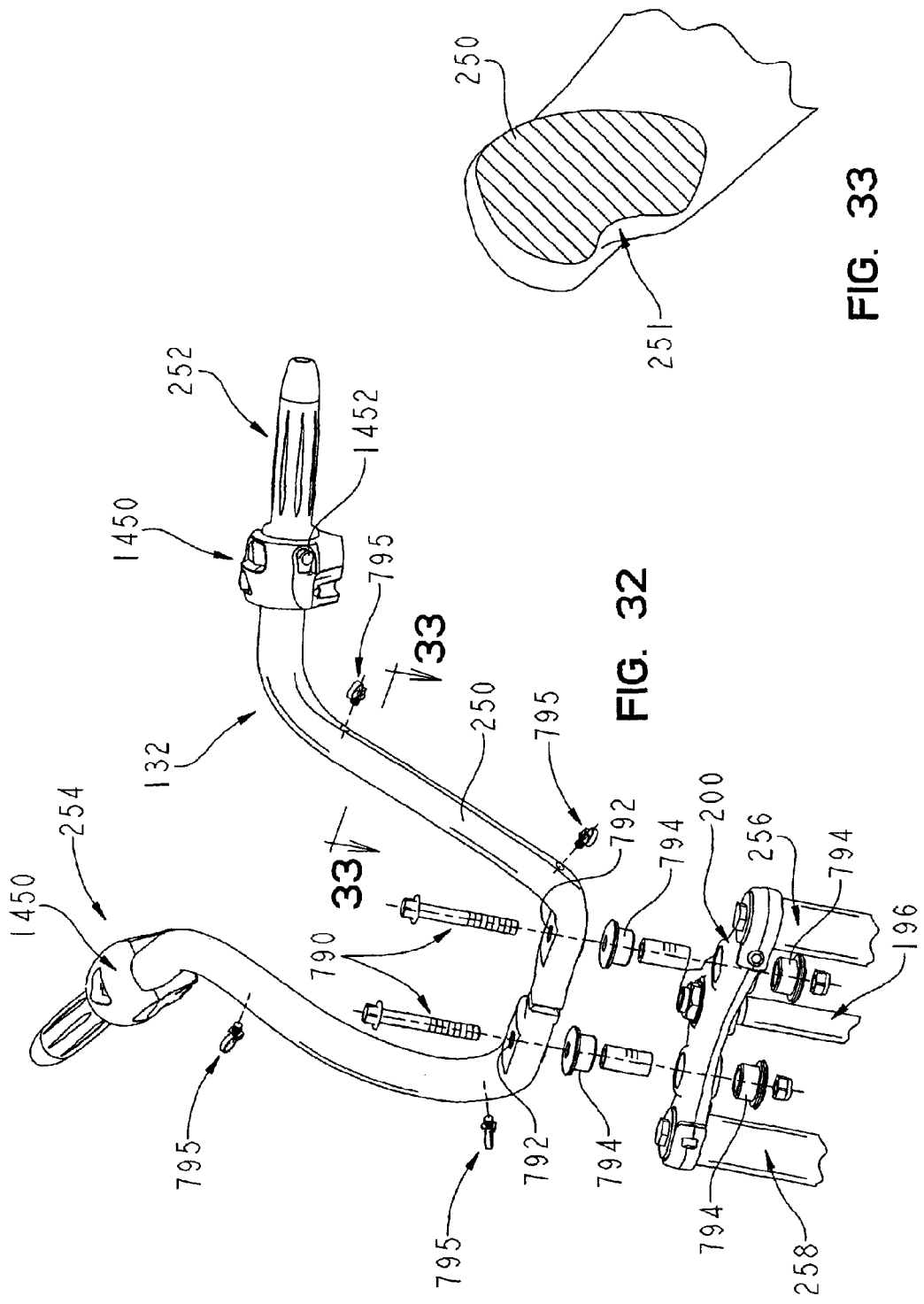

TWO-WHEELED VEHICLE

CROSS-REFERENCE TO RELATED APPLICATIONS

This application claims the benefit of U.S. Provisional Application Ser. No. 60/880,909, filed Jan. 17, 2007, titled TWO-WHEELED VEHICLE, the disclosure of which is expressly incorporated by reference herein.

FIELD OF THE INVENTION

The present invention relates generally to a vehicle and in particular to a motorcycle.

BACKGROUND OF THE INVENTION

Two wheel vehicles, such as motorcycles, are known. It is known to include a fuel storage tank on a motorcycle. It is known to provide a rear suspension for a motorcycle. It is known to include devices on a motorcycle to minimize damage during a tip-over of the motorcycle.

SUMMARY OF THE INVENTION

The present disclosure relates to two wheeled vehicles, including motorcycles. The present disclosure relates to the placement of various components to move the center of gravity of a two-wheeled vehicle forward. The present disclosure relates to the configuration of fuel storage tanks of a two-wheeled vehicle. The present disclosure relates to apparatus to prevent an unwanted tip-over of a two-wheeled vehicle.

In an exemplary embodiment of the present invention, a two-wheeled vehicle is provided. The two-wheeled vehicle comprising a front wheel; a rear wheel generally positioned in line with the front wheel along a longitudinal plane of the two-wheeled vehicle; a frame supported by the front wheel and the rear wheel; a swing arm pivotably coupled to the frame and supported by the rear wheel; a suspension system coupled to the swing arm and to the frame. The suspension system including a shock absorber and a linkage coupled to the shock absorber. The linkage moves in a plane which is transverse to the longitudinal plane of the two-wheeled vehicle.

In another exemplary embodiment of the present invention, a two-wheeled vehicle is provided. The two-wheeled vehicle comprising a front wheel; a rear wheel generally in positioned in line with the front wheel along a longitudinal plane of the two-wheeled vehicle; a frame supported by the front wheel and the rear wheel; a swingarm pivotably coupled to the frame at a first location and supported by the rear wheel; a suspension system coupled to the frame at a second location. The second location being higher than the first location. The suspension system being further coupled to the swingarm. The two-wheeled vehicle further comprising an exhaust system coupled to the engine. The exhaust system extending rearward from the engine towards the rear wheel and passing in front of the rear wheel from a first side of the two-wheeled vehicle to a second side of the two-wheeled vehicle at a height lower than the first location.

In a further exemplary embodiment of the present invention, a two-wheeled vehicle is provided. The two-wheeled vehicle comprising a front wheel; a rear wheel generally positioned in line with the front wheel along a longitudinal plane of the two-wheeled vehicle; a frame supported by the front wheel and the rear wheel; an engine coupled to the frame and operably coupled to the rear wheel to power the rear wheel; a steering assembly coupled to the front wheel, the steering assembly being moveable to steer the front wheel; and a fuel storage tank supported by the frame and operably coupled to the engine. The steering assembly including an upper portion above a top horizontal plane of fuel storage tank and a lower portion below a bottom horizontal plane of the fuel storage tank. The lower portion being coupled to the upper portion through a middle portion, at least a portion of the middle portion being positioned rearward of a front vertical plane of the fuel storage tank.

In yet another exemplary embodiment of the present invention, a two-wheeled vehicle is provided. The two-wheeled vehicle comprising a front wheel; a rear wheel generally positioned in line with the front wheel along a longitudinal plane of the two-wheeled vehicle; a frame supported by the front wheel and the rear wheel; an engine coupled to the frame and operably coupled to the rear wheel to power the rear wheel; a steering assembly coupled to the front wheel, the steering assembly being moveable to steer the front wheel; and a plurality of fuel storage tanks supported by the frame and operably coupled to the engine. A first fuel storage tank and a second fuel storage tank of the plurality of fuel storage tanks being positioned forward of the rear wheel and in a generally side-by-side configuration.

In still another exemplary embodiment of the present invention, a two-wheeled vehicle is provided. The two-wheeled vehicle comprising a front wheel; a rear wheel generally positioned in line with the front wheel along a longitudinal plane of the two-wheeled vehicle; a frame supported by the front wheel and the rear wheel; an engine coupled to the frame and operably coupled to the rear wheel to power the rear wheel, the engine being positioned between the front wheel and the rear wheel; a straddle seat supported by the frame, the straddle seat having a support surface; and a battery operably coupled to the engine. The battery located generally forward of the engine.

In yet a further exemplary embodiment of the present invention, a two-wheeled vehicle is provided. The two-wheeled vehicle comprising a front wheel; a rear wheel generally positioned in line with the front wheel along a longitudinal plane of the two-wheeled vehicle; a frame supported by the front wheel and the rear wheel; an engine coupled to the frame and operably coupled to the rear wheel to power the rear wheel; a straddle seat supported by the frame, the straddle seat having a support surface; a storage compartment supported by the frame and positioned proximate to the rear wheel. The storage compartment being positioned laterally outward of the rear wheel and overlapping a portion of the rear wheel from a direction normal to the longitudinal plane. The two-wheeled vehicle further comprising an at least one support member positioned to support the two-wheeled vehicle to prevent damage to an exterior of the storage compartment in the event of the two-wheeled vehicle unintentionally tipping. The at least one support member being positioned in a non-overlapping relationship with the storage compartment.

In yet another exemplary embodiment of the present invention, a vehicle for operation by a rider is provided. The vehicle comprising a plurality of ground engaging members; a frame supported by the plurality of ground engaging members; a straddle seat supported by the frame; a component supported by the plurality of ground engaging members; a first member supported by the frame; a second member supported by the frame, the second member being moveable relative to the first member; and a foot actuatable control lever coupled to the second member. The foot actuatable control lever being operatively coupled to the component to provide an input to the component. An initial position of the foot actuatable control lever is set based on the position of the second member relative to the first member. The initial position being selected based on the rider.

In still another exemplary embodiment of the present invention, a method of adjusting the position of a foot peg of a foot actuatable control lever of a vehicle is provided. The method comprising the steps of providing a mount and a support, the mount being translatable relative to the support; coupling the foot actuatable control lever of the vehicle to the mount; translating the mount relative to the support to position the foot peg; and securing the mount and the support together.

In a further exemplary embodiment of the present invention, a method of controlling a moveable windshield of a vehicle having a frame and a plurality of ground engaging members is provided. The method comprising the steps of supporting the moveable windshield on the frame of the vehicle; and encountering a flow of air. A first portion of the flow of air traveling along a front surface of the moveable windshield. A second portion of the flow of air traveling along a back surface of the moveable windshield. The second portion of the flow of air along the back surface of the moveable windshield being increased when the moveable windshield is in a raised position than when the moveable windshield is in a lowered position.

In yet another exemplary embodiment of the present invention, a windshield assembly is provided. The windshield assembly comprising a base member; a rear windshield supported by the base member; and a front windshield supported by the base member. The front windshield being positioned forward of the rear windshield. The front windshield being moveable relative to the rear windshield between a lowered position and a raised position. The windshield assembly further comprising an actuation device supported by the base member and operatively coupled to the front windshield. The actuation device controlling the movement of the front windshield between the raised position and the lowered position. The front windshield being spaced apart from the rear windshield to provide a flow of air along a back surface of the front windshield.

In a further exemplary embodiment of the present invention, a vehicle for operation by a rider is provided. The vehicle comprising a plurality of ground engaging members including a front ground engaging member and a rear ground engaging member; a frame supported by the plurality of ground engaging members; a straddle seat supported by the frame; a steering assembly coupled to the front ground engaging member, the steering assembly being moveable to steer the front ground engaging member; and a windshield positioned forward of the straddle seat. The windshield including a front windshield portion and a rear windshield portion. The front windshield portion being moveable relative to the rear windshield portion between a raised position and a lowered position. A flow of air passes between the front windshield portion and the rear windshield portion along a back surface of the front windshield portion. The flow of air being increased when the front windshield portion is in the raised position.

The above mentioned and other features of this invention, and the manner of attaining them, will become more apparent and the invention itself will be better understood by reference to the following description of embodiments of the invention taken in conjunction with the accompanying drawings.

BRIEF DESCRIPTION OF THE DRAWINGS

FIG. 13 is a perspective view of a rear suspension coupled to the rear frame member and the rear swingarm of FIG. 5, the rear swingarm being further coupled to a rear wheel;

FIG. 14 is a view of the assembly of FIG. 13 with the rear frame member being shown in phantom to illustrate the rear suspension;

FIG. 18A is a side view of the assembly of FIG. 13 with the rear suspension being in a compressed state;

FIG. 18B illustrates the rear suspension in the compressed state corresponding to FIG. 18A;

FIG. 27 is a first perspective view of the exhaust tip of FIG. 25;

FIG. 28 is a second perspective view of the exhaust tip of FIG. 25;

FIG. 29 is a sectional view of the exhaust tip of FIG. 25 along lines 29-29 of FIG. 28.

FIG. 32 is an exploded assembly view of the steering assembly;

FIG. 33 is a cross-section of the handlebar member of FIG. 32 along lines 33-33.

Corresponding reference characters indicate corresponding parts throughout the several views. Unless stated otherwise the drawings are proportional.

DETAILED DESCRIPTION OF THE DRAWINGS

The embodiments disclosed below are not intended to be exhaustive or to limit the invention to the precise forms disclosed in the following detailed description. Rather, the embodiments are chosen and described so that others skilled in the art may utilize their teachings. While the present invention primarily involves a touring motorcycle, it should be understood, that the invention may have application to other types of vehicles such as all-terrain vehicles, motorcycles, watercraft, utility vehicles, scooters, golf carts, and mopeds.

Figure 1:
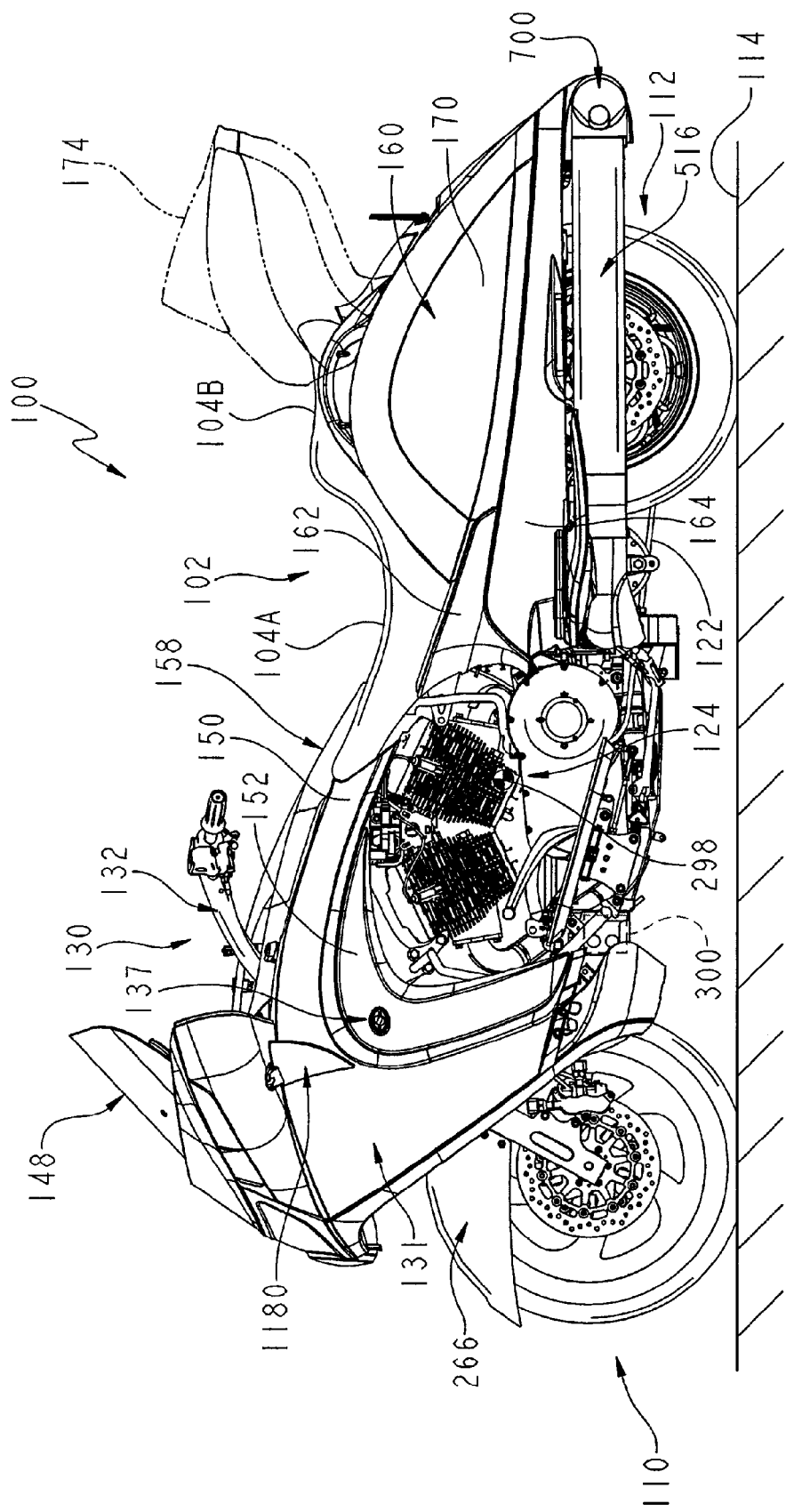
FIG. 1 is a side view of an illustrative embodiment of a two-wheeled vehicle.

Referring to FIG. 1, an illustrative embodiment of a two-wheeled vehicle 100 is shown. Vehicle 100 as illustrated is a touring motorcycle including a seat 102 for supporting an operator in position 104A and a passenger in position 104B. Additional details about vehicle 100 are disclosed in U.S. application Ser. No. 11/624,103, filed Jan. 17, 2007, titled "TWO WHEELED VEHICLE", U.S. application Ser. No. 11/624,142, filed Jan. 17, 2007, titled "REAR SUSPENSION FOR A TWO WHEELED VEHICLE", U.S. application Ser. No. 11/624,144, filed Jan. 17, 2007, titled "TIP OVER STRUCTURE FOR A TWO WHEELED VEHICLE", the disclosures of which are expressly incorporated by reference herein.

Vehicle 100 further includes a front ground engaging member, illustratively wheel 110, and a rear ground engaging member, illustratively wheel 112. Vehicle 100 travels relative to the ground 114 on front wheel 110 and rear wheel 112. In one embodiment, front wheel 110 and rear wheel 112 are generally arranged along a centerline plane 116 (see FIG. 4) of vehicle 100.

Rear wheel 112 is coupled to a drive shaft of a transmission through a belt 122. Transmission is coupled to engine 124 which provides power to rear wheel 112. In the illustrated embodiment, engine 124 is a 100 cubic inch 4-stroke 50° v-twin spark-ignition gasoline engine available from Polaris Industries, Inc. located at 2100 Highway 55 in Medina, Minn. 55340. In one embodiment, engine 124 has a maximum width of about 380 millimeters or approximately 15 inches which allows flexibility and comfort for the position of the operator's legs. In alternative embodiments, rear wheel 112 is coupled to the drive shaft through a chain drive or other suitable couplings. The drive arrangement in the illustrated embodiment is comprised of a six speed overdrive constant mesh transmission with a carbon fiber reinforced belt available from Polaris Industries, Inc. In alternative embodiments, the transmission is a continuous variable transmission.

It will be appreciated that while the vehicle 100 is illustrated as a two-wheel vehicle, various embodiments of the present teachings are also operable with three, four, six etc. wheeled vehicles. It will also be appreciated that while a spark-ignition gasoline engine is illustrated, electric motors, and other suitable torque-generating machines are operable with various embodiments of the present teachings.

Front wheel 110 is coupled to a steering assembly 130. Steering assembly 130 includes handlebars 132 which may be moved by an operator to rotate front wheel 110 either to the left or the right.

Engine 124 is framed by various bodywork components. A front portion of vehicle 100 includes a front fairing 131 having a central opening 134 (see FIG. 3). Steering assembly 130 extends through central opening 134. Front fairing 131 is stationary and does not move left or right with steering assembly 130.

Figure 3:
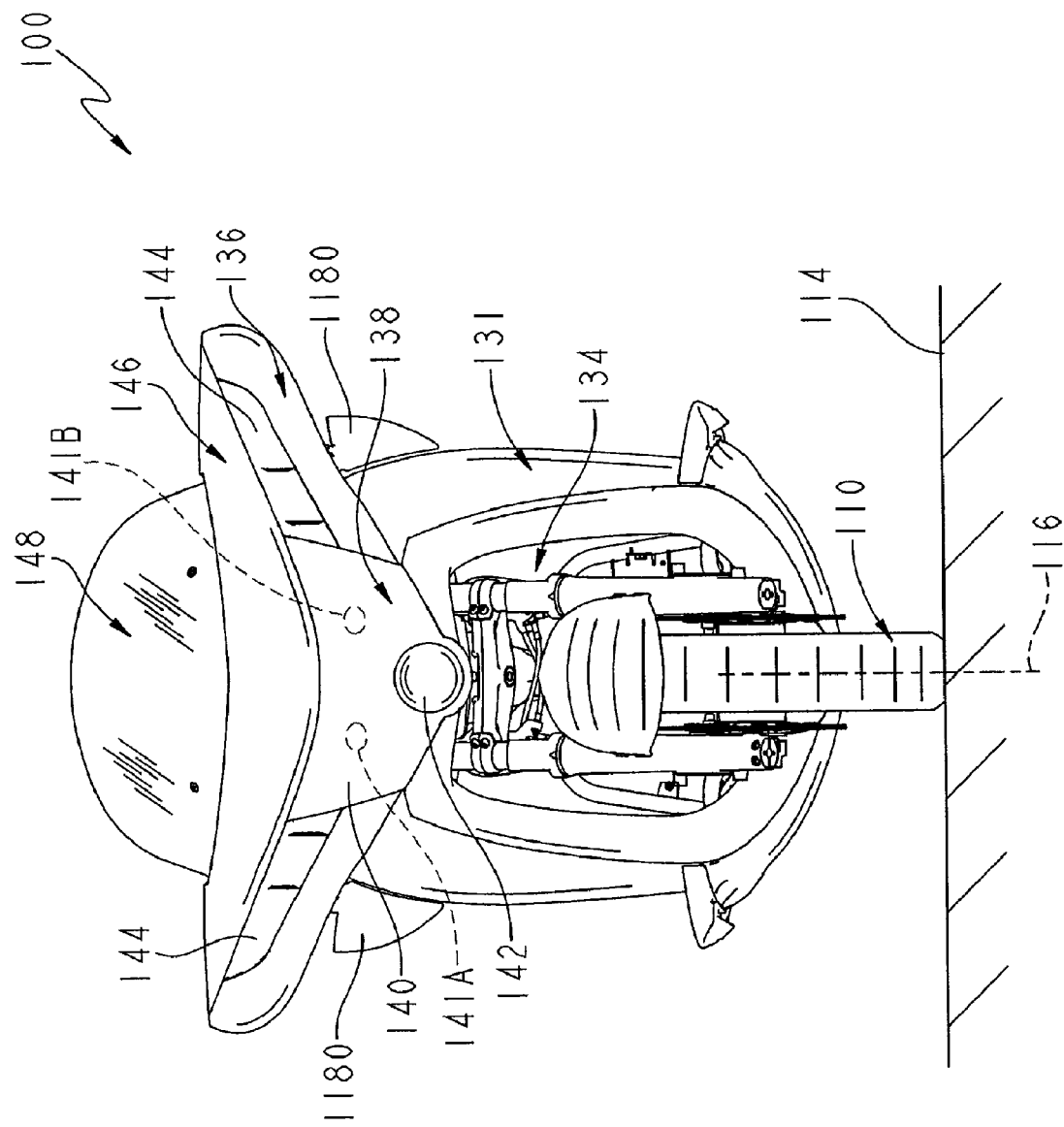
FIG. 3 is a front view of the two-wheeled vehicle of FIG. 1.

Referring to FIG. 3, a front panel 136 is provided which frames the front light assembly 138 including a front driving light assembly 140, a high beam light 142, and turn lights 144. Front panel 136 further includes an access panel 146 above which windshield 148 extends.

Light assembly 140 includes two halogen bulbs 141A and 141B which are positioned behind a generally smooth lens. Light provided by bulbs 141A and 141B is reflected off a faceted reflector behind the lens and out through the lens. One of bulbs 141A and 141B provides conventional low beam light and the other of bulbs 141A and 141B provides conventional high beam light. High beam light 142 includes a High Intensity Discharge (HID) bulb. In one embodiment, high beam light 142 functions as a fog light and produces a wide and low pattern.

In one embodiment, vehicle 100 further includes a backlit side marker 137. In one embodiment, side marker 137 includes markings identifying vehicle 100 as a Victory motorcycle.

Returning to FIG. 1, front fairing 131 includes a side panel 150 which extends from in front of a lower portion of engine 124 up above engine 124 and over engine 124 back to seat 102. A second panel 152 follows the general line of side panel 150 and is set inward of side panel 150. Additionally, a top bodywork grouping 158 covers a top portion of vehicle 100 generally forward of seat 102.

Figure 4:
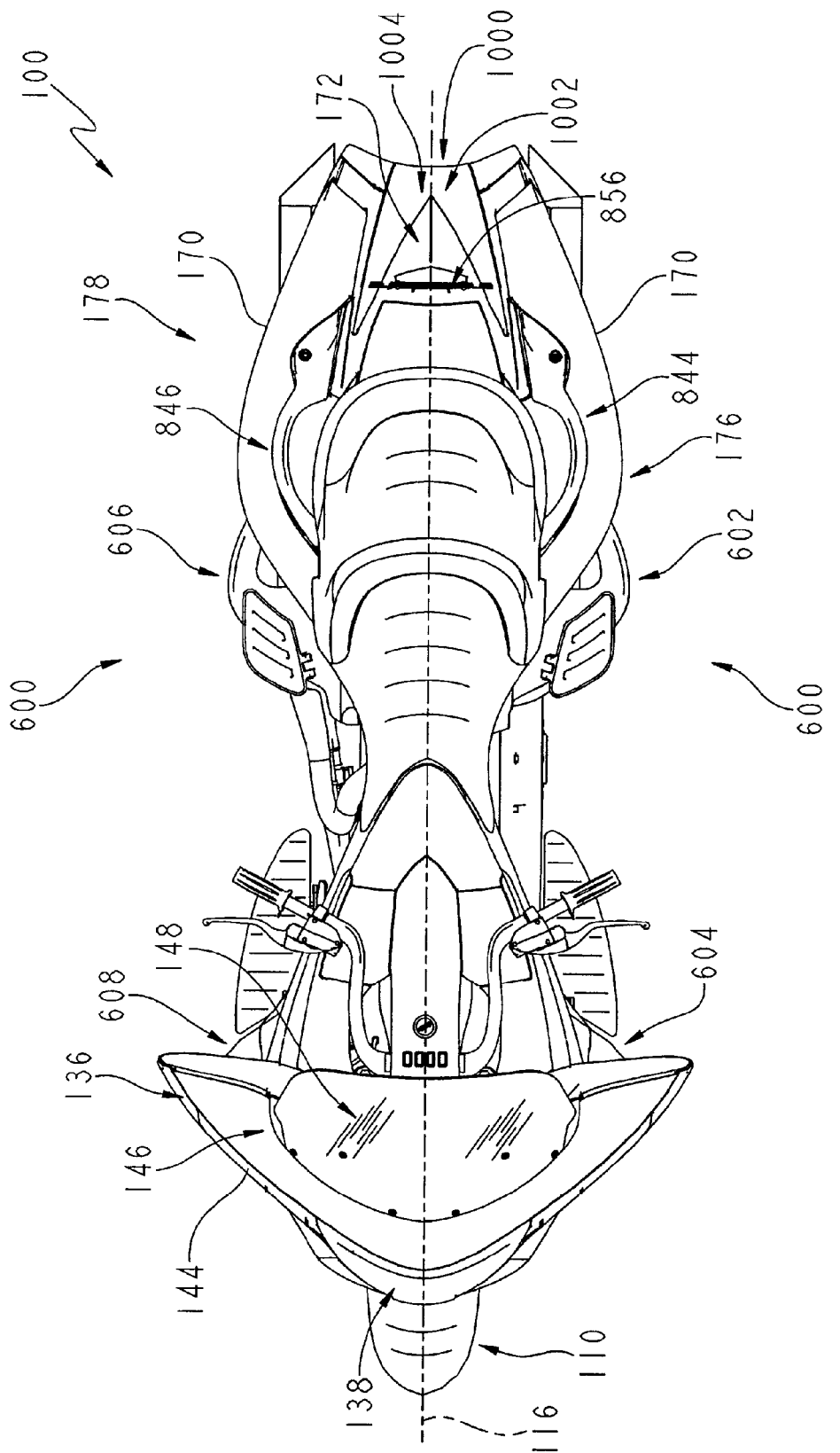
FIG. 4 is a top view of the two-wheeled vehicle of FIG. 1.
Figure 13A:
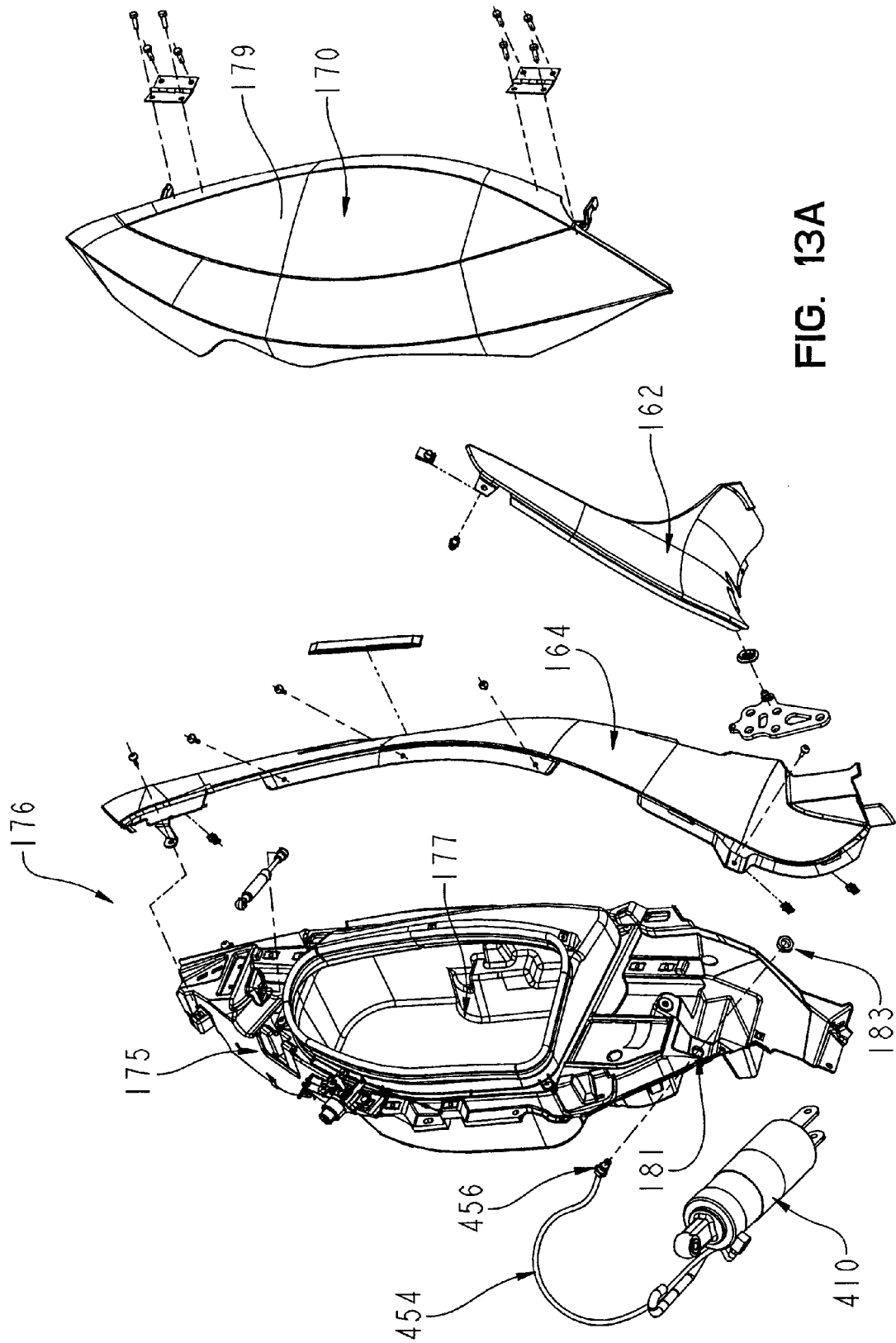
FIG. 13A is an exploded view of portions of the rear bodywork illustrating the location that the air line coupled to the rear suspension of FIG. 13 is accessible.

A rear portion of vehicle 100 includes a rear bodywork grouping 160. Rear bodywork grouping 160 includes side panels 162 and 164. Further, rear bodywork grouping 160 includes an exterior of saddlebags 170, a rear panel 172 (see FIG. 4), and a removable trunk 174. Referring to FIG. 4, vehicle 100 includes a left side saddlebag 176 and a right side saddlebag 178. Saddlebags 176, 178 and trunk 174 are each storage compartments supported by the frame and positioned proximate to the rear wheel. As shown in FIG. 13A, saddlebag includes a base member 175 which includes a storage compartment 177. Storage compartment 177 is covered by a saddlebag cover 179 which is movable between an opened position and a closed position. Saddlebags 176, 178 are positioned laterally outward of the rear wheel and overlapping a portion of the rear wheel from a direction normal to the longitudinal plane 116. Trunk 174 is positioned above the support surface of the straddle seat 102.

Figure 5:
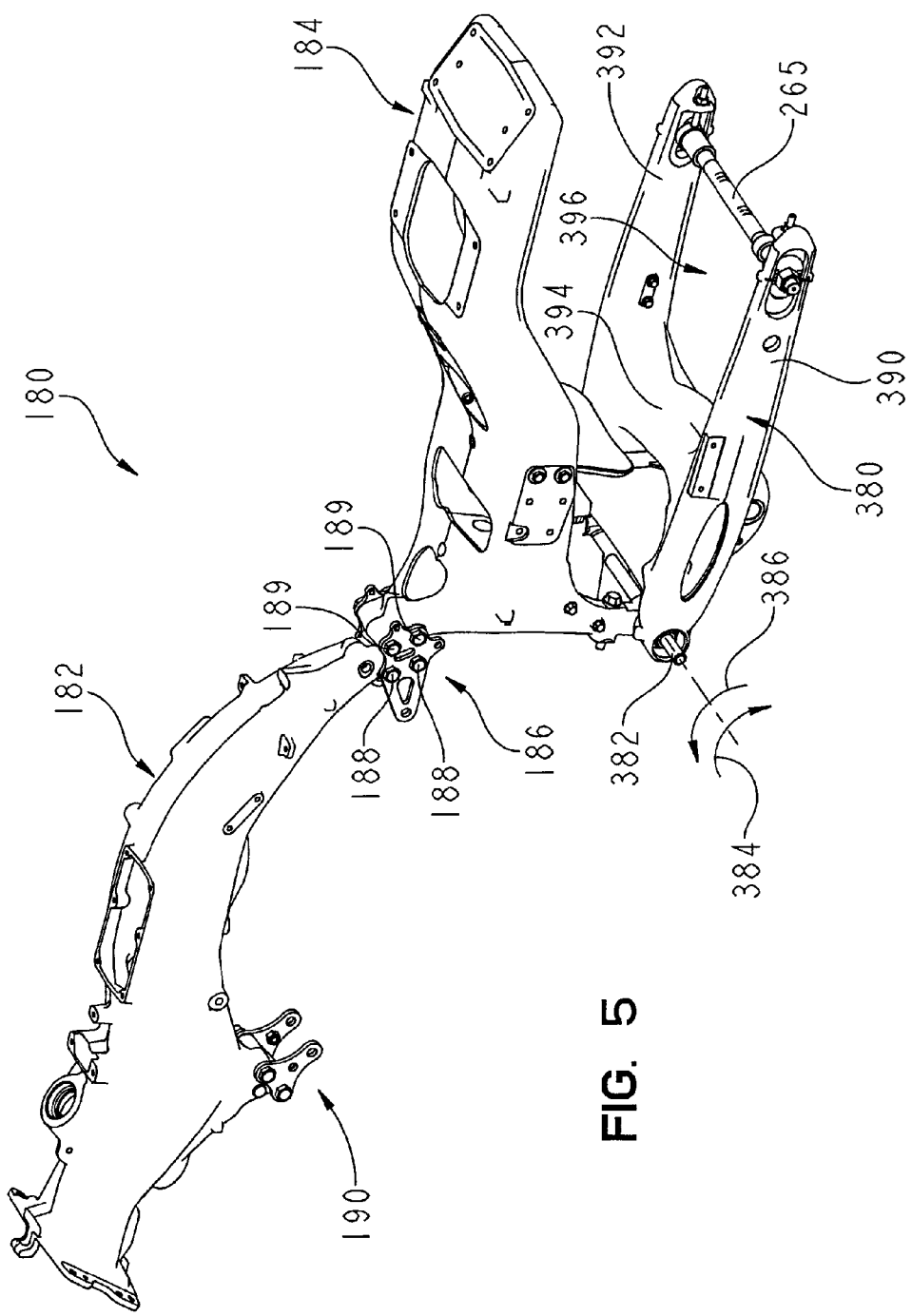
FIG. 5 is an perspective view of a rear swingarm and a chassis of the two-wheeled vehicle of FIG. 1, the chassis including a front frame member and a rear frame member.

Turning to FIG. 5, vehicle 100 includes a chassis 180. Chassis 180 includes a front frame member 182 and a rear frame member 184. In one embodiment, both front frame member 182 and rear frame member 184 are cast one-piece components. In one example, the front frame member 182 and the rear frame member 184 are cast aluminum. By casting front frame member 182 and rear frame member 184, variances in component attachment points from instance to instance of a given chassis is reduced compared to traditional tubular frames. In one embodiment, component attachment points are machined to achieve improved tolerancing. In addition, the torsional stiffness of vehicle 100 is generally about twice as stiff as a tubular frame vehicle.

Front frame member 182 and rear frame member 184 are coupled together. In the illustrated embodiment, both front frame member 182 and rear frame member 184 are coupled to mounting brackets 186, front frame member 182 through couplers 188 and rear frame member through couplers 189. Mounting brackets 186 along with mounting brackets 190 couple to engine 124 such that engine 124 is suspended from front frame member 182.

By having front frame 182 and rear frame 184 as separate components coupled together, either front frame 182 or rear frame 184 may be used on another type of two-wheeled vehicle thereby reducing design cycles and part cost.

Figure 6:
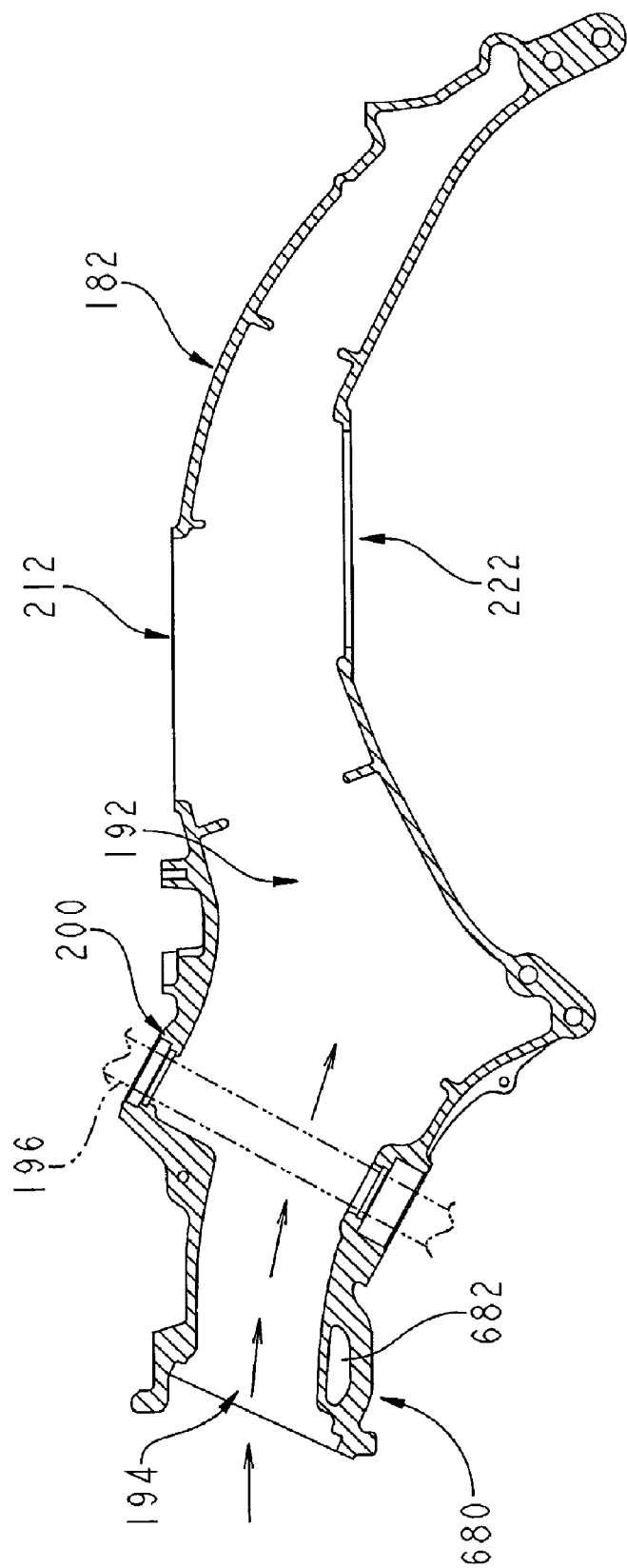
FIG. 6 is a sectional view of the front frame member of the chassis of FIG. 5.

Front frame member 182 includes an air channel 192 within as shown in FIG. 6. Front frame member 182 serves as an air box for vehicle 100. Referring to FIG. 6, air enters an air inlet 194 located in the front of front frame member 182, passes around a steering column 196 of steering assembly 130, and exits through an air outlet 222 of front frame member 182. The air outlet 222 is in fluid communication with engine 124 and communicates air to engine 124. The steering column 196 of steering assembly 130 passes through a fork journal 200 of front frame member 182. Sealed bearings are pressed into a top portion 197 and a bottom portion 199 of fork journal 200 and facilitate the rotation of steering column 196 relative to front frame member 182.

Figure 7:
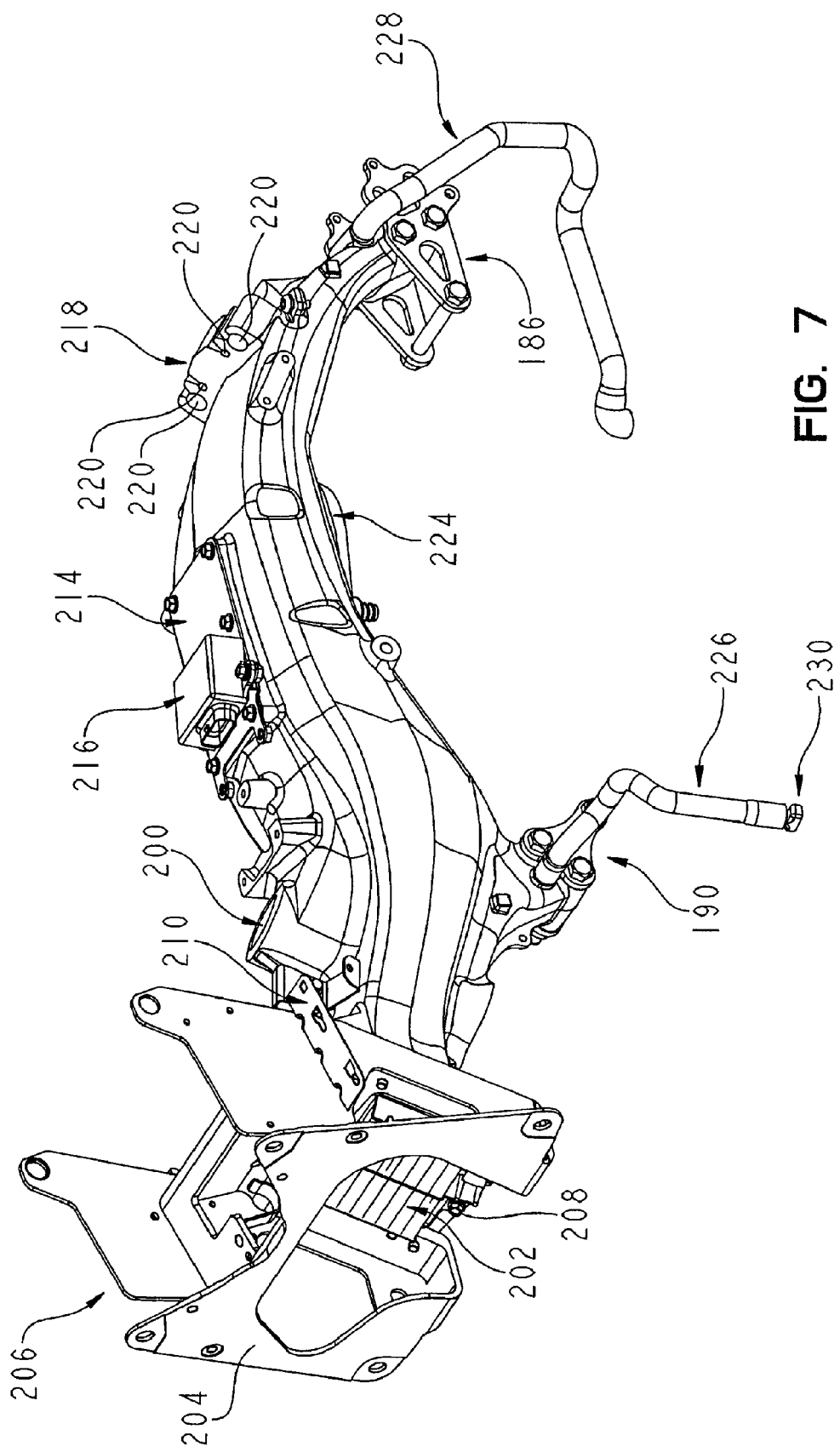
FIG. 7 is an perspective view of the front frame member of FIG. 6 with an air filter, mounting bracket, an electronic module, and a harness management member coupled thereto.

Referring to FIG. 7, an air filter 202 is positioned over air inlet 194 so that air passes through air filter 202 and into the interior 192 of front frame member 182 on its way to engine 124. Referring to FIG. 3, air enters opening 134 between front wheel 110 and fairing 131. This results in introducing cool air into the air box and ultimately into engine 124.

Air filter 202 is located behind the headlight assembly 138 (see FIG. 3) which mounts to a front portion 204 of a mounting bracket 206 coupled to front frame member 182. By placing air filter 202 up front, air filter 202 is easily accessible for servicing. In the illustrated embodiment, air filter 202 is held in place through two couplers 208 (one shown), illustratively fasteners. To replace air filter 202 couplers 208 are removed and air filter 202 may slide down out of place. Once removed from air inlet 194 a replacement air filter 202 may be installed by re-securing couplers 208.

Mounting bracket 206 along with supporting light assembly 138, supports many other components including front panel 136, access panel 146, windshield 148, and additional components including an instrument panel and rear view mirrors. In addition, mounting bracket 206 has coupled thereto a mounting bracket 210 to which a fuse box (not shown) may be coupled. A similar mounting bracket is positioned on the left side of mounting bracket 206 to mount a similar fuse box. By locating the fuse box proximate to mounting bracket 206, an operator may easily replace a fuse by removing access panel 146 to gain access to the fuse box.

An upper access opening 212 (see FIG. 6) of front frame member 182 is covered with a cover 214 secured with multiple fasteners. Cover 214 also supports an electronic module 216 which interfaces with the turn signals to act as an auto cancellation module in case the turn signals are inadvertently left on. Harnesses extending rearward from electronic module 216 and/or additional components are organized by harness management member 218 having a plurality of channels 220 to maintain various harnesses in a spaced apart arrangement.

Air outlet 222 (see FIG. 6) of front frame member 182 is connected with a seal 224 that is in fluid communication with engine 124 and communicates air to engine 124. Also, in fluid communication with interior 192 of front frame member 182 is a drain hose 226 coupled to a front port of front frame member 182 and a crankcase breather hose 228 coupled to a rear port of front frame member 182. Drain hose 226 is capped with a drain plug 230. Drain hose 226 is used to drain any fluids that may have accumulated within the air box. Crankcase breather hose 228 is used to reduce pressure building up in the crankcase by transferring gases, such as oil vapor and/or hydrocarbons, back to the intake system.

Figure 8:
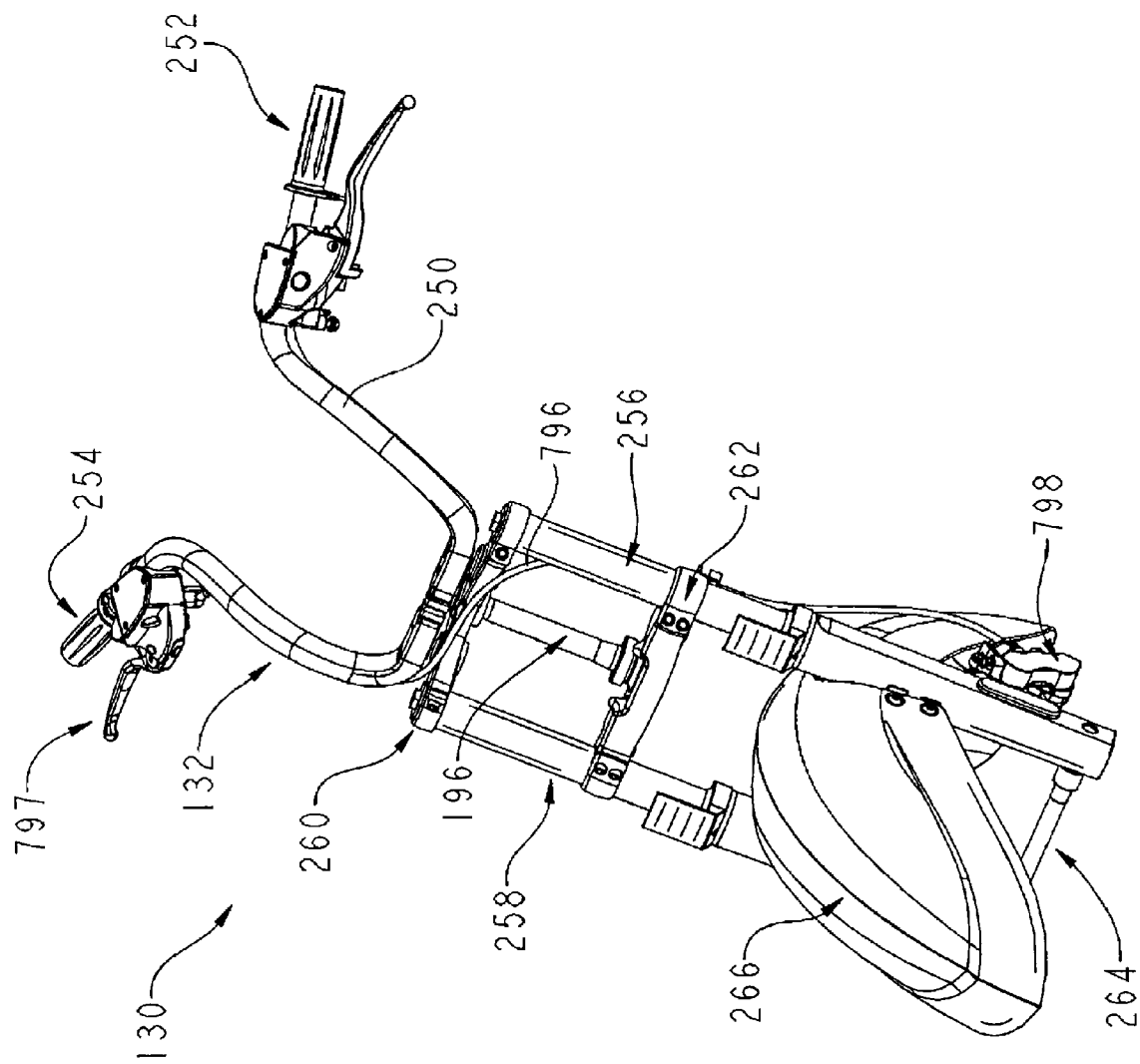
FIG. 8 is a perspective view of the steering assembly of the two-wheeled vehicle of FIG. 1.

Referring to FIG. 8, steering assembly 130 is shown. Steering assembly 130 includes handlebars 132 which include a handlebar member 250 and a left and right grip 252, 254. As is known in the art, each of left grip 252 and right grip 254 may be configured to control and/or have associated therewith one or more components to control engine 124, the transmission and/or the front and/or rear brakes of two-wheeled vehicle 100. As shown in FIG. 8, handlebars 132 are coupled to center steering column 196 and left and right steering columns 256, 258 through an upper bracket 260.

Center steering column 196 passes through fork journal 200 in front frame member 182. Left and right steering columns 256, 258 are positioned to a left side and a right side of front frame member 182, respectively. As used herein, the left side corresponds to a left side of an operator straddling seat 102 facing forward and the right side corresponds to a right side of an operator straddling seat 102 facing forward.

A lower bracket 262 also couples center steering column 196 and left and right steering columns 256, 258 together. Upper bracket 260 is positioned above front frame member 182 and lower bracket 262 is positioned below front frame member 182. Left and right steering columns 256, 258 are coupled to front wheel 110 through an axle 264. Further, a fender 266 is coupled to left and right steering columns 256, 258 and positioned over front wheel 110.

Figure 10:
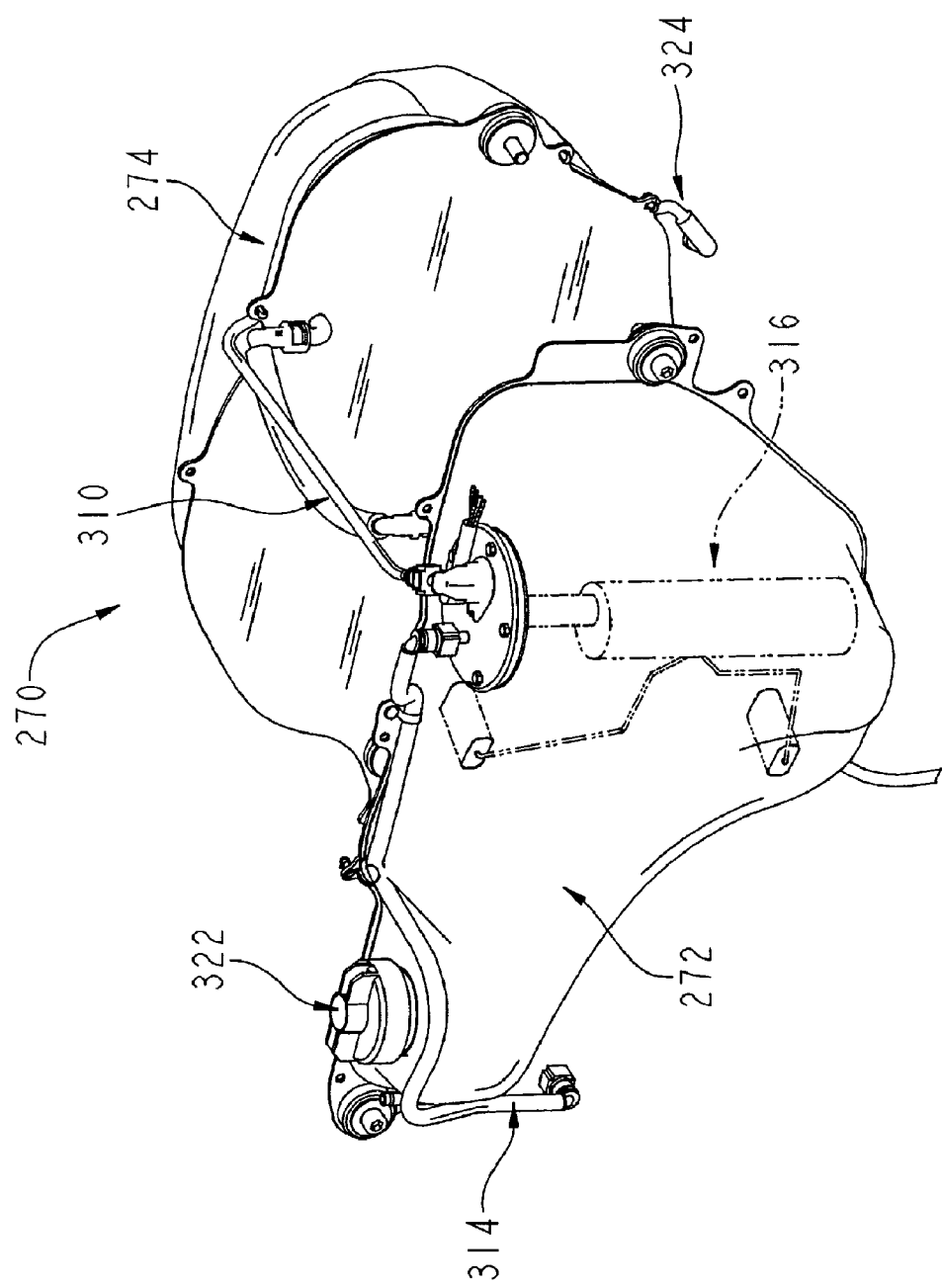
FIG. 10 is a perspective view of two fuel storage tanks of the two-wheeled vehicle of FIG. 1.

In one embodiment, a portion of steering assembly 130 is positioned rearward of a forward portion of at least one fuel storage tank (fuel storage tank 272 illustrated) of two-wheeled vehicle 100. Referring to FIG. 10, in one embodiment, two-wheeled vehicle 100 includes a fuel storage system 270 which includes two fuel storage tanks, fuel storage tank 272 and fuel storage tank 274. Additional details about fuel storage system 270 are provided herein.

Returning to FIG. 9, a portion of steering assembly 130 is positioned rearward of a forward portion of fuel storage tank 272 of fuel storage system 270. Steering assembly 130 may be divided into three portions, a bottom portion 276, a middle portion 278, and a top portion 280. Bottom portion 276 of steering assembly 130 is the portion of steering assembly 130 which extends below a bottom plane 282 of fuel storage tank 272. Bottom plane 282 of the fuel storage tank is a horizontal plane passing through the lowermost point of fuel storage tank 272. Top portion 280 of steering assembly 130 is the portion of steering assembly 130 which extends above a top plane 284 of fuel storage tank 272. Top plane 284 of fuel storage tank 272 is a horizontal plane passing through the uppermost point of fuel storage tank 272. Middle portion 278 of steering assembly 130 is the portion of steering assembly 130 which is between bottom plane 282 of fuel storage tank 272 and top plane 284 of fuel storage tank 272.

Figure 9:
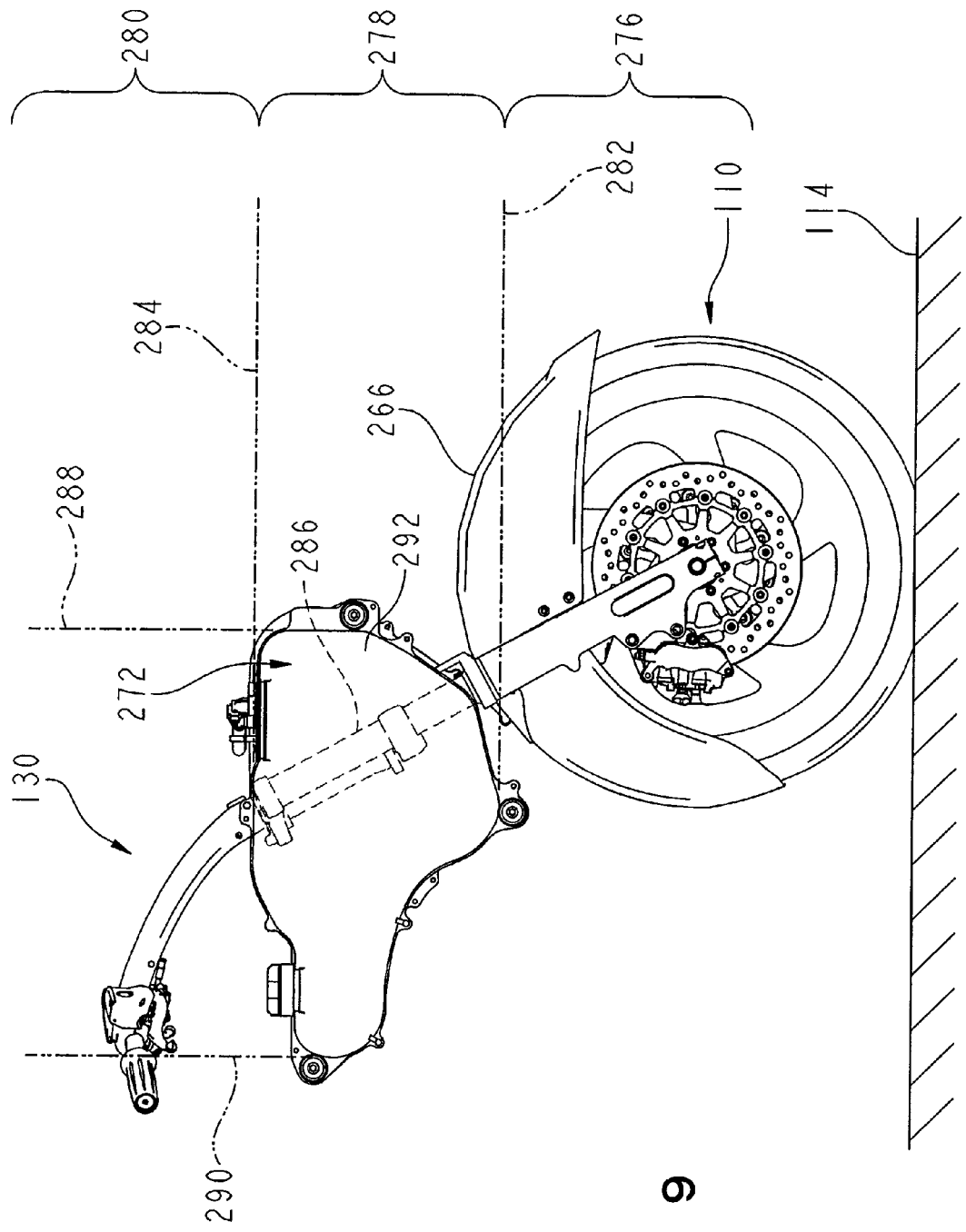
FIG. 9 illustrates the placement of a fuel storage tank relative to the steering assembly of FIG. 8.

As illustrated in FIG. 9, bottom portion 276 of steering assembly 130 is coupled to top portion 280 of steering assembly 130 through middle portion 278. Middle portion 278 has at least a portion 286 thereof which is positioned rearward of a front plane 288 of fuel storage tank 272. Further, portion 286 of middle portion 278 is positioned forward of a rear plane 290 of fuel storage tank 272. Rear plane 290 of fuel storage tank 272 being a vertical plane passing through the rear-most point of fuel storage tank 272. In the illustrated embodiment, the connection between handlebars 132 and upper bracket 260 is located rearward of front plane 288 and below top plane 284.

By having fuel storage tank 272 positioned such that at least a portion 292 thereof is forward of portion 286 of middle portion 278 of steering assembly 130 assists in moving a center of gravity 298 (see FIG. 1) of two-wheeled vehicle 100 forward. For touring motorcycles, such as the illustrated embodiment of two-wheeled vehicle 100, a large portion of the load of the motorcycle is generally positioned over rear wheel 112. For example, the load of the operator and/or passenger is generally carried by the rear wheel 112. Further, any cargo positioned within saddlebags 176, 178 and/or removable trunk 174 (shown in phantom in FIG. 1) is generally carried by the rear wheel 112. By moving more of the load forward, vehicle 100 has increased cargo carrying capability and better stability when an operator holds vehicle 100 upright while stopped.

Referring to FIG. 1, additional steps have been taken with regard to vehicle 100 to lower center of gravity 298 of two-wheeled vehicle 100 and to move center of gravity 298 towards front wheel 110. As one example, of shifting center of gravity 298 forward and lower, a battery of vehicle 100 whose location 300 is shown in phantom in FIG. 1 is located in front of engine 124 behind front wheel 110. The battery is used to provide power for the electrical start of vehicle 100 to start vehicle 100 and/or power various accessories or lights of vehicle 100 while engine 124 is not running.

Location 300 of the battery also provides for easy access to the battery. Battery cables may be attached to the battery without removing any of the body panels of vehicle 100 or removing seat 102 of vehicle 100. As such, the battery may be charged or jumped without the removal of seat 102 or any of the body panels.

In one embodiment, center of gravity 298 is about 487 mm (about 19.17 inches) above ground 114 and about 3% forward of a midpoint of a line connecting front axle 264 of front wheel 110 and a rear axle 265 (see FIG. 5) of rear wheel 112 when vehicle 100 is full of fluids without taking into account the weight of the trunk 174, the weight of any cargo, or the weight of the operator or passenger. Thus, the load between front wheel 110 and rear wheel 112 is generally balanced.

Figure 12:
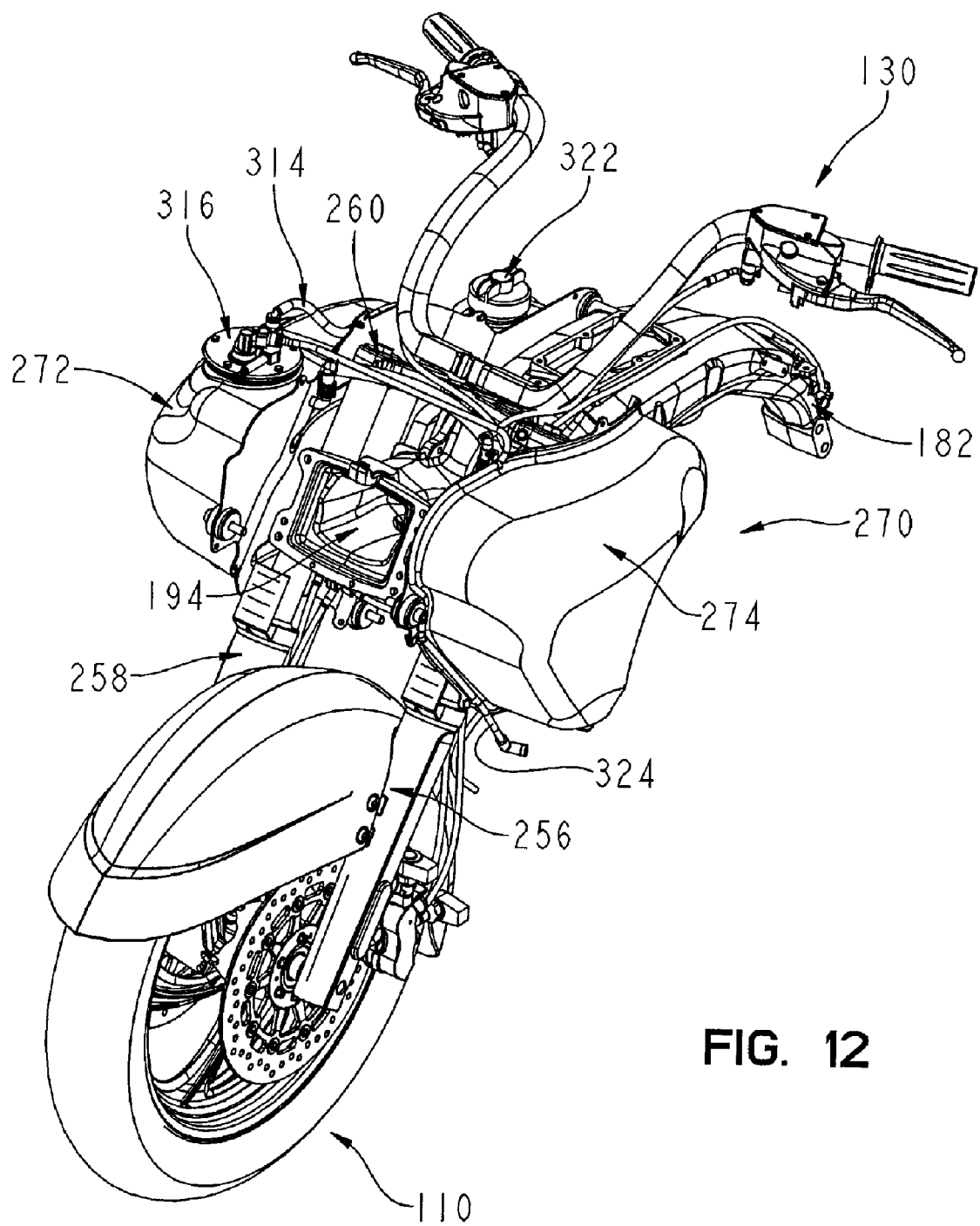
FIG. 12 is a perspective view of the two fuel storage tanks of FIG. 10 located relative to the steering assembly of FIG. 8 and the front frame member of FIG. 5.

Referring to FIG. 12, the fuel storage system 270 of vehicle 100 is shifted forward compared to traditional motorcycles which further assists in balancing the load between front wheel 110 and rear wheel 112. As shown in FIG. 12, right fuel storage tank 272 is positioned on a right side of front frame member 182 and outward of front frame member 182 and left fuel storage tank 274 is positioned on a left side of front frame member 182 and outward of front frame member 182. Right fuel storage tank 272 and left fuel storage tank 274 are supported by front frame member 182 and are positioned around the air channel 192 within front frame member 182. In one embodiment, right side fuel storage tank 272 and left side fuel storage tank 274 are positioned to balance the fuel load of vehicle 100 about centerline plane 116. Steering assembly 130 is positioned between right side fuel storage tank 272 and left side fuel storage tank 274. In one embodiment, at least a portion of one or both of right fuel storage tank and left fuel storage tank overlaps at least one of a top portion of front frame member 182 and a bottom portion of front frame member 182.

Figure 11:
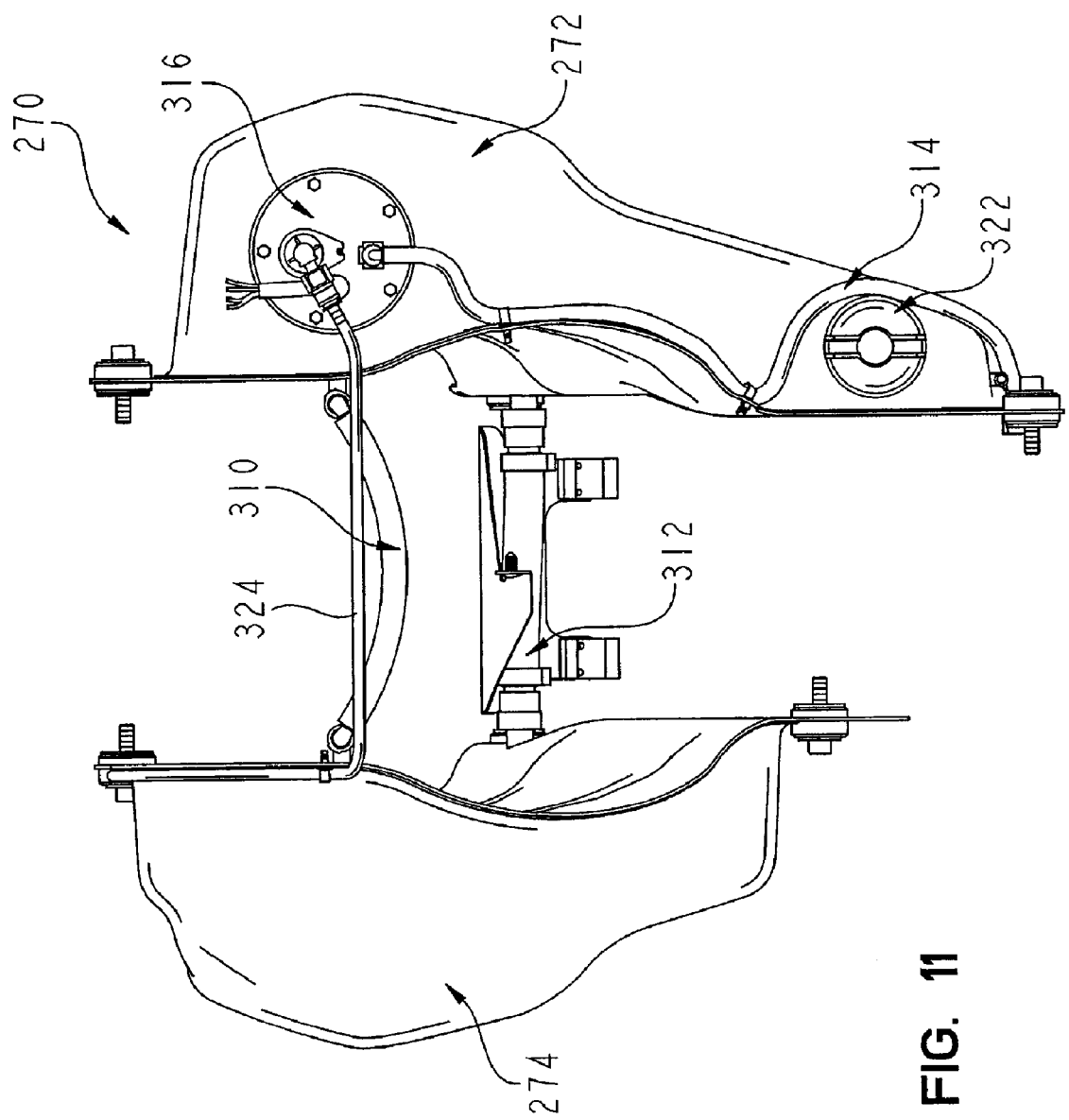
FIG. 11 is a top of the two fuel storage tanks of FIG. 10.

Referring to FIGS. 10 and 11, right side fuel storage tank 272 and left side fuel storage tank 274 are in fluid communication with each other through an upper fluid conduit 310 and a lower fluid conduit 312. Fuel is provided from fuel storage system 270 through a fuel line 314 to engine 124. Fuel line 314 is connected to a fuel pump 316 located in right side fuel storage tank 272. Fuel pump 316 pumps fuel from the interior of right side fuel storage tank 272 through fuel line 314 to engine 124. In one embodiment, fuel pump 316 has an integrated roll-over valve built into it as a safety precaution. Also connected to fuel pump 316 is a vent line 324 which is coupled to canister (not shown) filled with filter-activated charcoal.

Figure 2:
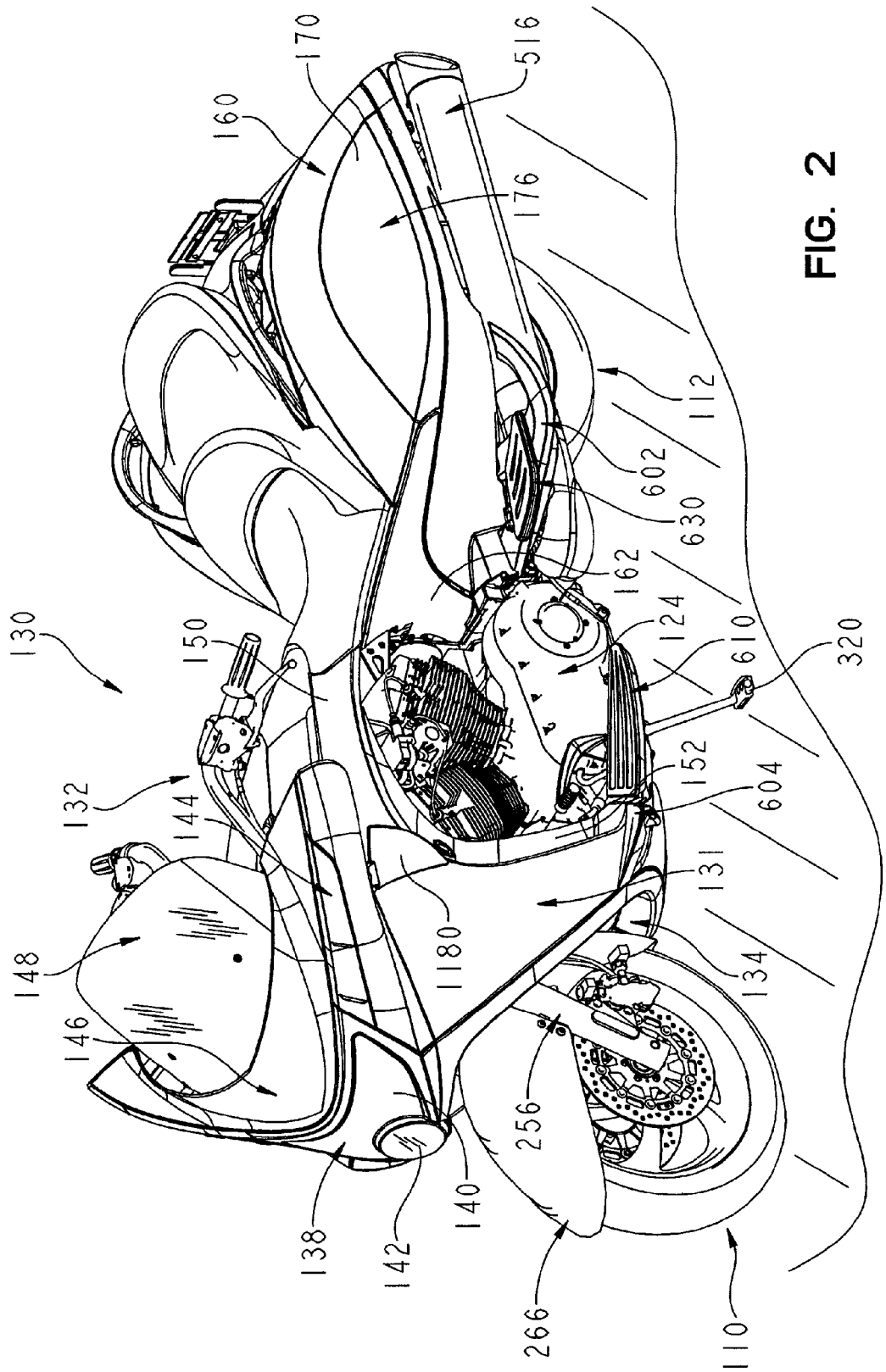
FIG. 2 is an perspective view of the two-wheeled vehicle of FIG. 1.

As shown in FIG. 2, vehicle 100 includes a side stand 320. Vehicle 100, like many motorcycles, is supported by front wheel 110, rear wheel 112, and side stand 320 when an operator is not positioned on vehicle 100. One of example of when this is likely the case is when an operator is introducing fuel into fuel storage system 270. To introduce fuel into fuel storage system 270, a gas cap 322 is removed from right side fuel storage tank 272. Gas is then introduced into right side fuel storage tank 272. In one embodiment, storage tank 272 includes a filler neck (not shown) that extends down into tank 272 from gas cap 322 which controls the amount of fuel that may be put in tank 272 and tank 274. Fuel in right side fuel storage tank 272 travels through line 312 into left side fuel storage tank 274 due to the leaning of vehicle 100 to the left side because vehicle 100 is supported on side stand 320. Line 310 connects the airspace above the fuel in left side fuel storage tank 274 and right side fuel storage tank 272. As fuel travels from right side fuel storage tank 272 into left side fuel storage tank 274 air is displaced through line 310 from left side fuel storage tank 274 into right side fuel storage tank 272.

In one embodiment, gas cap 322 includes a vapor and pressure release valve. The vapor and pressure release valve prevents the presence of unwanted pressure fluctuations being present in fuel storage tanks 272, 274. For example, if line 324 gets pinched and the fuel pump 316 continues to pump fuel out of tank 272, tank 272 may implode unless air is permitted to enter tank 272 through the vapor and pressure release valve of gas cap 322.

Returning to FIG. 5, a swing arm 380 is rotatably coupled to rear frame member 184 through a pivot shaft 382. Swing arm 380 may rotate downward in direction 384 away from rear frame member 184 and upward in direction 386 toward rear frame member 184. Swing arm 380 includes a left arm 390, a right arm 392 and a middle portion 394. Rear wheel 112 is received in the area 396 between left arm 390 and right arm 392 and rearward of middle portion 394. In one embodiment, swing arm 380 is a one-piece casting. In one example, swing arm 380 is cast through a lost core process.

Figure 15:
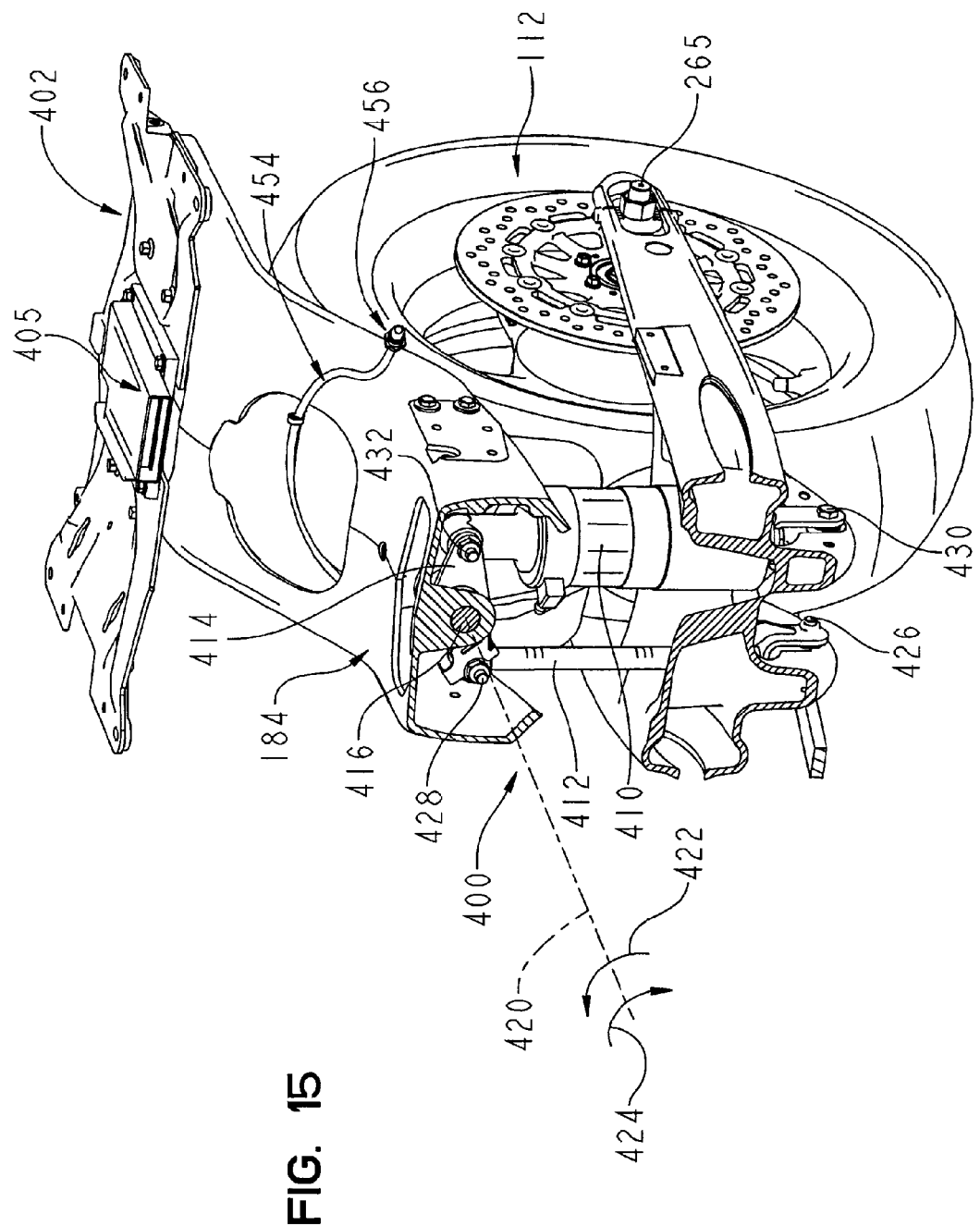
FIG. 15 is a front perspective view with the rear frame member shown in section to illustrate the rear suspension.

As explained herein, a rear suspension 400 is coupled to swing arm 380 through middle portion 394. Referring to FIGS. 13-15, rear suspension 400 is shown.

Referring to FIG. 13, rear frame member 184 and swing arm 380 are shown assembled. Further, rear wheel 112 is shown assembled to swing arm 380. In one embodiment, rear axle 265 is coupled to swing arm 380 with a clip. Additional details regarding the coupling of an axle to a chassis are found in U.S. patent application Ser. No. 11/085,754, filed Mar. 21, 2005, published as U.S. Published Patent Application No. US2006-0226631A1, the disclosure of which is expressly incorporated by reference herein.

Further, a support bracket 402 is shown attached to rear frame member 184. Support bracket 402 supports saddlebags 176 and 178 and other components of the rear body of two-wheeled vehicle 100. Saddlebag 176 is supported by a left portion 404 of support bracket 402 and saddlebag 178 is supported by a right portion 406 of support bracket 402.

Support bracket 402 also serves as a heat sink for the electronic control module ("ECM") 405 of vehicle 100 which is supported by a middle portion 408 of support bracket 402. ECM 405 is bolted or otherwise coupled to support bracket 402 which is bolted or otherwise coupled to rear frame member 184. In one embodiment, support bracket 402 is made of aluminum and rear frame member 184 is also made of aluminum. The aluminum of support bracket 402 and rear frame member 184 dissipates the heat produced by the electrical components, such as a processor, of ECM 405.

As shown in the FIG. 13, rear frame member 184 and swing arm 380 are rotatably coupled through a first connection, pivot shaft 382. A second connection is made between rear frame member 184 and swing arm 380 through rear suspension 400. In one embodiment, swing arm 380 and rear suspension are coupled to the frame in less than three locations. In one embodiment, swing arm 380 and rear suspension are coupled to the frame in two locations.

Referring to FIG. 15, rear suspension 400 includes a shock absorber 410, a pushrod 412, and a connecting link 414. The linkage of pushrod 412 and connecting link 414 scale the movement of the shock absorber 410 by a multiplication factor to correlate to the movement of swing arm 380.

As shown in FIG. 15, connecting link 414 is rotatably connected to rear frame member 184 through a pivot pin 416 and associated bearing and rotatable about a horizontal axis 420 in directions 422, 424. Pushrod 412 is rotatably coupled to swing arm 380 through a coupler 426 received in a rubber bushing and is rotatably coupled to connecting link 414 through a coupler 428. In one embodiment, coupler 428 is a spherical bearing along with a bolt and nut. Shock absorber 410 is rotatably coupled to swing arm 380 through a coupler 430 received in a rubber bushing and is rotatably coupled to connecting link 414 through a coupler 432. In one embodiment, coupler 432 is a spherical bearing along with a bolt and nut. Shock absorber 410 has shown in FIG. 15 is coupled to swing arm 380 and rear frame member 184 in a generally vertical orientation. In one embodiment, shock absorber 410 is an air shock available from KYB America LLC located at 140 N. Mitchell Court, Addison, Ill. 60101.

In one embodiment, shock absorber 410 is an air adjustable shock. Referring to FIG. 14, shock absorber 410 has a suspension adjuster coupled thereto, illustratively air line 454. The amount of air in shock absorber 410 may be adjusted upward or downward by adding air to shock absorber 410 or removing air from shock absorber 410, respectively. In one embodiment, an air inlet valve 456 is accessible from within rear bodywork 160. An operator may couple air inlet valve 456 to a standard air compressor to adjust the amount of air in shock absorber 410. By being capable to adjust the amount of air in air shock 410, an operator may adjust the ride height of vehicle 100 for the amount of cargo weight being carried.

Referring to FIG. 13A, air inlet valve 456 extends through an opening 181 in a saddlebag base member 175 and is secured to saddlebag base member 175 with a retainer 183, illustratively a nut. Saddlebag base member is coupled to support bracket 402 and rear frame member 184. The location of opening 181 is covered by saddlebag cover 179, when saddlebag cover 179 is in a closed position, such as shown in FIG. 1. As such, an operator would open saddlebag cover 179 to access air inlet valve 456 which extends through opening 181. By having opening 181 in a spaced apart location from storage compartment 177, an operator does not need to disturb and/or remove any cargo to access air inlet line 456.

Figures 16A, 16B:
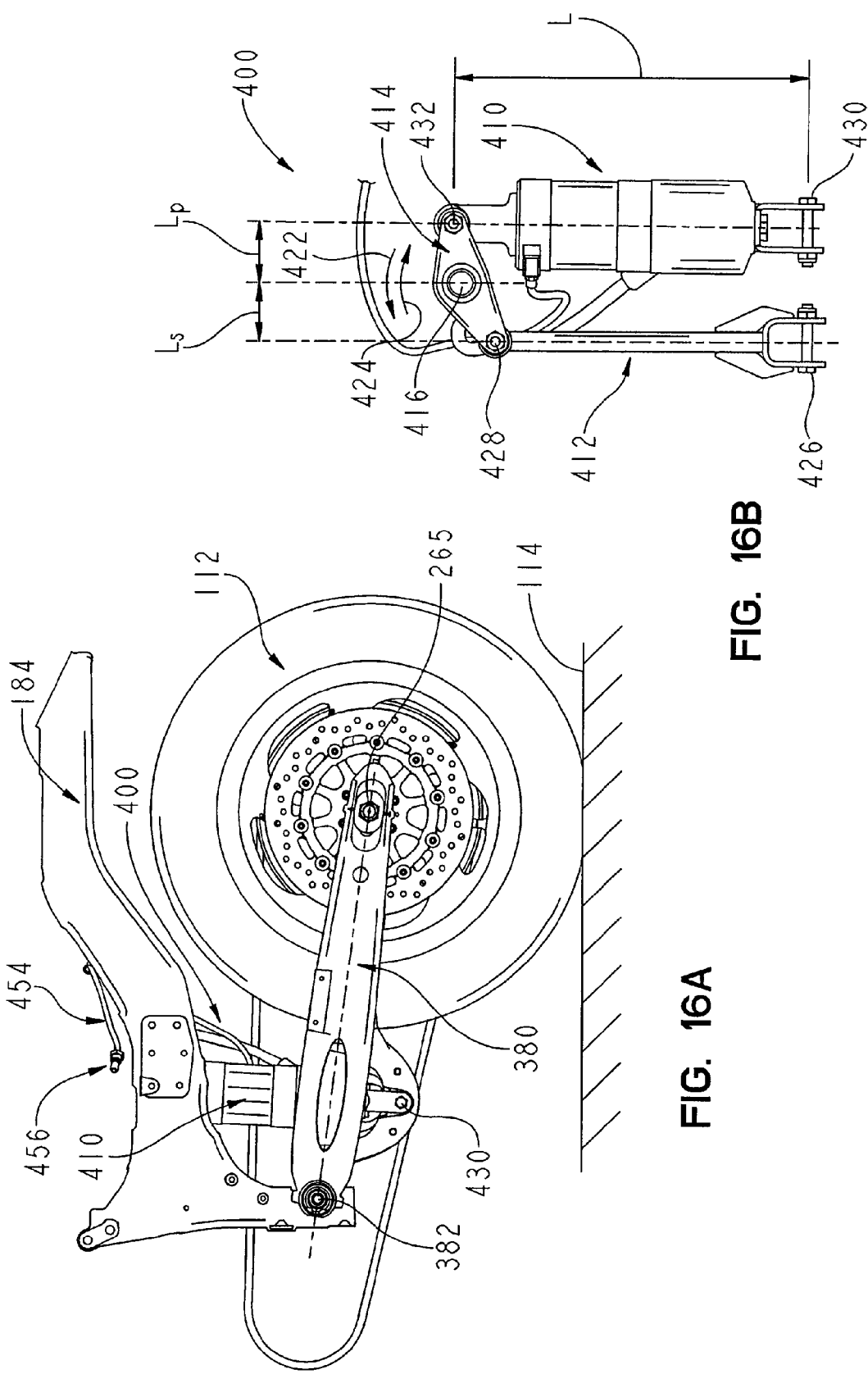
FIG. 16A is a side view of the assembly of FIG. 13 with the rear suspension being in an extended state.
FIG. 16B illustrates the rear suspension in the extended state corresponding to FIG. 16A.

As shown in FIG. 16A, rear suspension 400 is arranged such that pushrod 412 and connecting link 414 move in a plane which is not parallel to the centerline plane 116 of vehicle 100. In the illustrated embodiment, pushrod 412 and connecting link 414 move in a plane which is perpendicular to the centerline plane 116 of the vehicle 100. In one embodiment, pushrod 412 and connecting link 414 move in multiple planes, each of which is not parallel to the centerline plane.

Referring to FIGS. 16-19, the operation of rear suspension 400 is described. As described herein, rear suspension 400 exhibits a generally constant motion ratio through the travel range of rear suspension 400. In one embodiment, rear suspension 400 is arranged so that pushrod 412 and connecting link 414 move in a plane which is not parallel to the centerline plane 116 of vehicle 100, but the motion ratio of rear suspension 400 is one of either a linear rising rate through the travel range of rear suspension 400 or a generally linear falling rate through the travel range of rear suspension 400. In one embodiment, rear suspension 400 is arranged so that pushrod 412 and connecting link 414 move in a plane which is parallel to the centerline plane 116 of vehicle 100 and the motion ratio of rear suspension 400 is generally constant through the travel range of rear suspension 400.

Figures 17A, 17B:
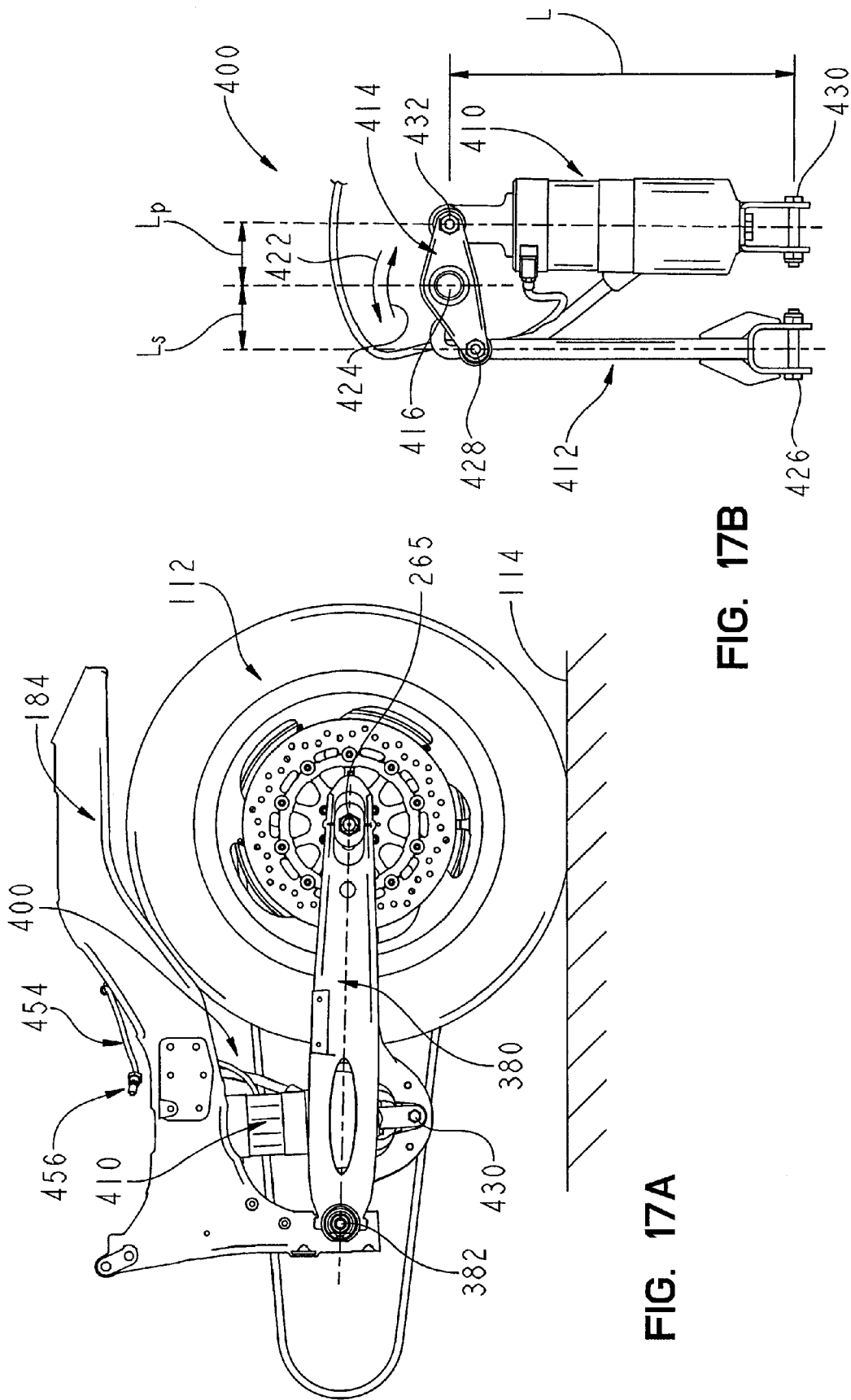
FIG. 17A is a side view of the assembly of FIG. 13 with the rear suspension being in a mid-travel state.
FIG. 17B illustrates the rear suspension in the mid-travel state corresponding to FIG. 17A.

FIG. 16A illustrates a side view of rear frame member 184, swing arm 380, rear wheel 112, and rear suspension 400 when rear suspension 400 is in an extended state. FIG. 16B illustrates rear suspension 400 when in the extended state of FIG. 16A. FIG. 17A illustrates a side view of rear frame member 184, swing arm 380, rear wheel 112, and rear suspension 400 when rear suspension 400 is in a mid-travel state. FIG. 17B illustrates rear suspension 400 when in the mid-travel state of FIG. 17A. FIG. 18A illustrates a side view of rear frame member 184, swing arm 380, rear wheel 112, and rear suspension 400 when rear suspension 400 is in a compressed state. FIG. 18B illustrates rear suspension 400 when in the compressed state of FIG. 18A. In one embodiment, rear suspension 400 has about 5 inches (about 12.7 centimeters) of rear suspension travel and a seat height ($d_1$ in FIG. 21) of up to about 26.5 inches (about 67.31 centimeters).

In the extended state shown in FIG. 16B, a length (L) of shock absorber 410 is extended. The upper coupler 432 connecting shock absorber 410 and connecting link 414 is generally higher than the upper coupler 428 connecting pushrod 412 and connecting link 414. Connecting link 414 is rotated from horizontal in direction 422. The extended state corresponds to a state wherein vehicle 100 is not supporting an operator, passenger, or cargo.

In the mid-travel state shown in FIG. 17B, due to the upward movement of swing arm 380 shock absorber 410 is compressed thereby reducing a length (L) of shock absorber 410 compared to the extended state. In one embodiment, a lower portion of shock absorber 410 moves upward with swing arm 380 and an upper portion of shock absorber 410 moves downward due to the rotation of connecting link 414. This may be due to the addition of an operator or cargo. The upper coupler 432 connecting shock absorber 410 and connecting link 414 is lower compared to the extended state and the upper coupler 428 connecting pushrod 412 and connecting link 414 is higher compared to the extended state. Connecting link 414 is rotated in direction 424 relative to the extended state.

In the compressed state shown in FIG. 18B, a length (L) of shock absorber 410 is reduced compared to the mid-travel state. This may be due to the addition of both an operator and cargo and/or the further addition of a passenger. The upper coupler 432 connecting shock absorber 410 and connecting link 414 is lower compared to the mid-travel state and the upper coupler 428 connecting pushrod 412 and connecting link 414 is higher compared to the mid-travel state. Connecting link 414 is rotated in direction 424 relative to the mid-travel state.

Figure 19:
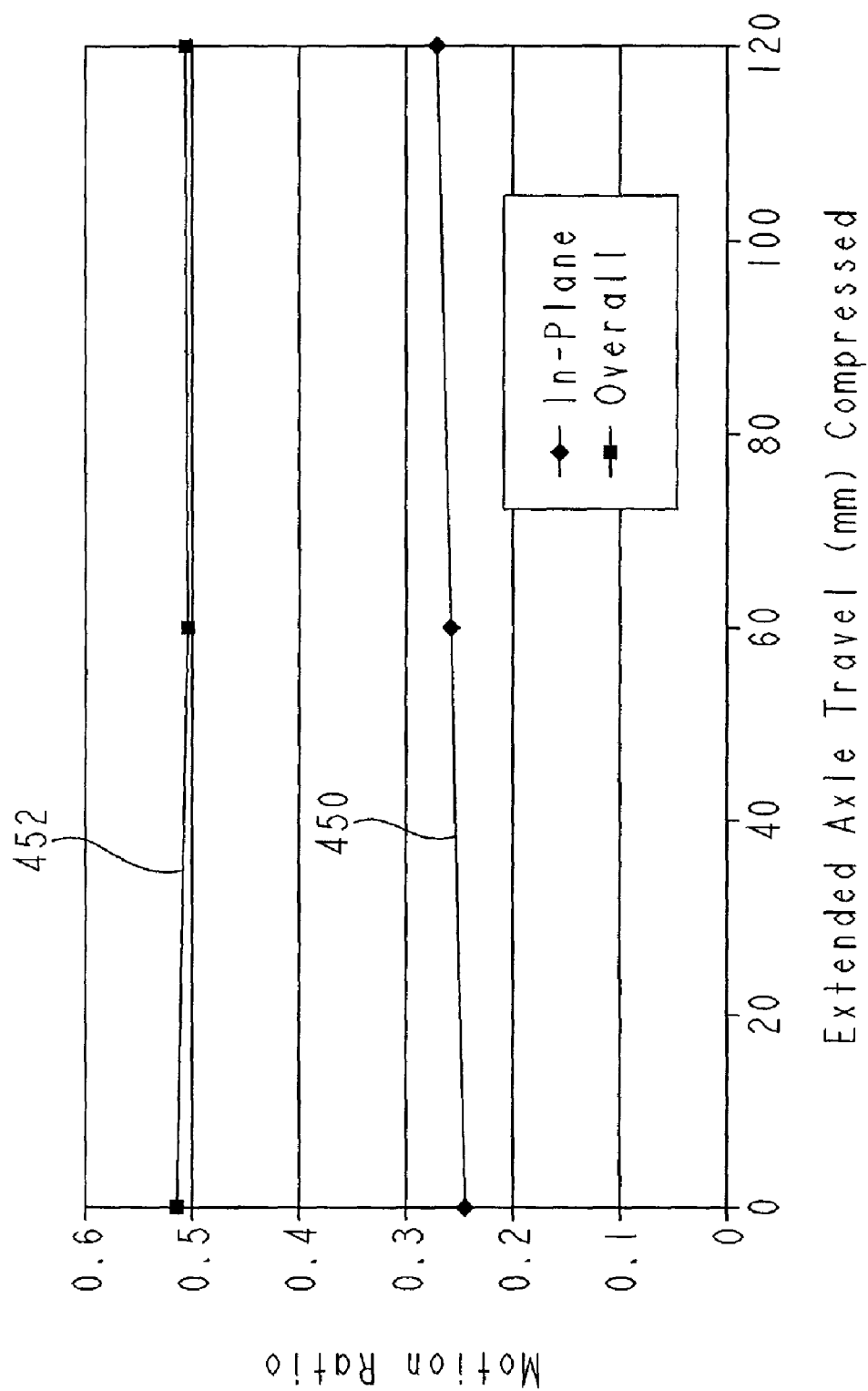
FIG. 19 illustrates an exemplary motion ratio for the rear suspension of FIG. 13.

As mentioned herein, rear suspension 400 has a generally constant overall motion ratio (MR) through the suspension travel. Motion ratio is the rear axle 265 displacement divided by the shock absorber 410 displacement. Referring to FIG. 19, as represented by line 450 when considering only the movement from a side view (FIGS. 16A, 17A, 18A) which is in-plane with the centerline plane 116 of vehicle 100 the motion ratio of rear suspension 400 is progressive or increasing with the extent of the travel. The motion ratio when considering only the in-plane movement may be calculated as the ratio of the length of the lever arm causing the linkage of rear suspension 400 to move (the horizontal distance from the pivot of the swing arm 380 with rear frame member 184 to rear axle 265) and the length of the lever arm that the linkage works through (the perpendicular distance from the pivot of the swing arm 380 with rear frame member 184 to the pivot of the shock absorber and the swingarm). In one embodiment, the motion ratio from the side view increases about 10.3% as the swingarm moves upward.

In contrast, the movement of the linkage, pushrod 412 and connecting link 414, is arranged in one embodiment to achieve a regressive motion ratio of about 26%. When combined with the progressive nature of the shock absorber 410 and the progressive in-plane motion ratio, a generally constant motion ratio is achieved. The geometry of the connecting link 414 and the placement of the pivot points (couplers 428, 432) dictate the motion ratio of the linkage. In one embodiment, the pivot locations of couplers 428, 430 are designed to give an overall generally constant motion ratio which is less than about 1.5. In the illustrated embodiment, the pivot locations of couplers 428, 430 are designed to give an overall linkage motion ratio of approximately 0.5, and to ensure that this motion ratio is constant through the suspension travel range. The overall motion ratio of rear suspension 400 is represented by line 452 in FIG. 19.

The calculation of the overall motion ratio may be carried out as follows. The motion ratio (MR) may be found from equation 1

$$MR = \frac{Dshock}{Daxle} \qquad (1)$$

wherein MR=Motion ratio; Dshock=Displacement (change in length) of shock absorber 410; and Daxle=Displacement of rear axle 265.

The displacement of the shock absorber 410 may be found from equation 2

$$Dshock = Dtop + Dbottom \qquad (2)$$

wherein Dtop=Displacement of top of shock absorber 410 relative to the motorcycle chassis 180 and Dbottom=Displacement of the bottom of the shock absorber 410 relative to the motorcycle chassis 180. Dbottom may also be expressed as $$Dbottom = Daxle \frac{Llinkage}{Lswingarm} \qquad (3)$$

wherein Llinkage=The perpendicular distance between the swingarm pivot and the shock absorber axis and Lswingarm=the perpendicular distance between the swingarm pivot and the centerline of the rear axle. Dtop may also be expressed as $$Dtop = Dbottom\left(\frac{Ls}{Lp}\right) = Daxle\left(\frac{Llinkage}{Lswingarm}\right)\left(\frac{Ls}{Lp}\right) \qquad (4)$$

wherein Ls=Perpendicular distance between the shock absorber axis and the pivot of connecting link 414 and Lp=Perpendicular distance between the pushrod axis and the pivot of connecting link 414.

Substituting equations 3 and 4 into equation 2, Dshock may be expressed as $$Dshock = Daxle\left(\frac{Llinkage}{Lswingarm}\right) + Daxle\left(\frac{Llinkage}{Lswingarm}\right)\left(\frac{Ls}{Lp}\right) \quad (5a)$$

$$Dshock = Daxle\left(\frac{Llinkage}{Lswingarm}\right)\left(1 + \frac{Ls}{Lp}\right) \quad (5b)$$

Further, as stated in equation 1, MR is the ratio of Dshock to Daxle. Therefore, MR may be expressed as $$\frac{Dshock}{Daxle} = \left(\frac{Llinkage}{Lswingarm}\right)\left(1 + \frac{Ls}{Lp}\right) \quad (6a)$$

$$MR = \left(\frac{Llinkage}{Lswingarm}\right)\left(1 + \frac{Ls}{Lp}\right) \quad (6b)$$

The graph in FIG. 19 may be generated based on equations 1-6. Again, line 450 represents the progressive nature of the in-plane portion of the motion ratio that would be seen if there was no connecting link 414 or pushrod 412, and the shock absorber 410 was connected to swing arm 380 at the bottom and chassis 180 at the top. Line 452 represents the overall motion ratio and shows the effect of the added linkage components on the overall motion ratio. As can be seen on the graph in FIG. 19, the in-plane linkage is progressive, but the overall motion ratio is constant through the travel range. In one embodiment, the generally constant motion ratio is a desirable characteristic for good ride comfort.

In one embodiment, two shock absorbers are used in place of rear suspension 400. Each shock absorber is connected to swing arm 380 and rear frame member 184.

Figure 21:
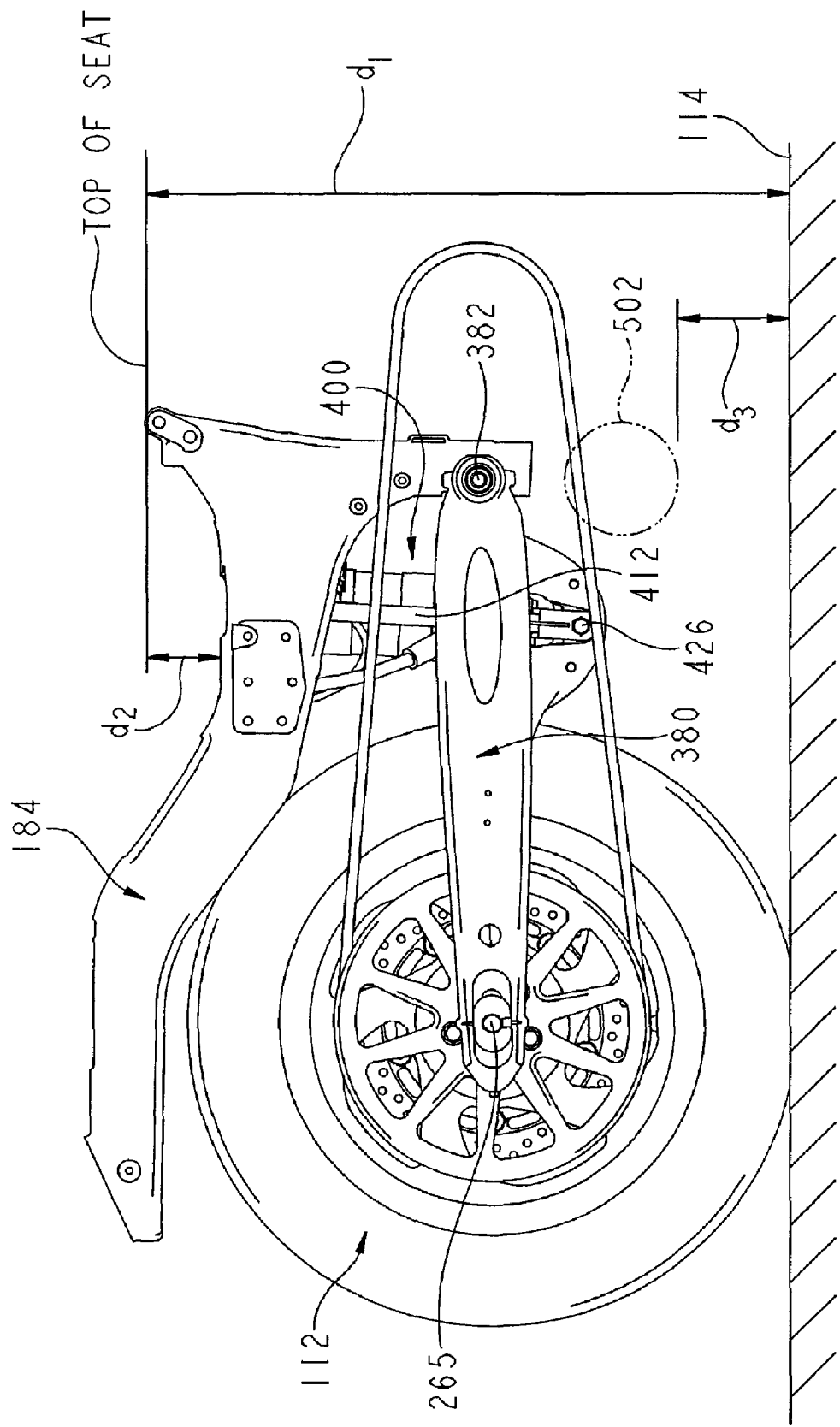
FIG. 21 is a side view of the assembly of FIG. 13 and illustrates the cross-over location of the exhaust system of FIG. 20.

Referring to FIG. 21, the configuration of rear suspension 400, permits the seat height location of vehicle 100 to be lowered. As shown in FIG. 21, a top surface of seat 102 in an area corresponding to where the operator would be seated is a distance $d_1$ from ground 114. The distance $d_1$ also takes into account a depth $d_2$ of padding positioned below the seat surface to cushion the ride of the operator. Exemplary padding includes foam. In one embodiment, the distance $d_1$ is about 26.5 inches (about 67.31 centimeters) and the distance $d_2$ is about 4.0 inches (about 10.16 centimeters) while maintaining a ground clearance $d_3$ of about 5 inches (about 12.7 centimeters) with the operator of about 180 pounds on vehicle 100 and no cargo. In one embodiment, the operator seat has a height above a lower portion of the location 502 of up to about 21.5 inches ($d_1$-$d_3$).

The configuration of rear suspension 400 also permits enough clearance to permit the exhaust system 500 to cross underneath swing arm 380 at a location 502. In one embodiment, the exhaust system 500 extends rearward from engine 124 towards rear wheel 112 passing in front of rear wheel 112 from a first side of vehicle 100 to a second side of vehicle 100 at a height lower than pivot axle 382.

Figure 20:
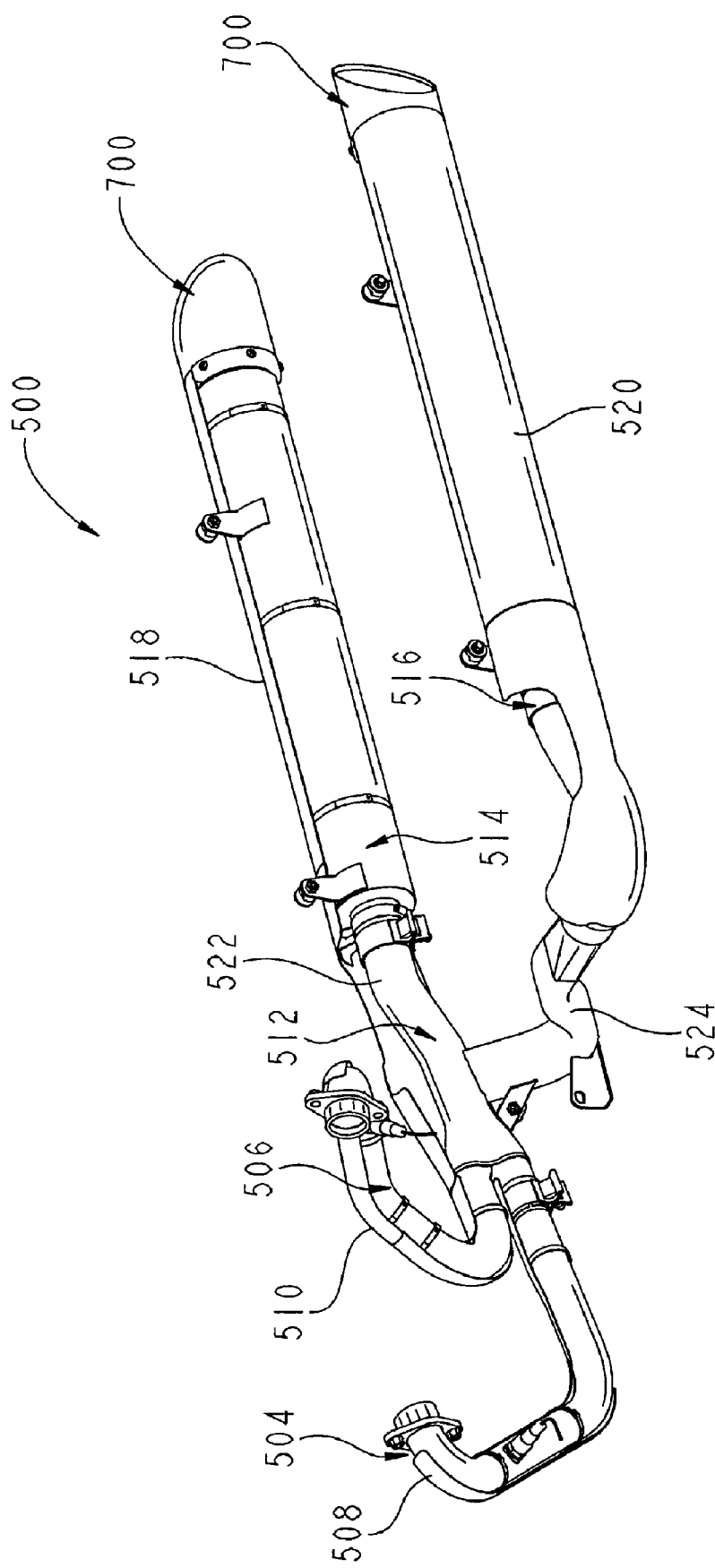
FIG. 20 is a perspective view of an exhaust system of the two-wheeled vehicle of FIG. 1.

Referring to FIG. 20, exhaust system 500 is shown. Exhaust system 500 includes a front headpipe 504 which connects to a front cylinder of engine 124 and a rear headpipe 506 which connects to a rear cylinder of engine 124. Each of front headpipe 504 and rear headpipe 506 has a respective weld-shield 508, 510 which covers an exterior of the respective headpipe 504, 506. Headpipes 504 and 506 are each connected to a cross-over section 512. Cross-over section 512 is connected to a right side muffler 514 and a left side muffler 516. Right side muffler 514 and a left side muffler 516 are each covered by a respective weld-shield 518, 520. Exhaust from engine 124 is communicated to headpipes 504 and 506 which in turn communicate the exhaust to cross-over section 512. Cross-over section 512 then communicates the exhaust to right side muffler 514 and left side muffler 516 which are in fluid communication with the atmosphere.

Cross-over section 512 includes a first section 522 which is connected to right side muffler 514 and a second section 524 which is connected to left side muffler 516. Right side muffler 514 is located on a right side of rear wheel 112. Left side muffler 516 is located on a left side of rear wheel 112. Second section 524 passes under swing arm 380 through location 502.

In one embodiment, vehicle 100 includes a tip-over system 600 which prevents an unwanted tip-over of vehicle 100 from a generally vertical position. In various situations, two-wheeled vehicles may tip over when left unattended or when being walked by an operator. This results in unwanted damage to various components, such as mirrors and body panels.

Referring to FIG. 4, tip-over apparatus 600 includes a left rear tip-over apparatus 602, a left front tip-over apparatus 604, a right rear tip-over apparatus 606, and a right front tip-over apparatus 608. Right front tip-over apparatus 608 is a mirror image of left front tip-over apparatus 604. Right rear tip-over apparatus 606 is a mirror image of left rear tip-over apparatus 602.

In one embodiment, vehicle 100 may be supported by either right front tip-over apparatus 608 and right rear tip-over apparatus 606 or left front tip-over apparatus 604 and left rear tip-over apparatus 602 when tipped from vertical to either the right side or the left side, respectively. Right front tip-over apparatus 608 and right rear tip-over apparatus 606 and left front tip-over apparatus 604 and left rear tip-over apparatus 602 are designed to support vehicle 100 when full of fuel and carrying about 65 pounds (about 29.48 kilograms) of cargo. The presence of right front tip-over apparatus 608 and right rear tip-over apparatus 606 and left front tip-over apparatus 604 and left rear tip-over apparatus 602 also prevent vehicle 100 from falling over on a leg of the operator pinning the operator under vehicle 100.

Referring to FIG. 2, left front tip-over apparatus 604 is located forward of footrest 610. Left front tip-over apparatus 604 is supported by chassis 180.

Figure 22:
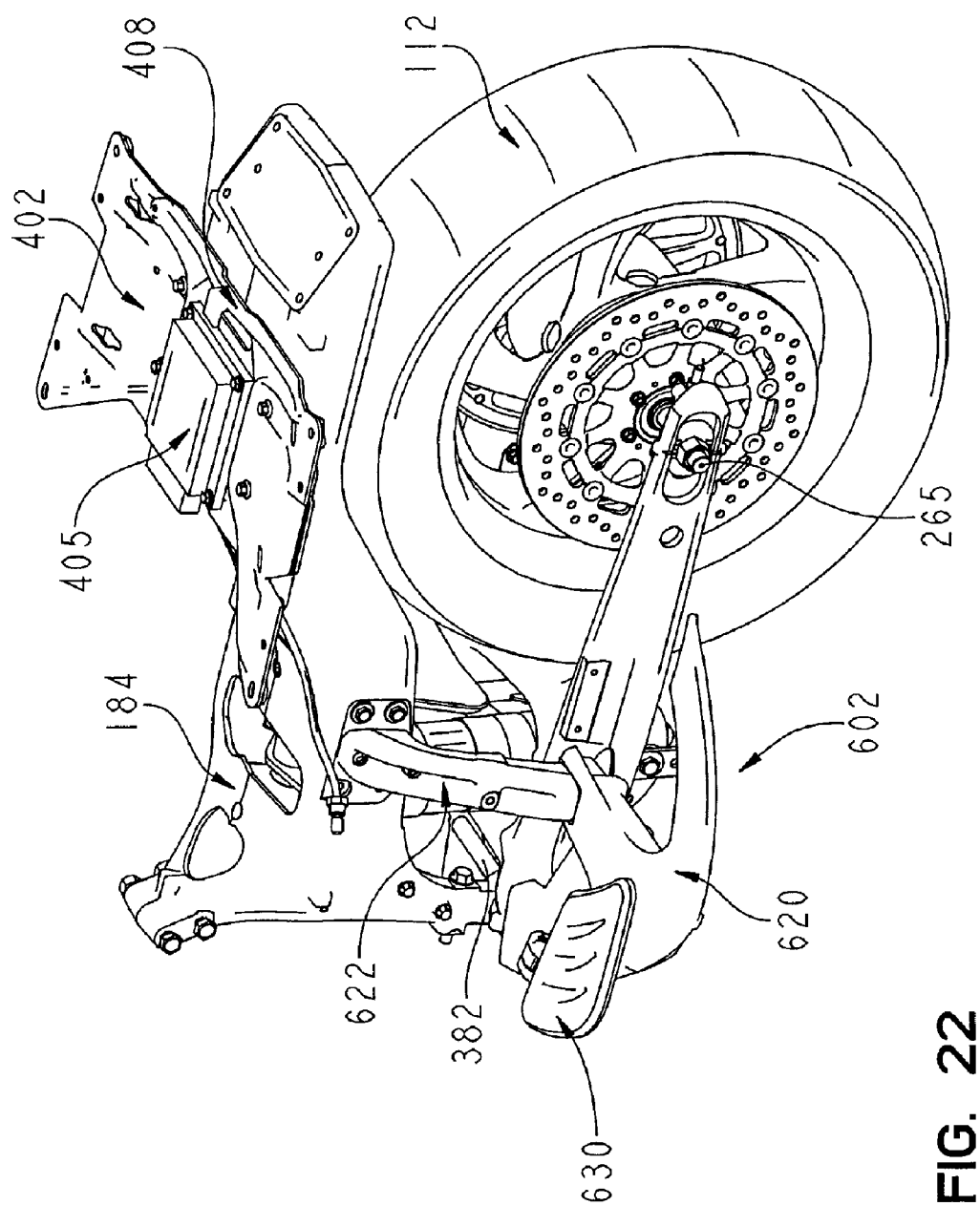
FIG. 22 is a perspective view of the assembly of FIG. 13 and a rear tip-over apparatus.
Figure 23:
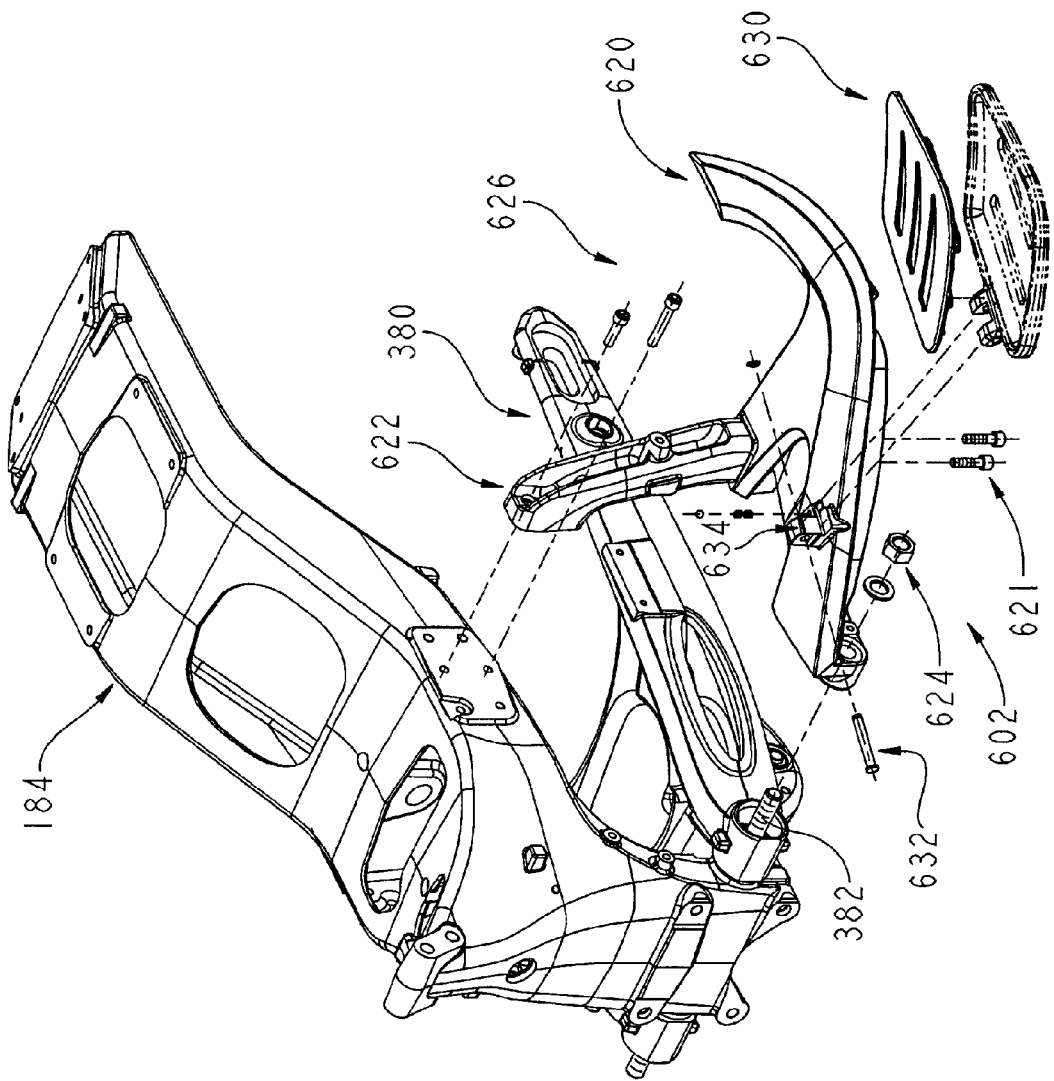
FIG. 23 is a perspective exploded assembly view of the rear tip-over apparatus of FIG. 22.

Referring to FIGS. 22 and 23, left rear tip-over apparatus 602 is shown. Referring to FIG. 23 left rear tip-over apparatus 602 includes a generally horizontally extending wing 620 and a generally vertically extending support member 622 coupled to the horizontally extending wing 620 through couplers 621.

The horizontally extending wing 620 is coupled to the swing arm pivot shaft 382. Swing arm pivot shaft 382 includes a threaded end section which cooperates with a fastener 624 to couple the horizontally extending wing 620 to the remainder of vehicle 100. The vertically extending support member 622 is coupled to rear frame member 184 with couplers 626. Left rear tip-over apparatus 602 is fixed to rear frame member 184 and does not move along with swing arm 380.

The horizontally extending wing 620 also serves as a support for a second set of footrests 630 which may be used by a passenger of vehicle 100. Footrests 630 are rotatably coupled to horizontally extending wing 620 through a coupler 632 which is received by a mounting feature 634 of horizontally extending wing 620.

Figure 24:
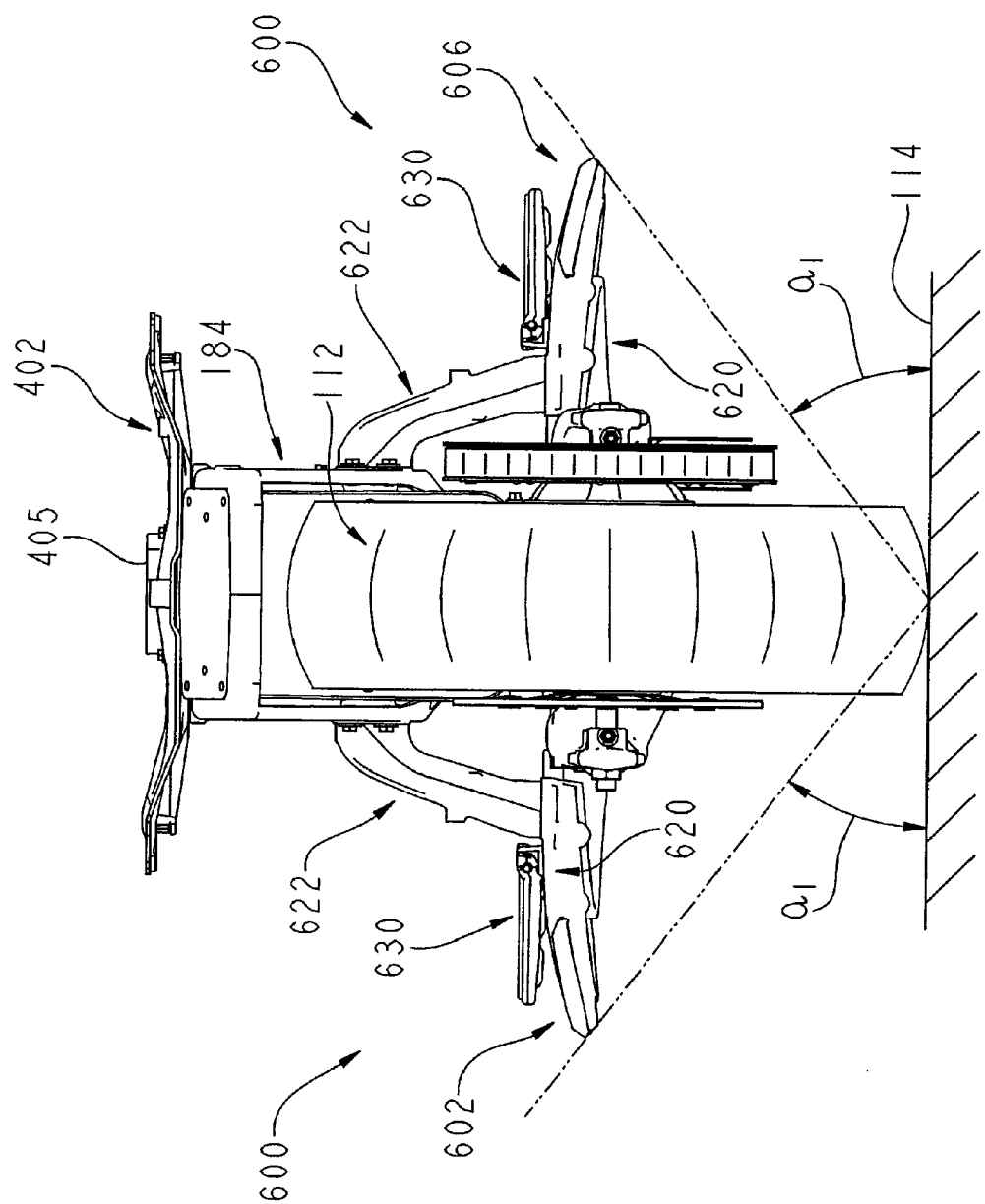
FIG. 24 is a rear view of the assembly of FIG. 13 including a left-side rear tip over apparatus and a right side rear tip-over apparatus.
Figure 25:
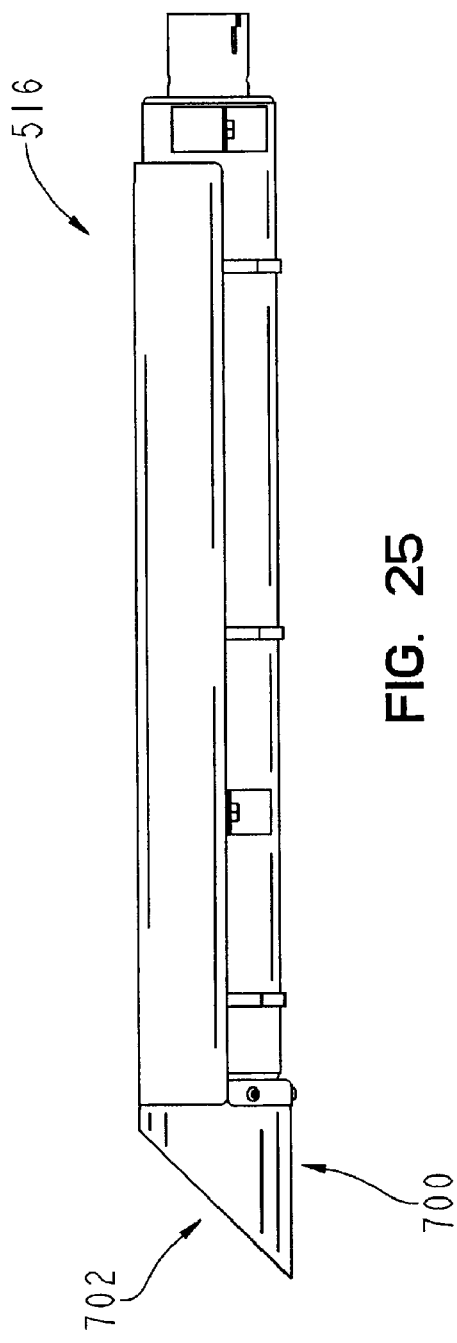
FIG. 25 is a top view of a left side muffler having an exhaust tip coupled thereto.

Referring to FIG. 24, tip-over system 600 permits vehicle 100 to tip to the left or right up to an angle $a_1$ relative to ground 114. At angle $a_1$ the front fairing 131 and saddlebags 176 and 178 are not in contact with ground 114 nor any other components of vehicle 100 except for front wheel 110, rear wheel 112, and tip over system 600. In one embodiment, angle $a_1$ is about 46°.

Referring to FIG. 6, front frame member 182 includes a handle 680. Handle 680 is part of the casting of front frame member 182. Handle 680 may be used to secure vehicle 100 during transport. In one embodiment, a rope or other tie-down member is secured to or through an opening 682 of handle 680 to secure vehicle 100 for transport. Handle 680 is positioned in front of fork journal 200. Therefore, the tie down location for vehicle 100 is positioned in front of the steering axis of vehicle 100 and above fender 266.

In one embodiment, an exhaust tip 700 is provided for attachment to one or both of left muffler 516 and right muffler 518. In one embodiment, exhaust tip 700 is an extruded component. The extruded component may have any interior structure as long as it permits the expelling of exhaust and contains no voids smaller than a 5/16 inch circle. The extruded component, in one embodiment, is made from a two dimensional die having a circular outer shape the same diameter as the muffler 516, such that the exhaust tip 700 also has the same diameter as the muffler 516. The two dimensional die also includes features which form the interior structure of exhaust tip 700.

The extruded component may have a first end 702 cut away at any angle or shape to produce a decorative look. A second end 704 is machined to remove internal structure so that it may receive an end portion of the respective muffler 516. It should be noted that the end portion of the respective muffler 516 has a smaller diameter than a main diameter of muffler 516 which generally is equal to the diameter of exhaust tip 700. The exhaust tip may accept a secondary surfacing, such as chroming or anodizing. The exhaust tip may be attached to the respective muffler through attachment hardware, such as screws.

In one embodiment, the exhaust tip 700 is manufactured in the following manner. First, a die is provided having a cross-sectional structure that dictates the internal structure of the exhaust tip 700. A material is forced through the die to produce an exhaust tip blank. An exemplary material is aluminum. A first end 702 of the exhaust tip blank is cut at an angle or otherwise provided with an aesthetically pleasing appearance. A second end 704 is machined to remove at least a portion of the internal cross-sectional structure of the exhaust tip 700.

Figure 30:
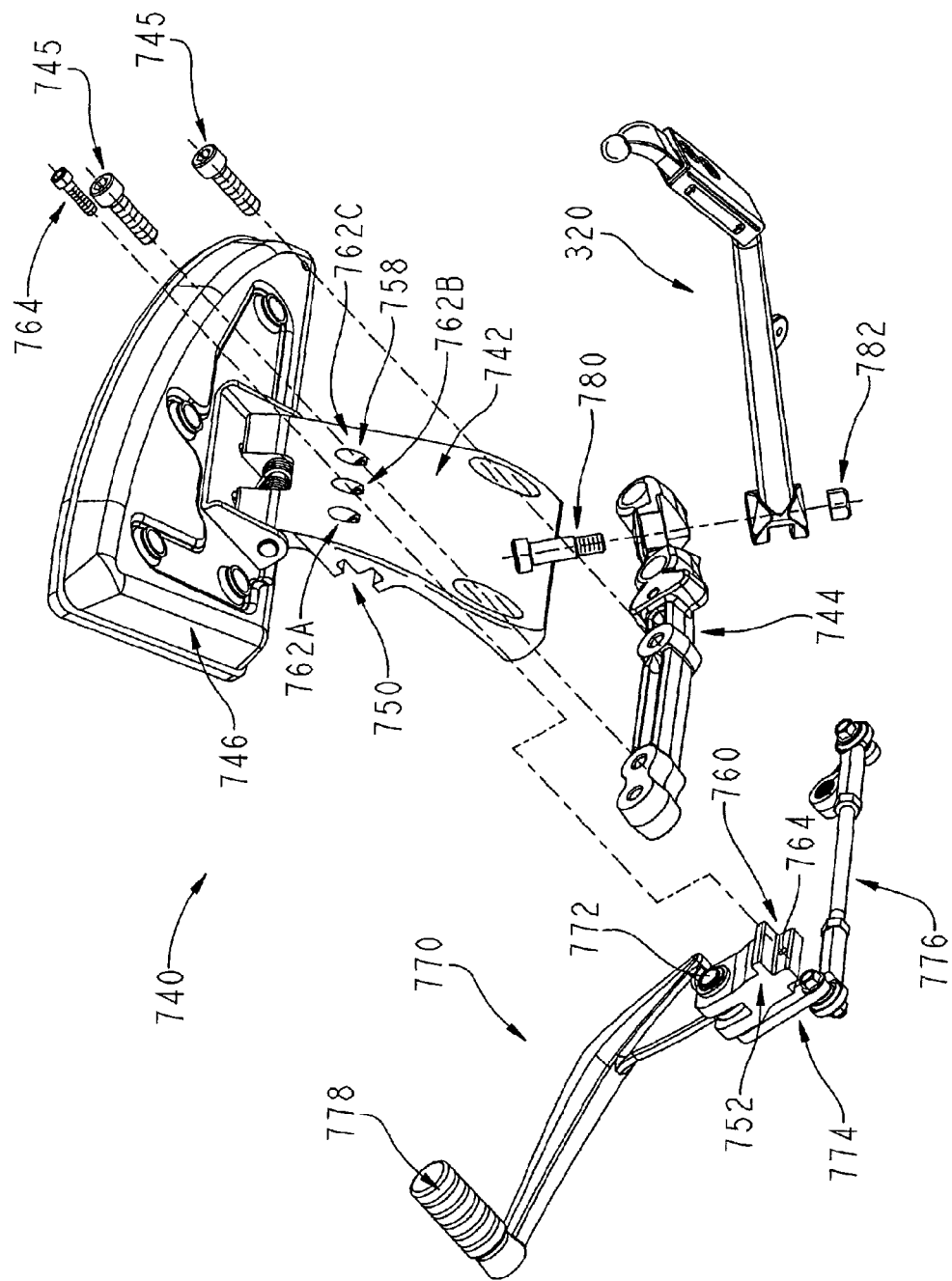
FIG. 30 is an exploded view of an exemplary adjustable foot control assembly.
Figure 31:
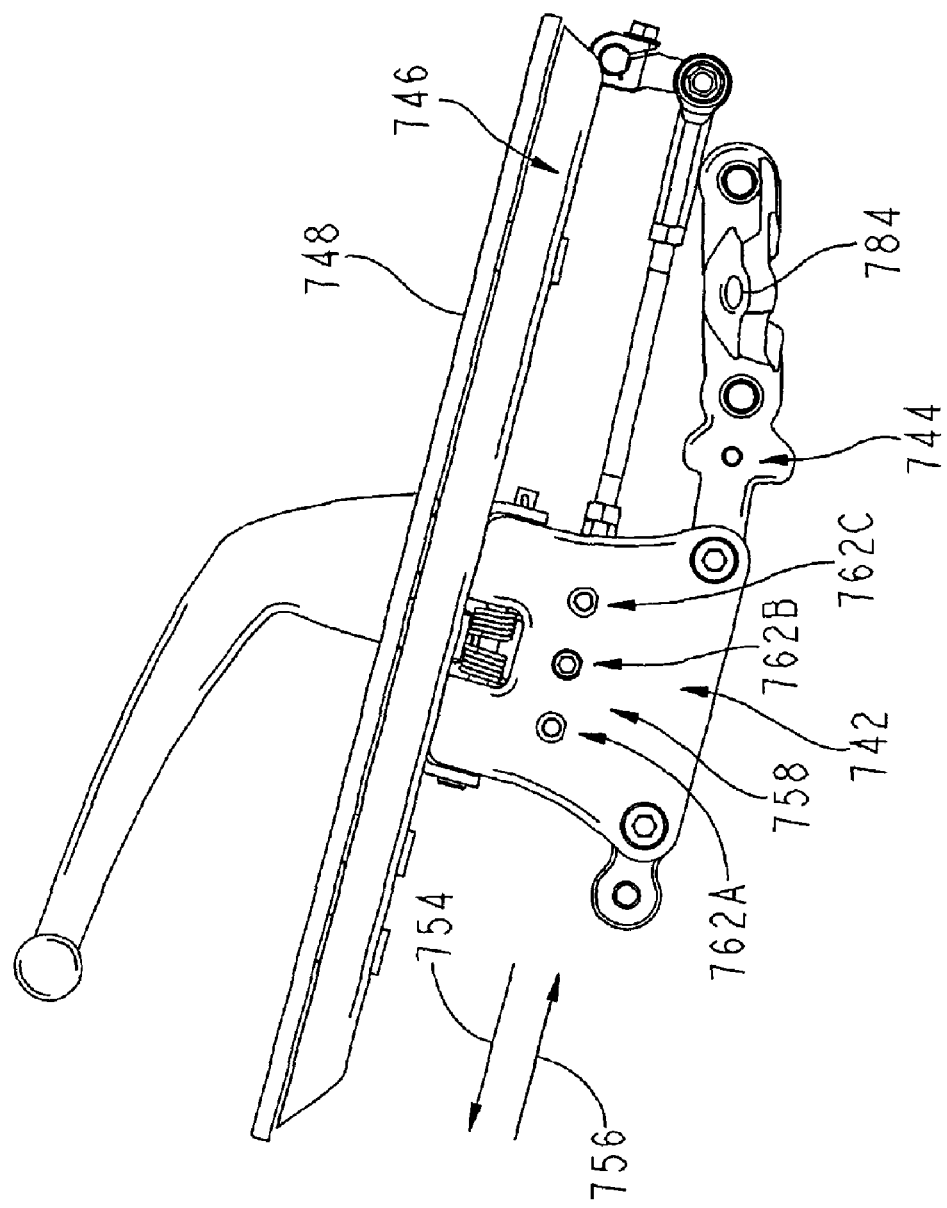
FIG. 31 is a side assembled view of the exemplary adjustable foot control assembly of FIG. 30.

Referring to FIGS. 30 and 31, a foot control assembly 740 is shown. As is known in the art, foot controls are used to control various functions of a two wheeled vehicle, such as braking and shifting. Foot control assembly 740 provides an adjustable foot control that may be positioned according to the size the operator.

Foot control assembly 740 includes a support 742 which mounts to a frame member 744 through couplers 745. Frame member 744 is in turn supported by front frame member 182 through additional frame members. Support 742 supports a foot rest 746 having an upper surface 748 upon which a foot of an operator may positioned. In the illustrative embodiment, foot rest 746 is rotationally coupled to support 742.

Support 742 further includes a channel 750 which receives a mount 752. Mount 752 and channel 750 have complementary shapes. Mount 752 is slidably received in channel 750 and is constrained to move along a first linear axis in directions 754 and 756. Directions 754 and 756, in one embodiment, are parallel to an upper surface 748 of foot rest 746, as shown in FIG. 31.

Support 742 and mount 752 each have a respective positioning system 758, 760 which is used to constrain the location of mount 752 relative to support 742 in directions 754 and 756. In the illustrated embodiment, support 742 includes a plurality of apertures 762A-C for positioning system 758 and mount 752 includes an aperture 764 for positioning system 760. Each of apertures 762A-C and aperture 764 are sized to receive a threaded bolt 764 which couples mount 752 to support 742. Threaded bolt 764 engages threads provided in aperture 764 of mount 752. Other positioning systems are also contemplated, such as detents, clamps, and other suitable positioning systems.

Apertures 762A-C are equally spaced along support 742 in a line and provide predetermined adjustment intervals that mount 752 may be moved to (and subsequently secured) along directions 754 and 756. In one embodiment, at least two apertures 762 are provided. In one embodiment, apertures 762A-C are replaced with an elongated slot which provides more freedom in locating mount 752 along directions 754, 756 with respect to support 742.

A foot control lever 770 is rotatably coupled to mount 752 through a pivot pin 772. Pivot pin 772 is further coupled to a first link 774 which is rotatably coupled to a second link 776. Second link 776 is coupled to another component of vehicle 100 to be controlled by control lever 770. Exemplary other components include the transmission and the brakes.

Foot control lever 770 is coupled to a foot peg 778. In operation, an operator rests their foot on upper surface 748 of foot rest 746. Then the operator moves his foot to actuate foot peg 778 either upwardly or downwardly. This, in turn, causes foot control lever 770 to rotate relative to pivot 772 which also causes first link 774 to rotate relative to pivot pin 772. The rotation of first link 774 further causes the movement of second link 776 in one of directions 754, 756.

The location of foot peg 778 may be adjusted along directions 754, 756 by moving mount 752 along channel 750 of support 742. This permits the location of foot control peg 778 to be adjusted to better match the leg length and foot size of the operator.

As also shown in FIG. 30, side stand 320 is coupled to frame member 744 through a coupler, illustratively a bolt 780 and nut 782. Side stand 320 is rotatably coupled to frame member 744. Bolt 780 is received in an opening 784 of frame member 744.

Referring to FIG. 32, the assembly of handlebars 132 to upper bracket 200 of steering assembly 130 is shown. Two couplers 790 are received into openings 792 in handlebar member 250 and openings in upper bracket 200 and secure handlebars 132 to upper bracket 200. In the illustrated embodiment, couplers 790 are threaded bolts and nuts. Further, disposed between upper bracket 200 and handlebars 132 are a plurality of isolators 794 which dampen the amount of vibration transferred from upper bracket 200 to handlebars 132. In one embodiment, isolators 794 are made of rubber. This reduces the amount of vibration or wobble experienced by an operator during operation of two-wheeled vehicle 100.

In one embodiment, handlebars 132 include weights (not shown) positioned proximate left and right grips 252, 254. The presence of the weights also assists in reducing the amount of vibration experienced by an operator of two-wheeled vehicle 100. In one embodiment, handlebar member 250 is made of aluminum and the weights are steel inserts. In one example, the weights are about one pound. In one embodiment, left and right grips 252, 254 are heated grips.

Referring to FIG. 33, handlebar member 250 includes a depression 251 which receives any cables running from the respective grip 252, 254 to the remainder of two-wheeled vehicle 100, such as brake cables, clutch cables, and cables to switch cubes 1450. Illustratively, the depression is a scallop. The cables are held in place with a plurality of cable ties 795. Referring to FIG. 8, a brake cable 796 is shown running from a brake lever 797 positioned proximate right grip 254 down handlebar member 250 to a brake caliper 798.

Referring to FIGS. 34-38, support bracket 402 supports saddlebags 176 and 178 and other components of the rear body of two-wheeled vehicle 100. Saddlebag 176 is supported by a left portion 404 of support bracket 402 and saddlebag 178 is supported by a right portion 406 of support bracket 402.

Figure 34:
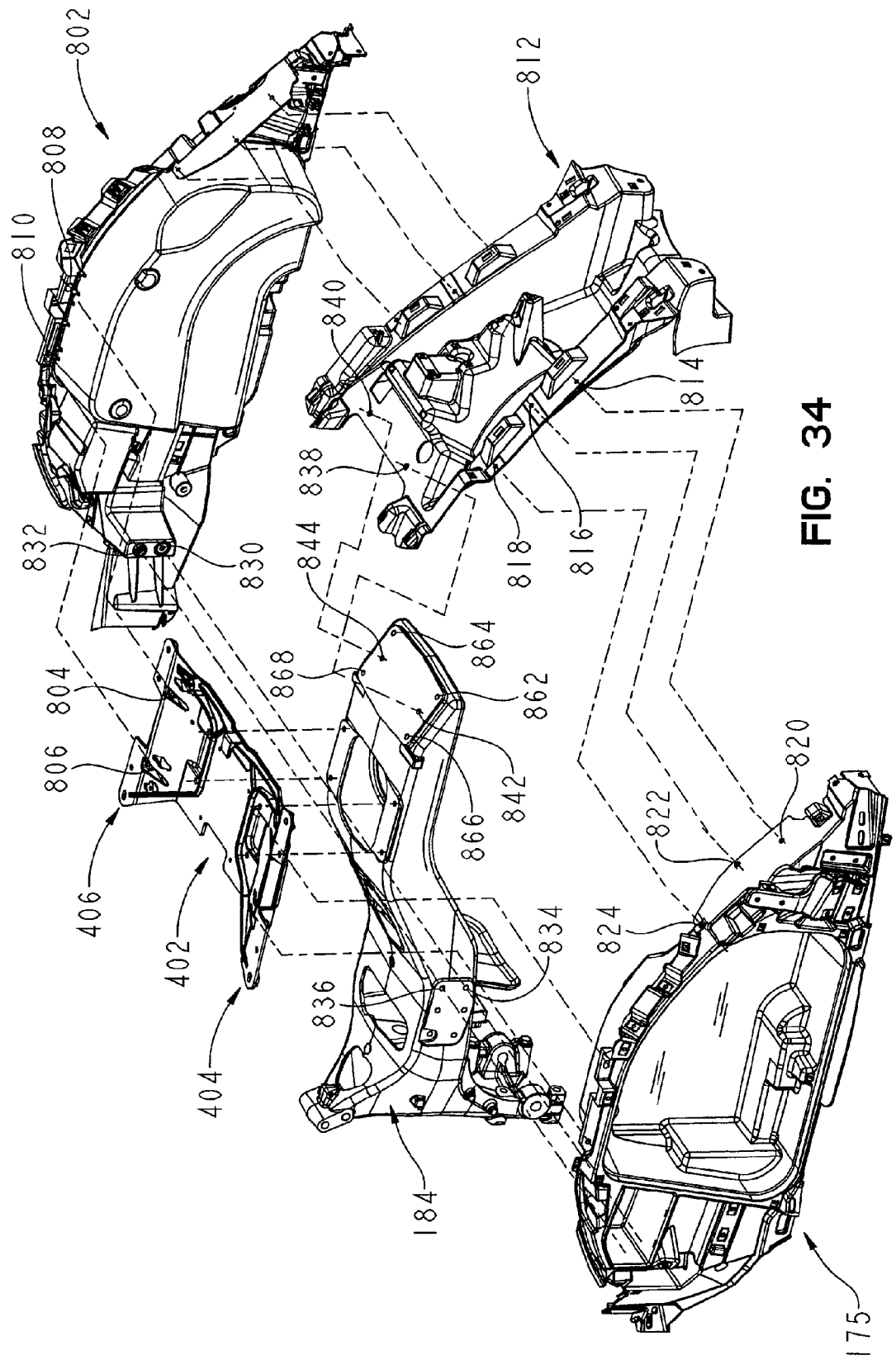
FIG. 34 is an exploded assembly view of portions of the rear of the two-wheeled vehicle.
Figure 35:
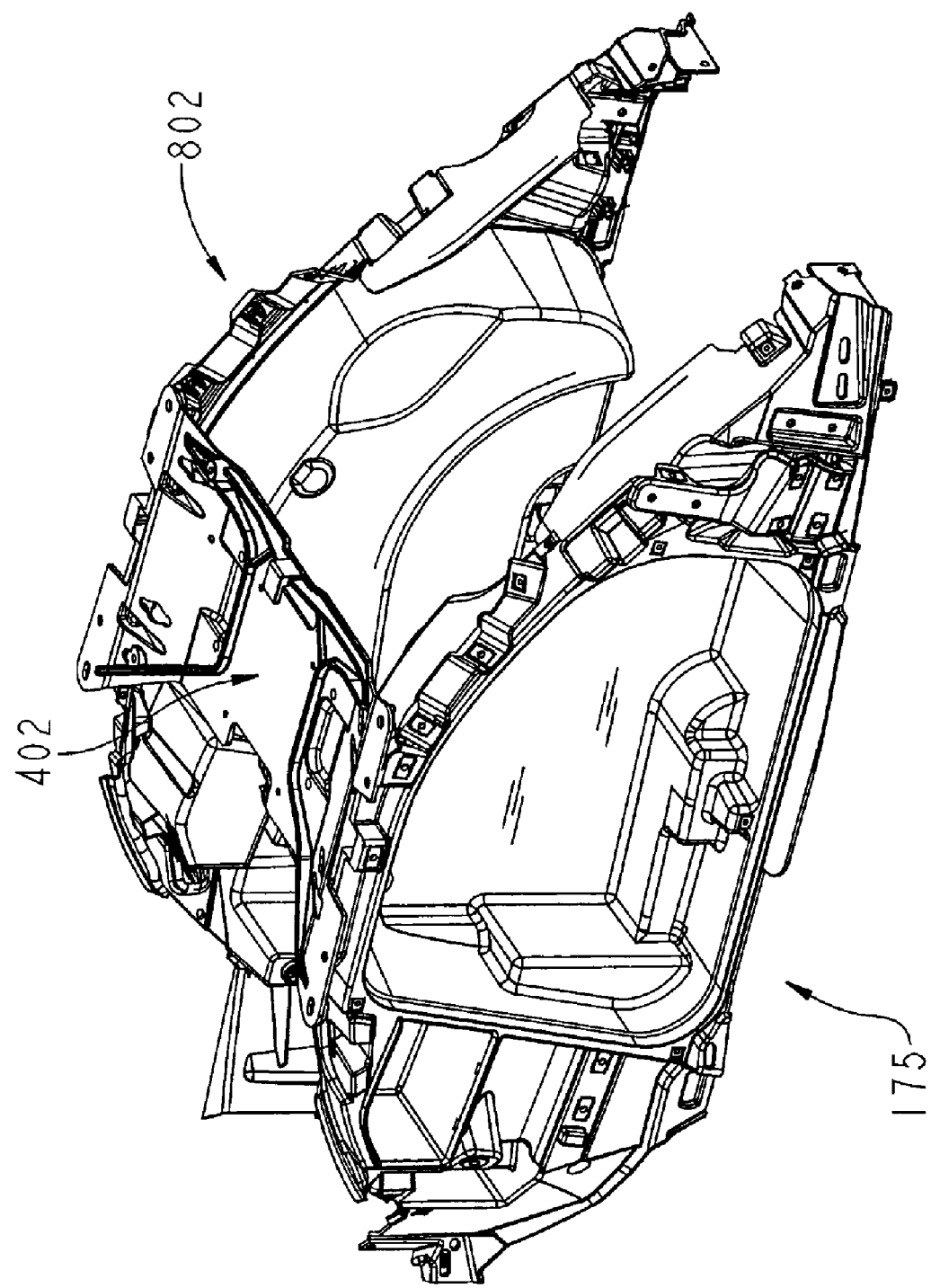
FIG. 35 is a perspective view of a support bracket having a left saddlebag base member and a right saddlebag base member supported therefrom.
Figure 36:
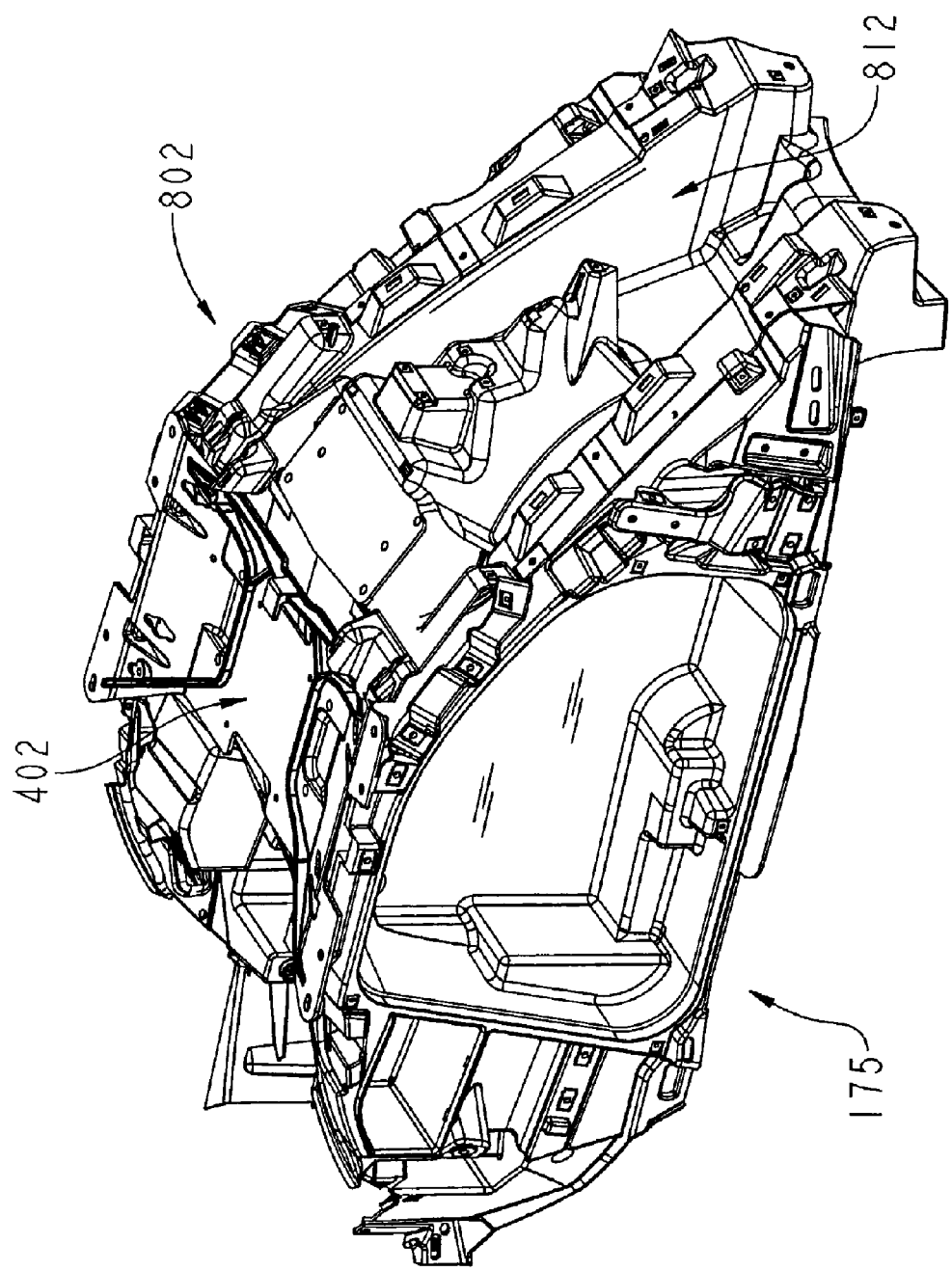
FIG. 36 is a perspective view of the assembly of FIG. 35 further including a rear base member coupled thereto.

Referring to FIG. 34, a left saddlebag base member 175 and a right saddlebag base member 802 are coupled to support bracket 402. As shown in FIG. 34, apertures 804 and 806 in support bracket 402 are aligned with apertures 808 and 810 of right saddlebag base member 802. Couplers, such as bolts, are received in these apertures and secure right saddlebag base member 802 to support bracket 402. Similar apertures and couplers secure left saddlebag base member 175 to support plate 402. Left saddlebag base member 175 and right saddlebag base member 802 are shown in an assembled position to support plate 402 in FIG. 35.

Referring to FIG. 34, a rear base member 812 is coupled to left saddlebag base member 175 and right saddlebag base member 802. As shown in FIG. 34, apertures 814, 816, and 818 is rear base member 812 are aligned with apertures 820, 822, and 824 of left saddlebag base member 175. Couplers, such as screws, are received in these apertures and secure rear base member 812 to left saddlebag base member 175. Similar apertures and couplers secure rear base member 812 to right saddlebag base member 802. Rear base member 812 is shown assembled to left saddlebag base member 175 and right saddlebag base member 802 in FIG. 36.

Referring back to FIG. 34, left saddlebag base member 175, right saddlebag base member 802, and rear base member 812 are all three coupled directly to rear frame member 184. Two apertures, such as apertures 830 and 832 in right saddlebag base member 802 are aligned with two apertures on frame member 184, such as apertures 834 and 836, which align with apertures on left saddlebag base member 175. Couplers, such as bolts, are received in these apertures and secure left saddlebag base member 175 and right saddlebag base member 802 to rear frame member 184. Apertures 838 and 840 in rear base member 812 align with apertures 862 and 864 in rear frame member 184. Couplers, such as bolts, are received in these apertures and secure rear base member 812 to rear frame member 184. Rear base member 812 is positioned over rear frame member 184. In one embodiment, the coupling of left saddlebag base member 175, right saddlebag base member 802, and rear base member 812 to rear frame member 184 is performed subsequent to the assembly of left saddlebag base member 175, right saddlebag base member 802, and rear base member 812 to support bracket 402 as discussed herein.

Figure 37:
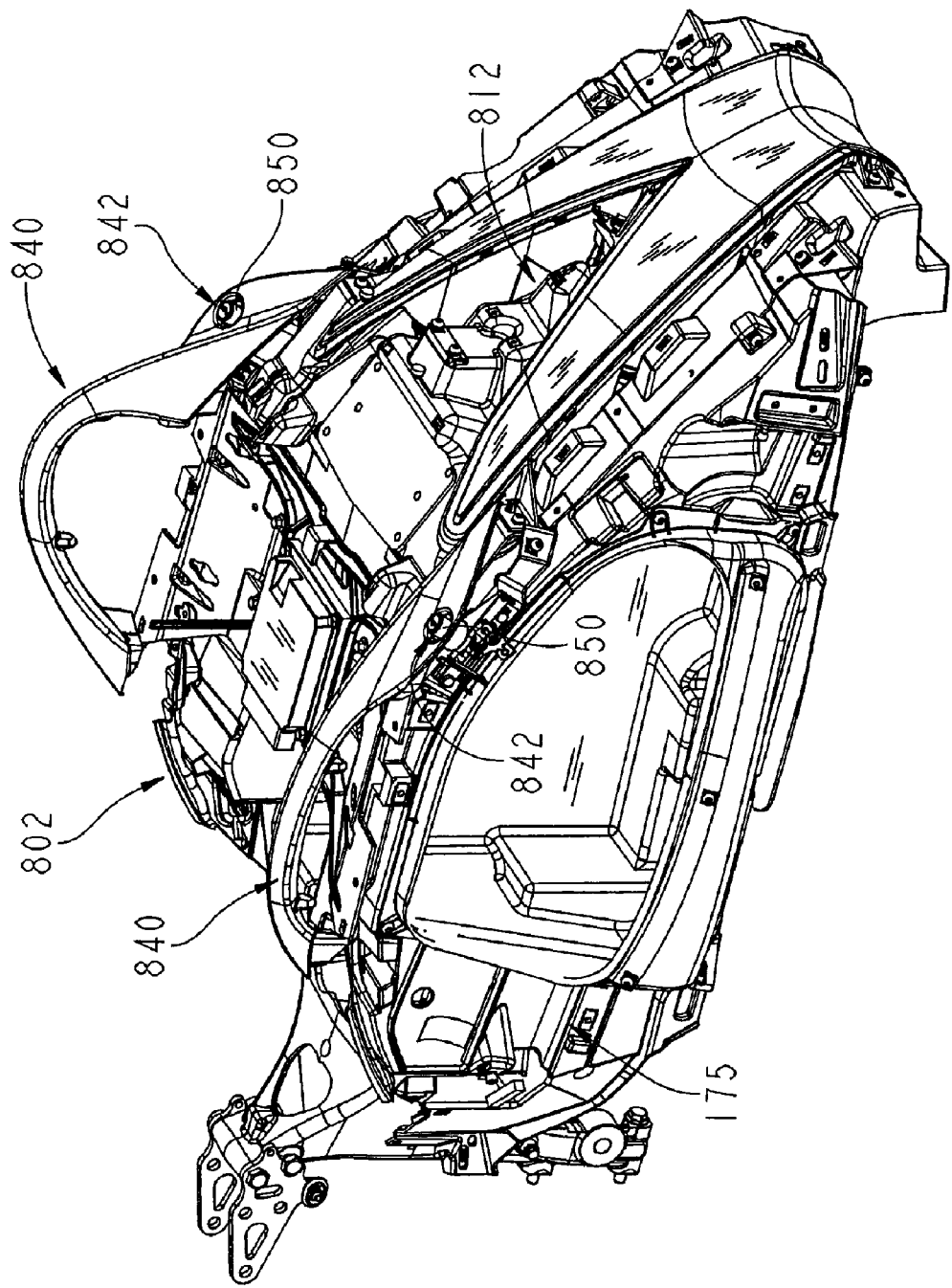
FIG. 37 is a perspective view of the assembly of FIG. 36 having handgrips and saddlebag locks coupled thereto.

Referring to FIG. 37, handgrips 840 are coupled to left saddlebag base member 175 and right saddlebag base member 802, respectively. Also, coupled to each of left saddlebag base member 175 and right saddlebag base member 802 is a lock 842 which is used to secure a respective saddlebag cover 844, 846 (see FIGS. 8 and 40) to saddlebag base member 175, 802, respectively. In the illustrated embodiment, locks 842 are push-button locks which are moved to an open configuration by depressing cylinder 850. It should be noted that rear frame member 184 is shown assembled in FIGS. 37 and 38. However, the entire rear bodywork 160 of vehicle 100 may be assembled and supported by support plate 402 prior to rear frame member 184 being assembled thereto.

Figure 38:
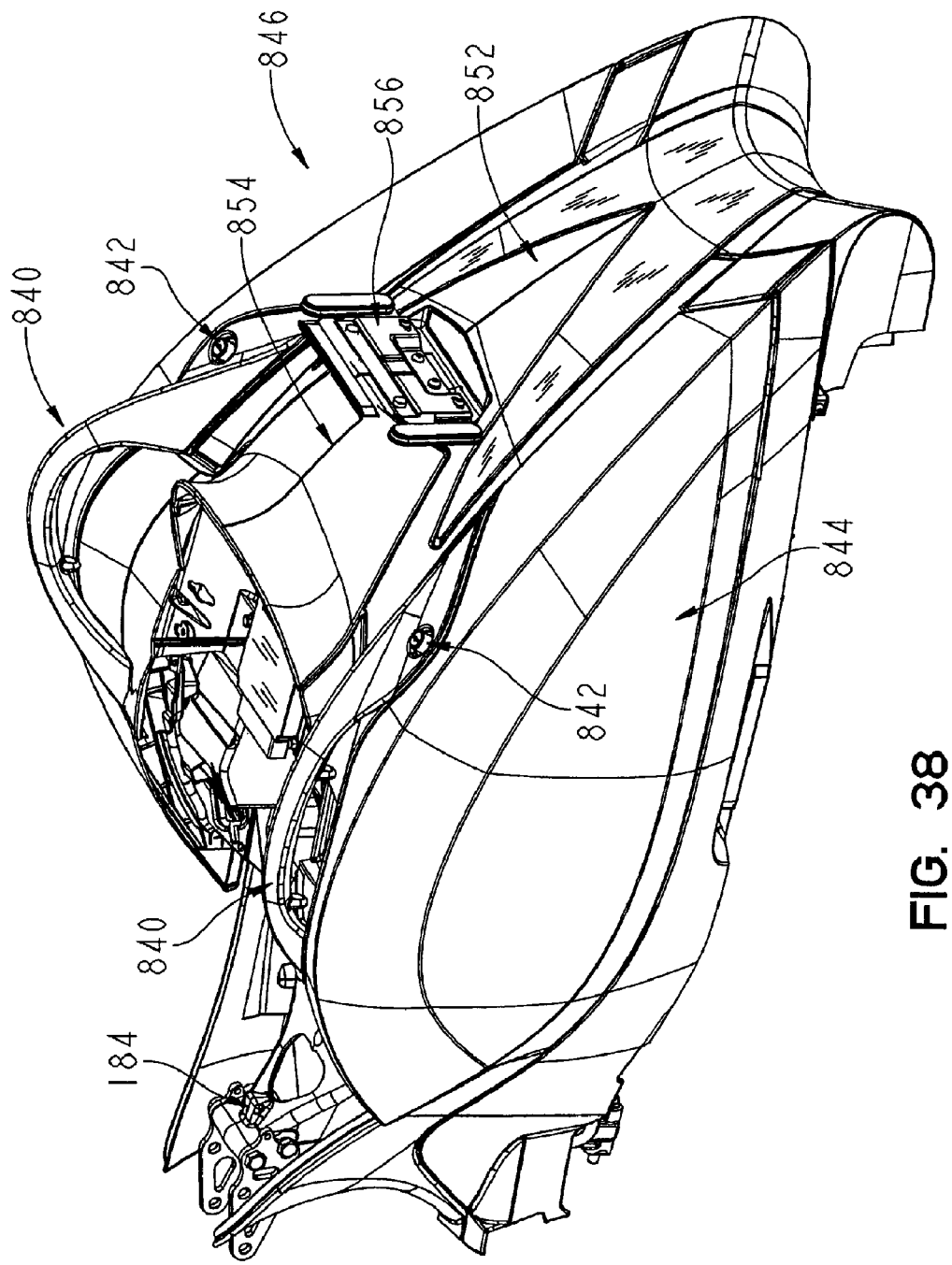
FIG. 38 is a perspective view of the assembly of FIG. 37 having an exterior body work of the saddlebags, a rear exterior body work, and a removable rear body portion covering a trunk mounting location.

Referring to FIG. 38, left saddlebag cover 844, right saddlebag cover 846 (see FIG. 4), a rear lower cover 852 and a rear removable cover 854 are shown assembled along with additional bodywork pieces. Left saddlebag cover 844 and right saddlebag cover 846 are each rotatably coupled to left saddlebag base member 175 and right saddlebag base member 802, respectively. Also shown is a license plate holder 856 coupled to rear base member 812.

Figure 40:
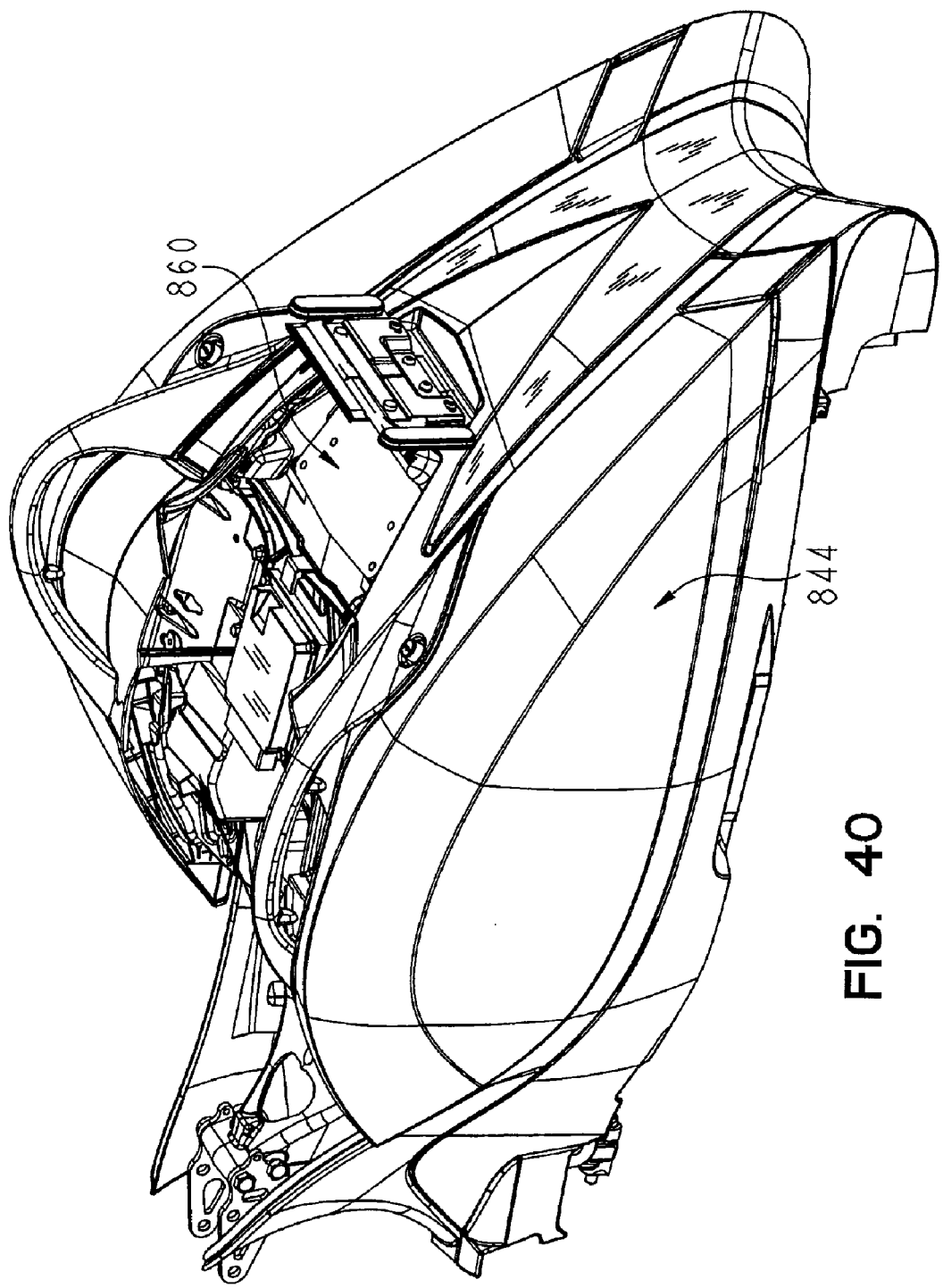
FIG. 40 is a perspective view of the assembly of FIG. 38 with the removable rear body portion removed exposing the trunk mounting location.

Referring to FIG. 40, rear removable cover 854 is removed exposing a mounting location 860 for trunk 174 shown in FIG. 1. Trunk 174 is coupled to rear frame member 184 through four couplers, such as bolts which are received in apertures 862, 864, 866, and 868 (see FIG. 34) in rear frame member 184.

Trunk 174 may be assembled to two-wheeled vehicle 100 by removing rear removable cover 854, positioning trunk 174 in location 860, and coupling trunk 174 to rear frame member 184. The rear removable cover 854 includes trim clips which attach it to rear base member 812. In one embodiment, trunk 174 includes one or more of lights, speakers, and other electrical accessories. In that case prior to bolting trunk 174 to rear frame member 184, an electrical harness provided with trunk 174 is connected to an electrical harness which is coupled to ECM 405 or another component, such as a radio 1290 (see FIG. 55).

In one embodiment, portions of two-wheeled vehicle 100 are assembled as follows. Support bracket 402 has left saddlebag base member 175 and right saddlebag base member 802 coupled thereto. Rear base member 812 is then coupled thereto. The remainder of saddlebags 176 and 178, lower rear cover 852, license plate bracket 856, and removable cover (if no trunk) are coupled thereto. Further, rear lighting assembly 1000, discussed in more detail herein is assembled as well. This entire assembly may then be suspended by cables attached to support bracket 402 during the assembly process and positioned over a rear frame member 184 of two-wheeled vehicle 100. In one embodiment, rear frame member is already coupled to swingarm 380 and front frame member 182. Support bracket 402 is then coupled to rear frame member 184. Finally, left saddlebag base member 175, right saddlebag base member 802, and rear base member 812 are coupled to rear frame member 184.

In one embodiment, an electrical harness 1030 (see FIG. 45) runs to rear lighting assembly 1000 and the operation of rear lighting assembly 1000 is tested prior to assembly to rear frame member 184. In this way, the rear portion of two-wheeled vehicle 100 may be assembled and tested remote from the remainder of two-wheeled vehicle 100.

Figure 39:
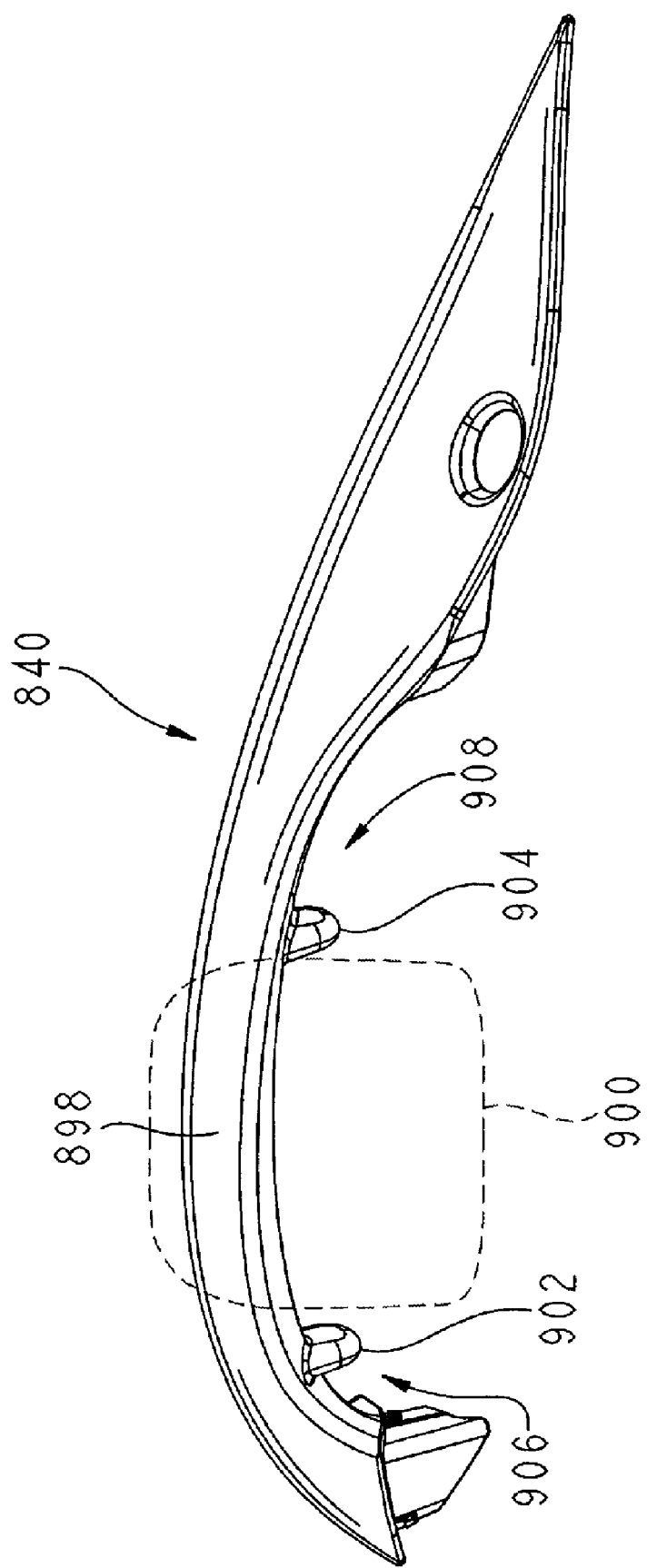
FIG. 39 is a perspective view of the handgrip of FIG. 37.

Referring to FIG. 39, hand grip 840 is shown. A passenger's hand is typically wrapped around an elongated body 898 of hand grip 840 and positioned in area 900. Two protrusions 902 and 904 extend from body 898 and assist in locating the hand of the passenger. Protrusions 902 and 904 also assist in keeping the passenger's hand from slipping forward or rearward and getting pinched between hand grip 840 and the respective saddlebag 176, 178.

Protrusions 902 and 904 also serve a second purpose in that they may be used to locate bungee straps or ratchet straps to secure cargo that is placed on top of seat 102 in position 104B. In one embodiment, a first bungee strap may have a first end hooked over right hand grip 840 in location 906 and a second end hooked over left hand grip 840 in location 908 and a second bungee strap may have a first end hooked over left hand grip 840 in location 906 and a second end hooked over right hand grip 840 in location 908.

Figure 41:
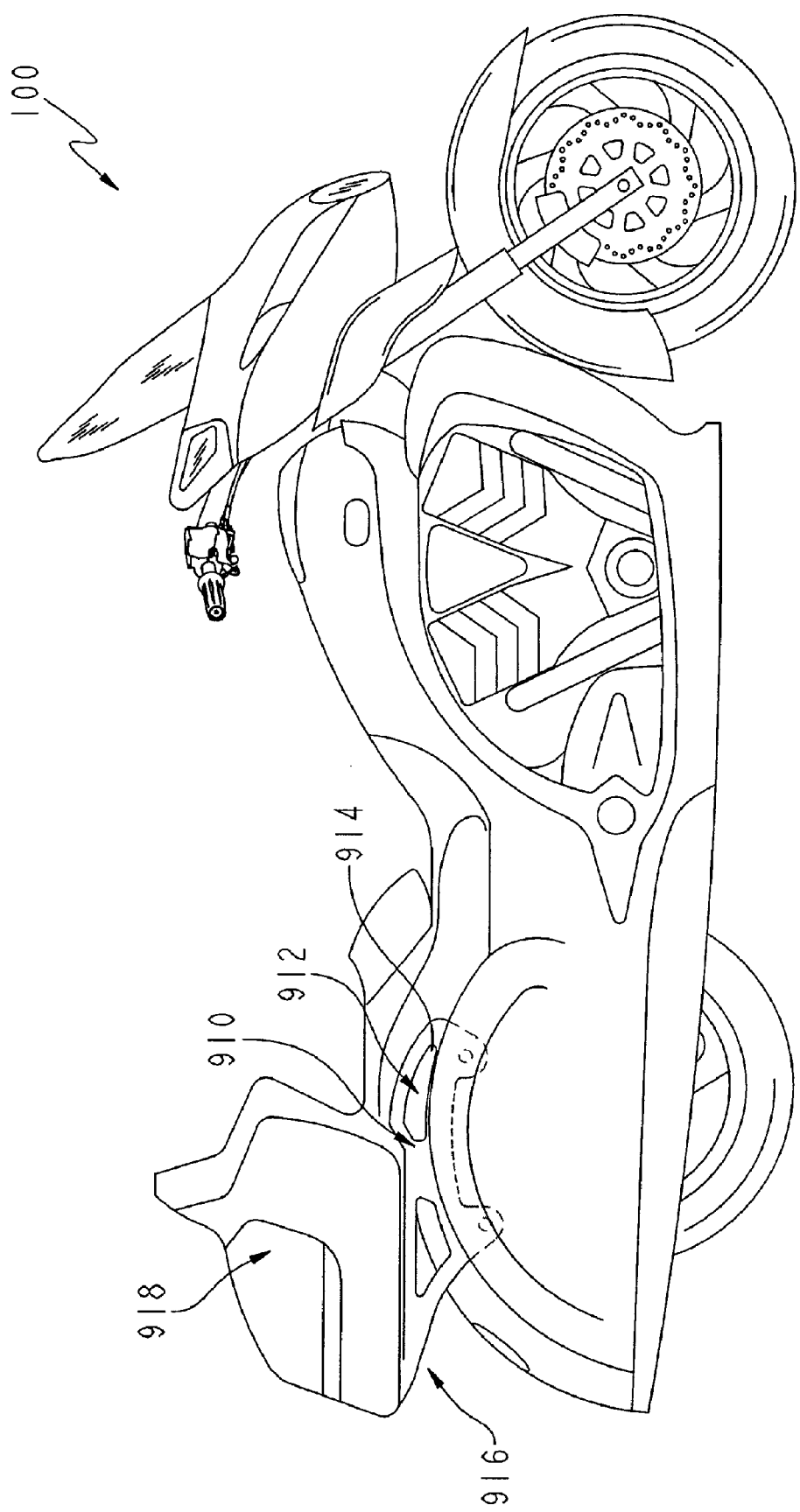
FIG. 41 is a side view of a further embodiment of a two-wheeled vehicle having an integrated trunk mount and hand grip.

In one embodiment, a hand grip is provided that also serves to mount a trunk, such as trunk 174. Referring to FIG. 41, a two-wheeled vehicle 100' is shown. Vehicle 100' includes a hand grip 910 which has a first portion 912 having an opening 914 which serves as a hand grip for a passenger and a second portion 916 on which a trunk 918 is positioned. Trunk 918 is coupled to hand grip 910 through a plurality of couplers, such as bolts. In one embodiment, hand grip 910 mounts to one of rear frame member 184 and the respective one of left saddlebag base member 175 and right saddlebag base member 802.

Figure 42:
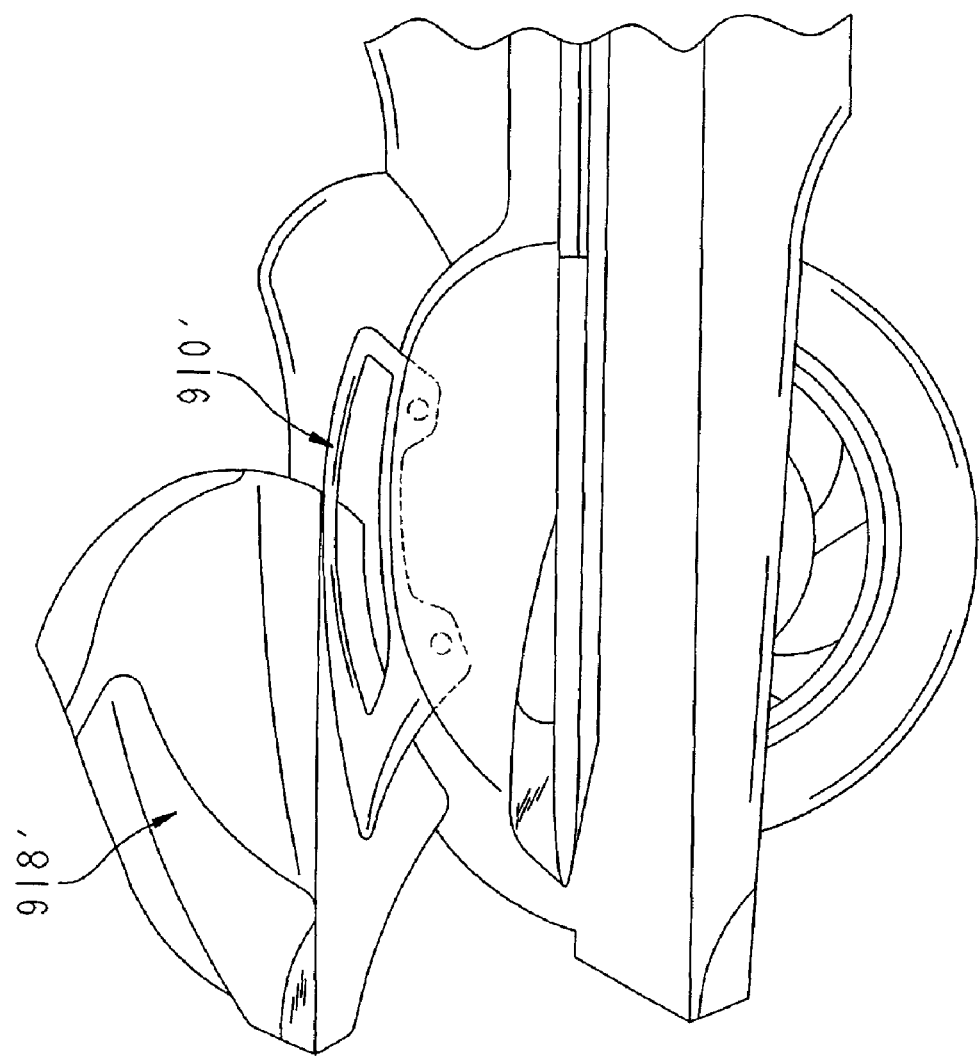
FIG. 42 is a side view of another embodiment of a two-wheeled vehicle having an integrated trunk mount and hand grip.
Figure 43:
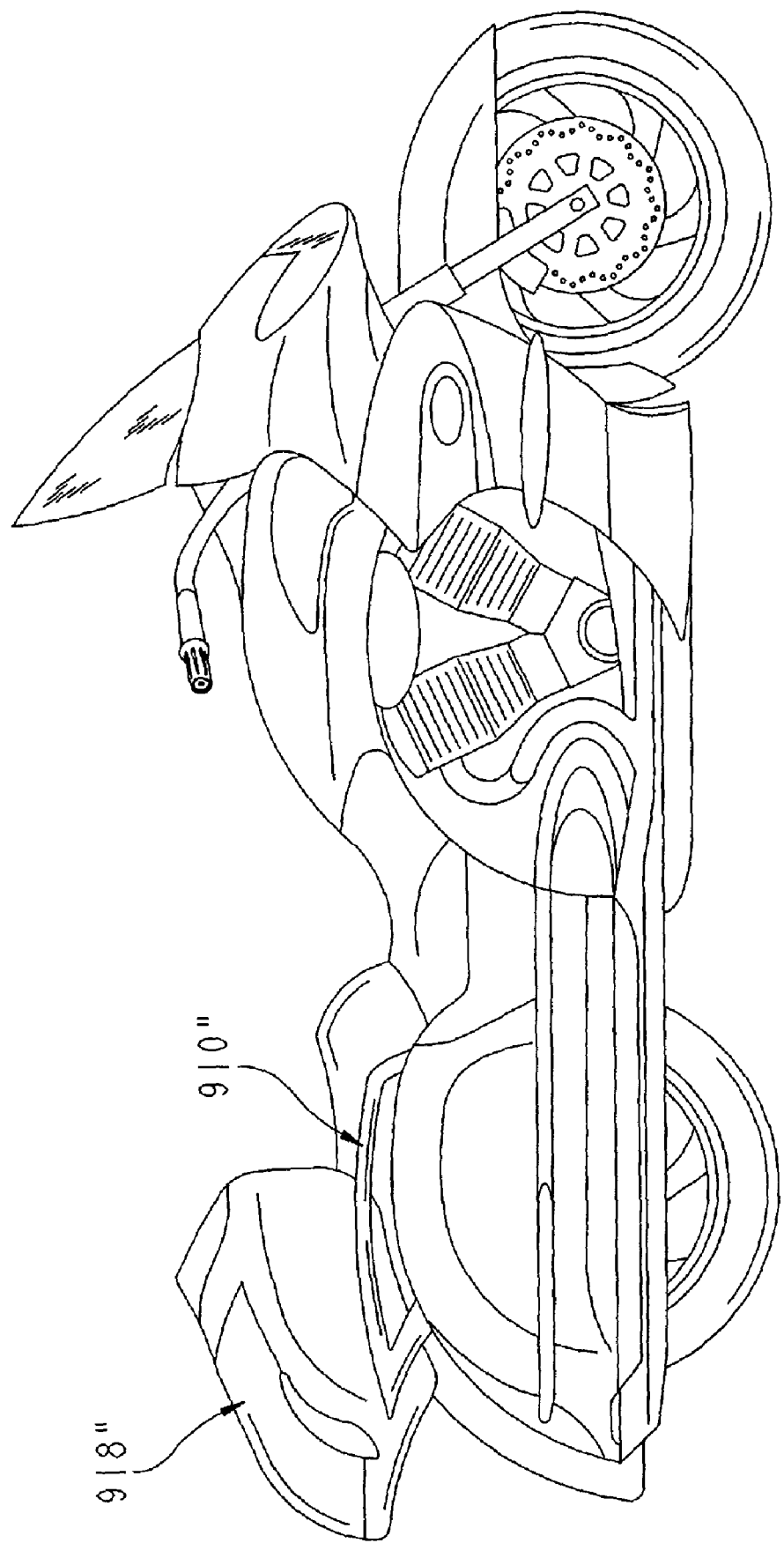
FIG. 43 is a side view of yet another embodiment of a two-wheeled vehicle having an integrated trunk mount and hand grip.
Figure 44:
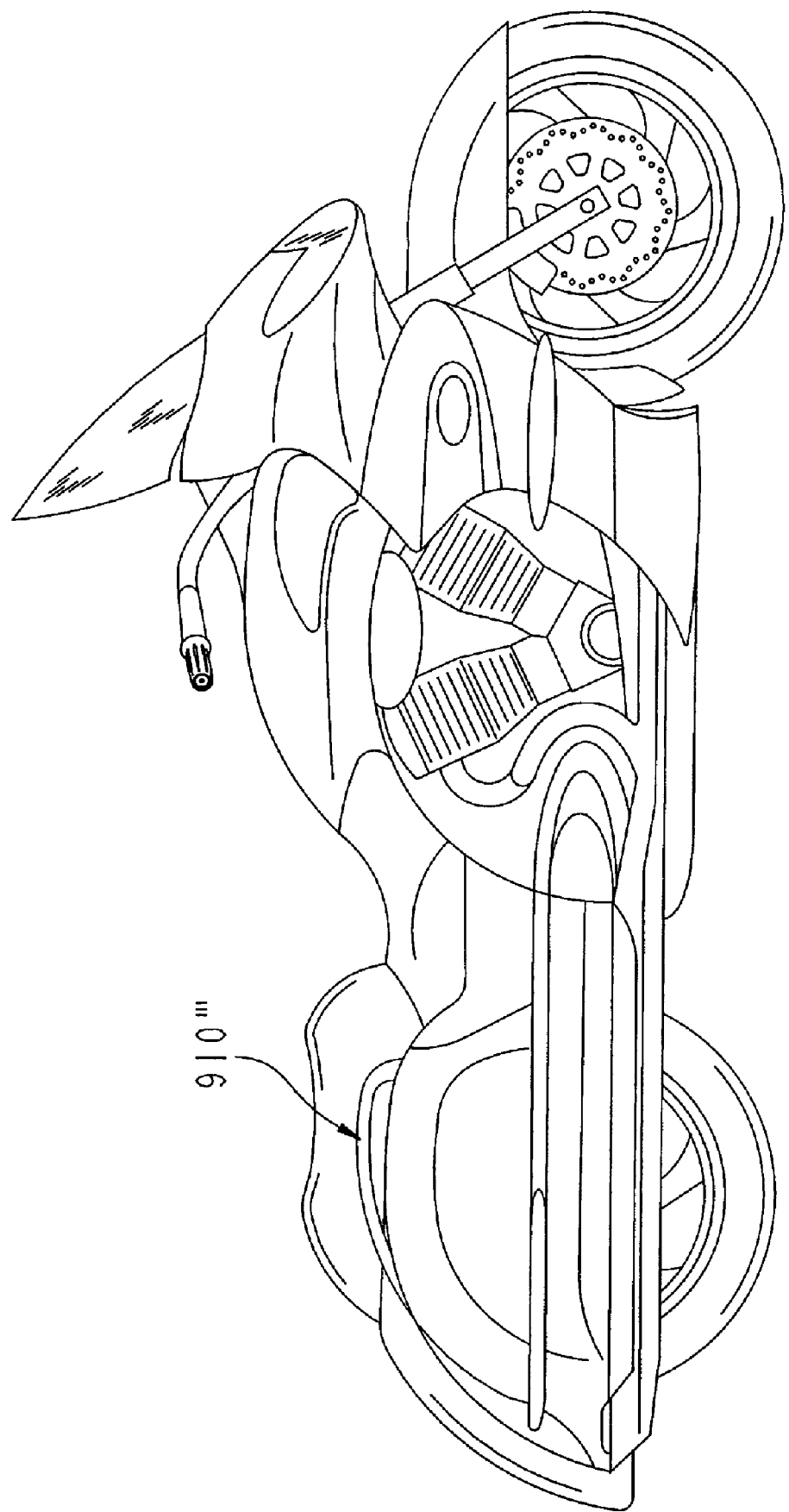
FIG. 44 is a side view of the two-wheeled vehicle of FIG. 43 wherein the integrated trunk mount and hand grip and trunk shown in FIG. 43 are replaced with another hand grip.

Referring to FIG. 42, another embodiment of hand grip 910' is shown. In this embodiment, a trunk 918' mounts to an inside portion of hand grip 910'. Referring to FIG. 43, another embodiment of hand grip 910" and trunk 918" are shown. Trunk 918" is again mounted to an inside portion of hand grip 910". Referring to FIG. 44, trunk 918" is removed and hand grips 910" are replaced by hand grip 910'". In one embodiment, handgrips 840, 910, 910', 910", and 910'" are made from a polymeric material or a metal material.

Figure 26:
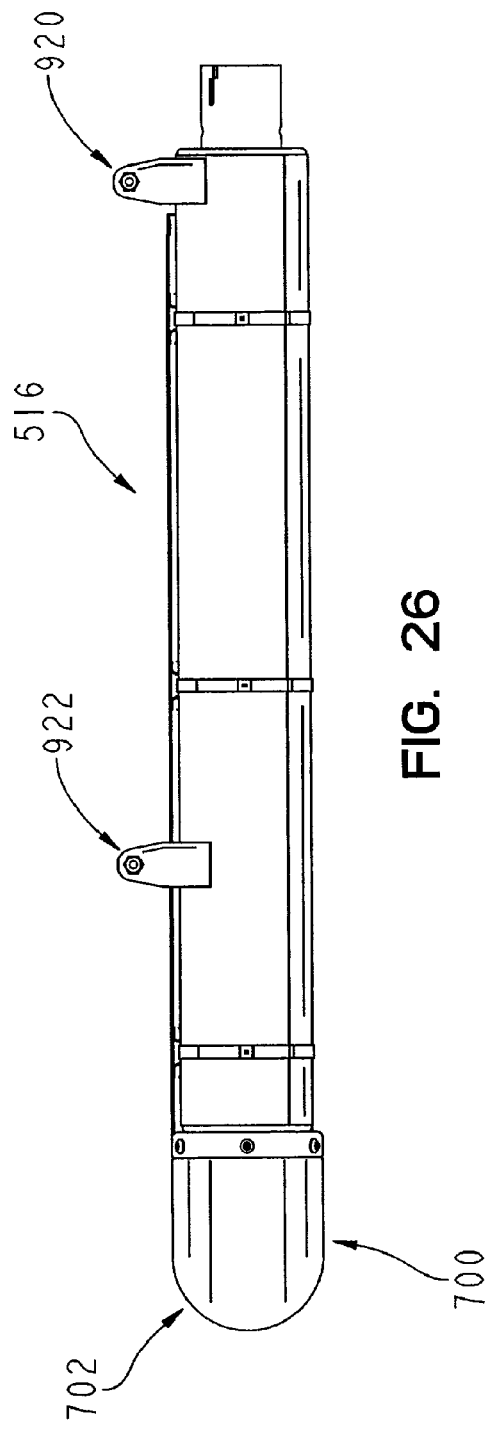
FIG. 26 is a side view from the longitudinal plane of the vehicle of the left side muffler and exhaust tip of FIG. 25.

In one embodiment, left saddlebag base member 175, right saddlebag base member 802, and rear base member 812 are each made of polymeric material, such as glass filled nylon. In one embodiment, mufflers 516 and 518 directly mount directly to left saddlebag base member 175 and right saddlebag base member 802, respectively. Referring to FIG. 26, mounts 920 and 922 of muffler 516 interface with left saddlebag base member 175 and through couplers, such as bolts, couple to left saddlebag base member 175. As such, muffler 516 is suspended from left saddlebag base member 175 and muffler 518 is suspended from right saddlebag base member 802.

In one embodiment, left saddlebag base member 175, right saddlebag base member 802, and rear base member 812 also act as debris shields for vehicle 100. In one embodiment, left saddlebag base member 175 and right saddlebag base member 802 each define a portion of the interior storage area 177 (see FIG. 13A) of the respective saddlebag 176, 178. In one embodiment, rear base member 812 provides the structure for locating and holding rear lighting assembly 1000.

Figure 45:
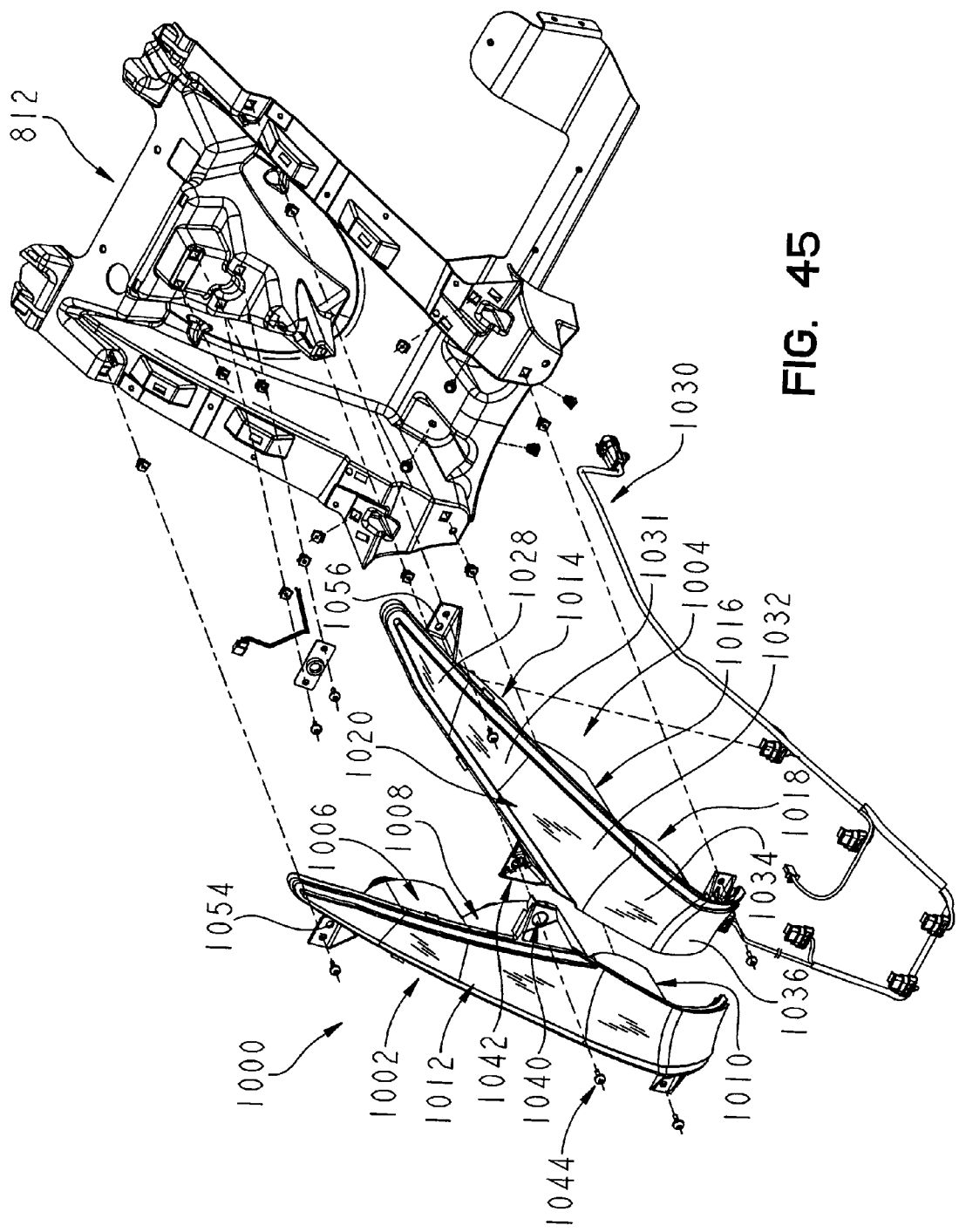
FIG. 45 is an exploded view of a rear light assembly.
Figure 46:
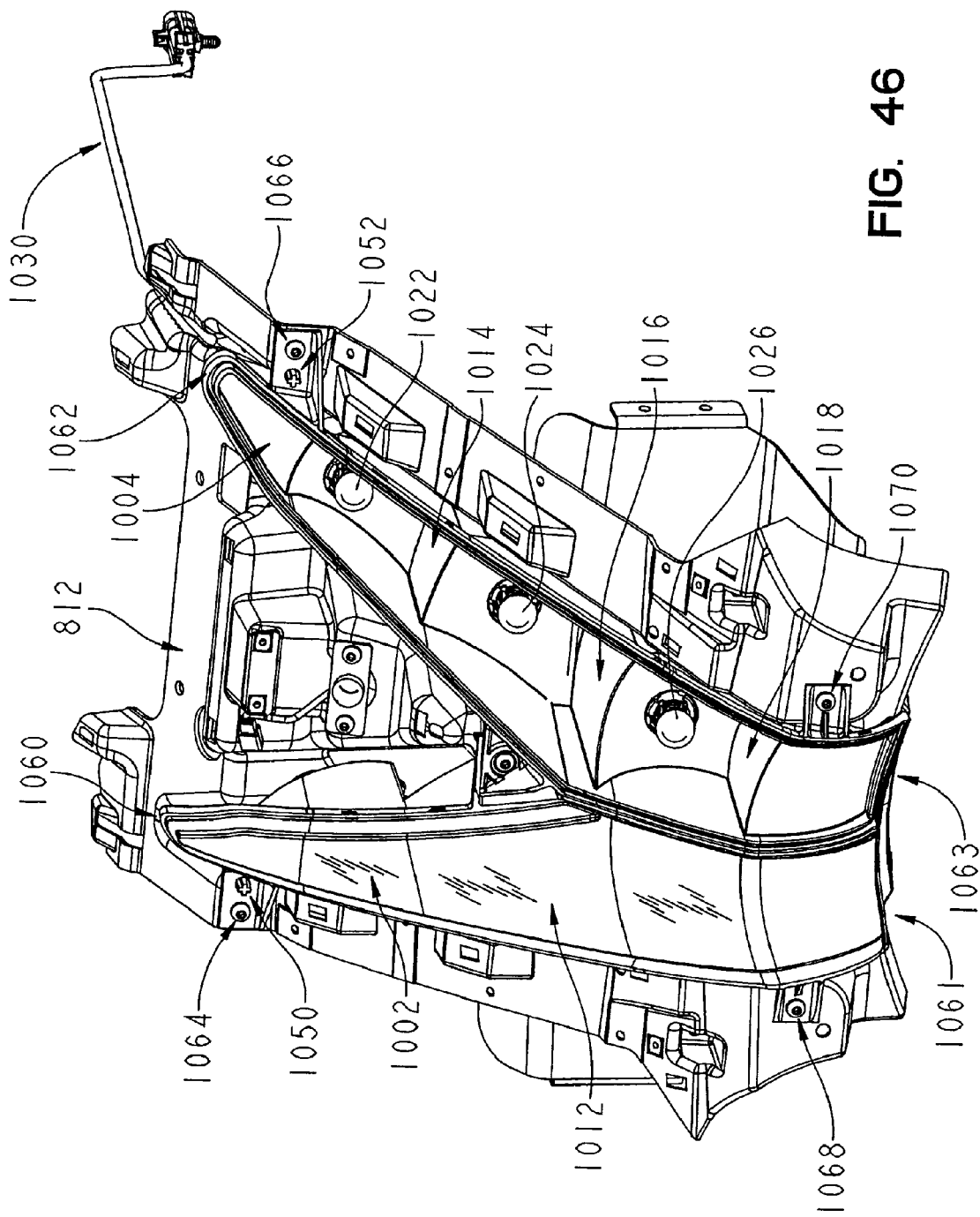
FIG. 46 is an assembled view of the rear light assembly of FIG. 45 with a lens removed.

Referring to FIG. 45, rear lighting assembly 1000 is shown exploded from rear base member 812. Rear lighting assembly 1000 includes a left lighting unit 1002 and a right lighting unit 1004. Left lighting unit 1002 includes three separate light regions 1006, 1008, and 1010. Lighting regions 1006, 1008, and 1010 are covered by a lens 1012. Similarly, right lighting unit 1004 includes three separate light regions 1014, 1016, and 1018. Lighting regions 1014, 1016, and 1018 are covered by a lens 1020. As shown in FIG. 46, each of lighting regions 1014, 1016, and 1018 includes a light bulb 1022, 1024, and 1026, respectively (similar light bulbs are provided for light regions 1006, 1008, and 1010).

The following discussion relates to right lighting unit 1004. Left lighting unit operates the same as right operating unit 1002. Light bulb 1022 of lighting region 1014 illuminates sections 1028 and 1031 of lens 1020. Light bulb 1024 of lighting region 1016 illuminates section 1032 of lens 1020. Light bulb 1026 of lighting region 1018 illuminates sections 1034 and 1036 of lens 1020.

In one embodiment, light regions 1016 and 1018 are connected to a brake pressure switch through electrical harness 1030 and are lit in response to an operator of vehicle 100 applying either the front or rear brakes of vehicle 100. Further, light region 1014 is connected to electronic module 216 located on top of front frame member 182 through electrical harness 1030 and is lit in a flashing pattern in response to an operator of vehicle 100 actuating an input to signal a right turn (light region 1006 of left lighting unit 1002 is lit in to an operator of vehicle 100 actuating an input to signal a left turn). In one embodiment, light regions 1006, 1008, 1010, 1014, 1016, and 1018 are lit at a first lower level in a first configuration (normal operation), light regions 1008, 1010, 1016, and 1018 are lit at a second higher level in a second configuration (braking), light region 1006 flashes, light regions 1008 and 1016 are not lit, and at least light regions 1010 and 1018 remain lit at either the first lower level or the second higher level in a third configuration (left turn), and light region 1014 flashes, light regions 1008 and 1016 are not lit, and at least light regions 1010 and 1018 remain lit at either the first lower level or the second higher level in a fourth configuration (right turn). Light regions 1008 and 1016 are provided power through a relay switch which is closed, except for when either a left turn or a right turn is being signaled then the relay switch is open.

In one embodiment, lenses 1012 and 1020 are configured to transmit substantially only red light. In one embodiment, lenses 1012 and 1020 have a first portion, such as regions 1032, 1034, and 1036 of lens 1020, configured to transmit substantially only red light and a second portion, such as regions 1028 and 1031 of lens 1020, configured to transmit substantially only amber light.

Lighting units 1002 and 1004 cooperate to form a V-shaped rear lighting assembly 1000. Referring to FIG. 4, the arrangement of lighting units 1002 and 1004 permit license plate bracket 856 to be positioned between lighting units 1002 and 1004, below a top portion 1060 and 1062 of each of lighting units 1002 and 1004, and above a bottom portion 1061 and 1063 of lighting units 1002 and 1004.

Referring to FIGS. 45 and 46, rear lighting assembly 1000 is located relative to rear base member 812 as follows. First, left lighting unit 1002 and right lighting unit 1004 include locators 1040 and 1042, respectively. Locator 1042 is positioned on top of locator 1040, each of which includes a plurality of mating surfaces, to locate left lighting unit 1002 relative to right lighting unit 1004. A coupler, illustratively a screw 1044, couples locators 1040 and 1042 to rear base member 812.

Second, left lighting unit 1002 and right lighting unit 1004 include a respective locator 1054 and 1056, illustratively apertures, which cooperate with respective locators 1050 and 1052, illustratively cross shaped pins, on rear base member 812 to locate top portions 1060 and 1062 of left lighting unit 1002 and right lighting unit 1004, respectively. Top portions 1060 and 1062 of left lighting unit 1002 and right lighting unit 1004 are secured to rear frame member 812 through couplers 1064 and 1066, respectively. Bottom portions 1061 and 1063 of left lighting unit 1002 and right lighting unit 1004 are secured to rear frame member 812 through couplers 1068 and 1070, respectively.

Locators 1040, 1042, 1050, 1052, 1054, and 1056 locate rear lighting assembly 1000 relative to the bodywork 160, such as lower rear cover 852 and removable rear cover 854. This assists in providing a more constant gap around rear lighting assembly 1000. Rear lighting assembly 1000 is generally flush with bodywork 160.

Figures 47A, 47B:
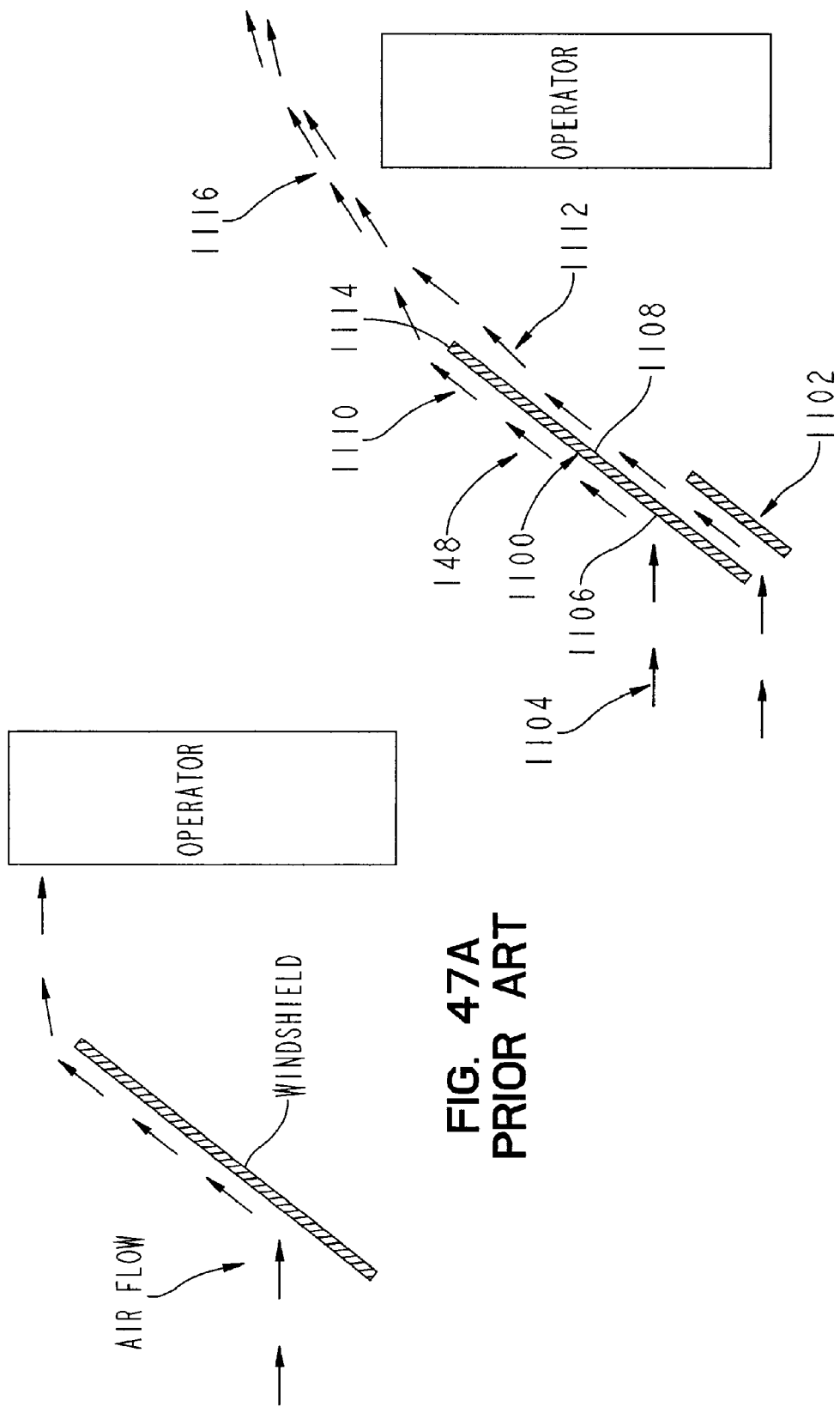
FIG. 47A is a representation of air flow relative to a prior art windshield.
FIG. 47B is a representation of air flow relative to a windshield of the vehicle of FIG. 1.

Vehicle 100 includes a windshield 148 which directs air flow away from an operator. Referring to FIG. 47A, in prior art vehicles a flow of air strikes a front surface of a windshield and travels up the windshield due to the tilt of the windshield and the movement of the vehicle. The air flow will once clearing the top portion of the windshield travel on and strike the operator, such as in the face. This may adversely effect the operator.

Referring to FIG. 47B, windshield 148 includes a front windshield member 1100 and a back windshield member 1102. In one embodiment, front windshield member 1100 is made from a generally transparent material, such as glass or plastic. A flow of air 1104 encounters windshield 148 and a first portion 1110 of the air 1104 travels up generally along a front surface 1106 of front windshield member 1100. A second portion 1112 of the air 1104 passes between front windshield member 1100 and rear windshield member 1102 and travels generally up along a back surface 1108 of front windshield member 1100. Once at a top portion 1114 of front windshield member 1100, the first portion 1110 of air 1104 interacts with the second portion 1112 of air 1104. The upward movement of second portion 1112 forces the recombined air flow 1116 to remain generally moving with an upward slope until air flow 1116 clears the operator.

Figure 49:
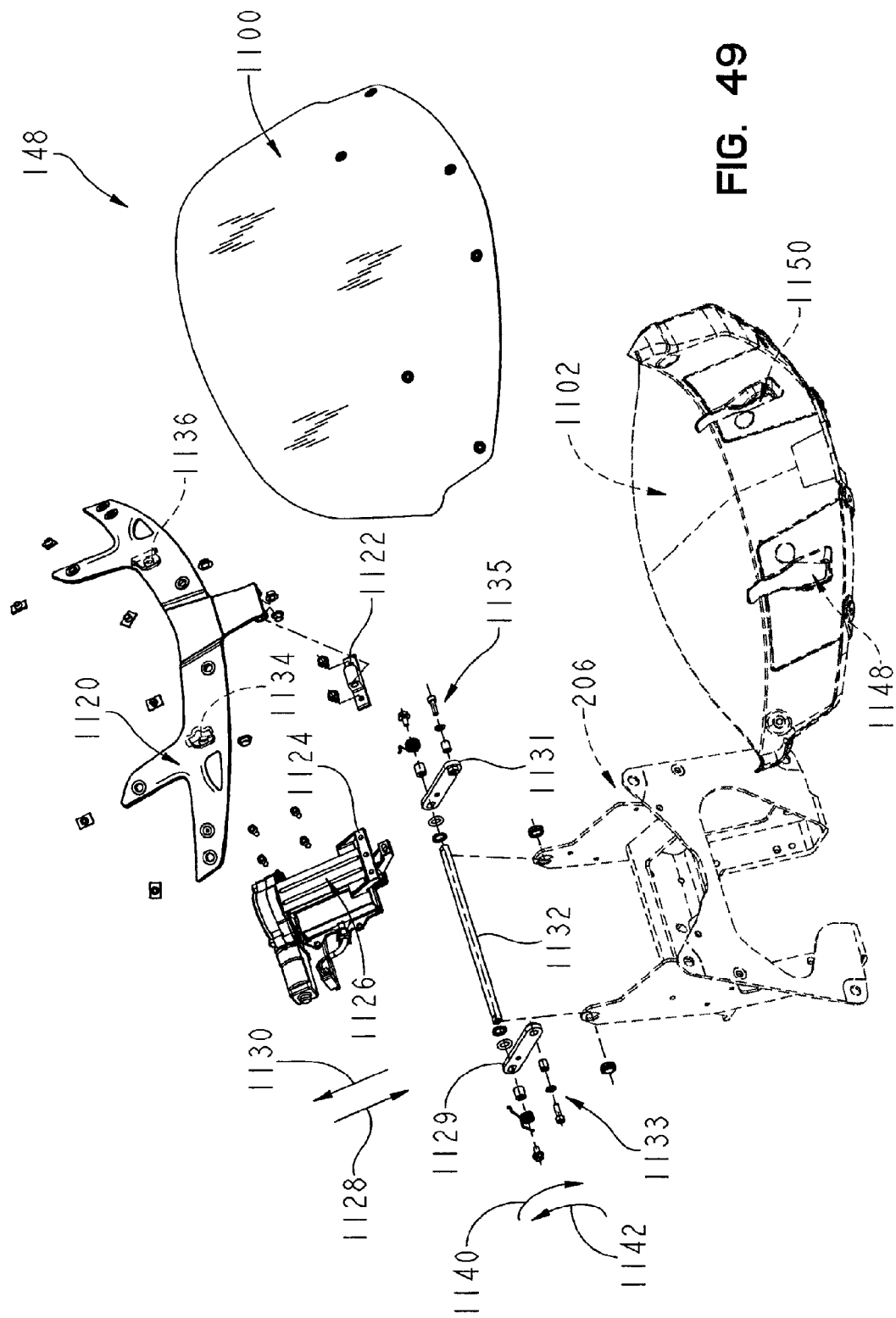
FIG. 49 is an exploded, assembly view of the windshield of FIG. 48.

Referring to FIG. 49, front windshield member 1100 is mounted to a support bracket 1120. Support bracket 1120 is rotatably coupled to a mount 1122 which is coupled to a sled 1124 of a linear actuator 1126. Linear actuator 1126 includes a motor which rotates a threaded rod which engages sled 1124 to move sled 1124 in directions 1128 and 130. Linear actuator 1126 is supported by mounting bracket 206 and is held stationary except for sled 1124. In one embodiment, linear actuator 1126 is available from Asahi Denso located at 1126 Nakajo, Hamamatsu City, Shizuoka, 438-0043 Japan.

Support bracket 1120 is also rotatably coupled to a pair of links 1129 and 1131 which are coupled to a support rod 1132. Links 1129 and 1131 are rotatably coupled to support bracket 1120 through couplers 1133 and 1135 which are received by apertures 1134 and 1136 of support bracket 1120. Support rod 1132 rotates relative to mounting bracket 206 in directions 1140 and 1142. Bias members 1144 and 1146, illustratively springs, interact with mounting bracket 206 and links 1129 and 1131, respectively, to bias support rod 1132 in direction 1140.

Figure 50:
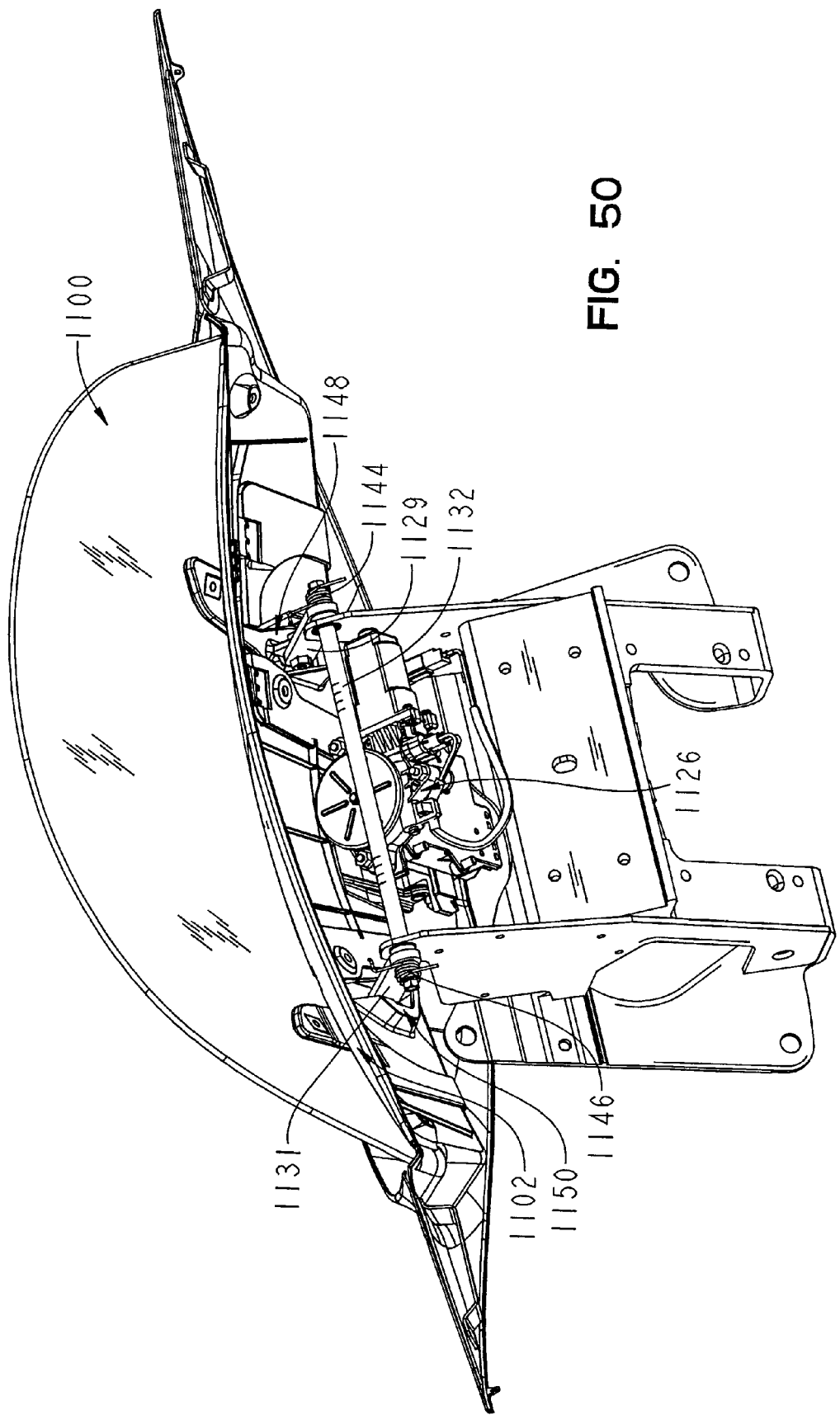
FIG. 50 is a rear, assembly view of the windshield of FIG. 49.

Second windshield member 1102 is coupled to mounting bracket 206. Links 1129 and 1131 extend through openings 1148 and 1150 of second windshield member 1102, respectively, as shown in FIG. 50.

Figure 48:
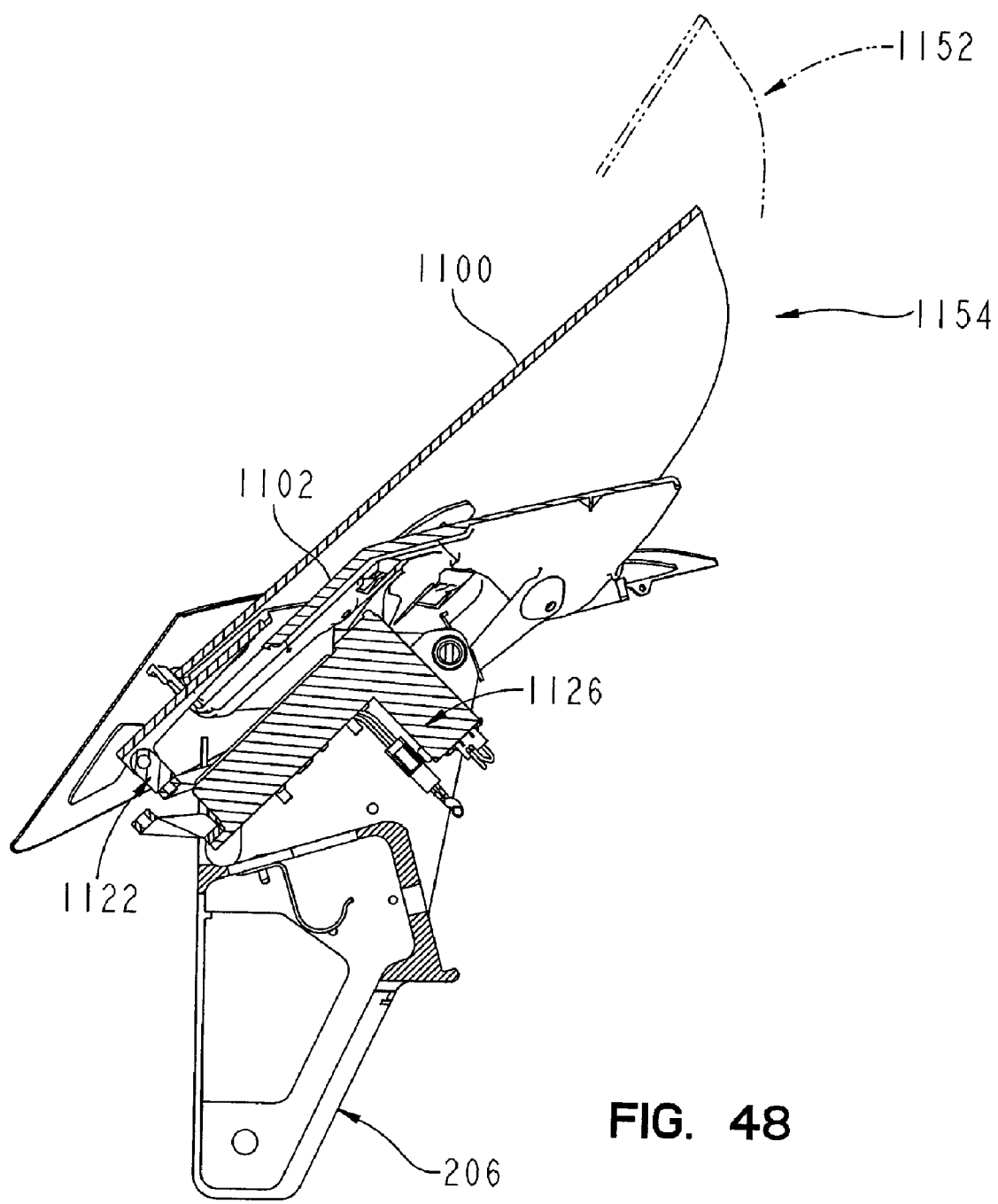
FIG. 48 is a sectional view of an exemplary windshield.

Second windshield member 1102 remains stationary relative to mounting bracket 206. First windshield member 1100 is movable relative to second windshield member 1102 generally in directions 1128 and 1130 between a raised position 1152 (shown in phantom in FIG. 48) and a lowered position 1154 (see FIG. 48). As shown in FIG. 48, first windshield member 1100 is tilted at a first angle from vertical in the lowered position 1154 and a second angle from vertical in the raised position 1152, the second angle being less than the first angle. Further, a position of a top edge of the first windshield member 1100 being vertically aligned when the first windshield member 1100 is in the raised position and the when the first windshield member 1100 is in the lowered position.

Illustratively, from lowered position 1154 an input is received by linear actuator 1126 from an input actuated by the operator. In one embodiment, the input is a toggle switch provided on the handlebars. The motor of linear actuator 1126 moves sled 1124 in direction 1130. This causes support bracket 1122 to also move in direction 1130 resulting in links 1129 and 1131 to rotate in direction 1142. As support bracket 1122 is moved in direction 1130, first windshield member 1100 is also moved in direction 1130.

Referring to FIG. 48, in one embodiment, first windshield member 1100 and second windshield member 1102 are parallel to each other in the lowered position 1154 and spaced apart to provide airflow between first windshield member 1100 and second windshield member 1102. In one embodiment, first windshield member 1100 and second windshield member 1102 are titled relative to front face 204 of mounting bracket 206 at an angle of 45 degrees in the lowered position 1154. In the raised position 1152, first windshield member 1100 and second windshield member 1102 are further spaced apart to permit a higher amount of airflow between first windshield member 1100 and second windshield member 1102. First windshield member also tips upward due to rotation of links 1129 and 1131. This results in windshield member 1100 when in the raised position 1152 not being parallel with windshield member 1102 as it is in the lowered position 1154.

In one embodiment, the amount of airflow in the raised position 1152 is sufficient to cause airflow 1116 to be directed as shown in FIG. 47B. This assists in protecting the operator from the weather. The amount of airflow in the lowered position 1154 is not sufficient to cause airflow 1116 to be directed as shown in FIG. 47B. Rather, airflow 1116 is directed towards the operator and provides cooling to the operator.

Figure 51:
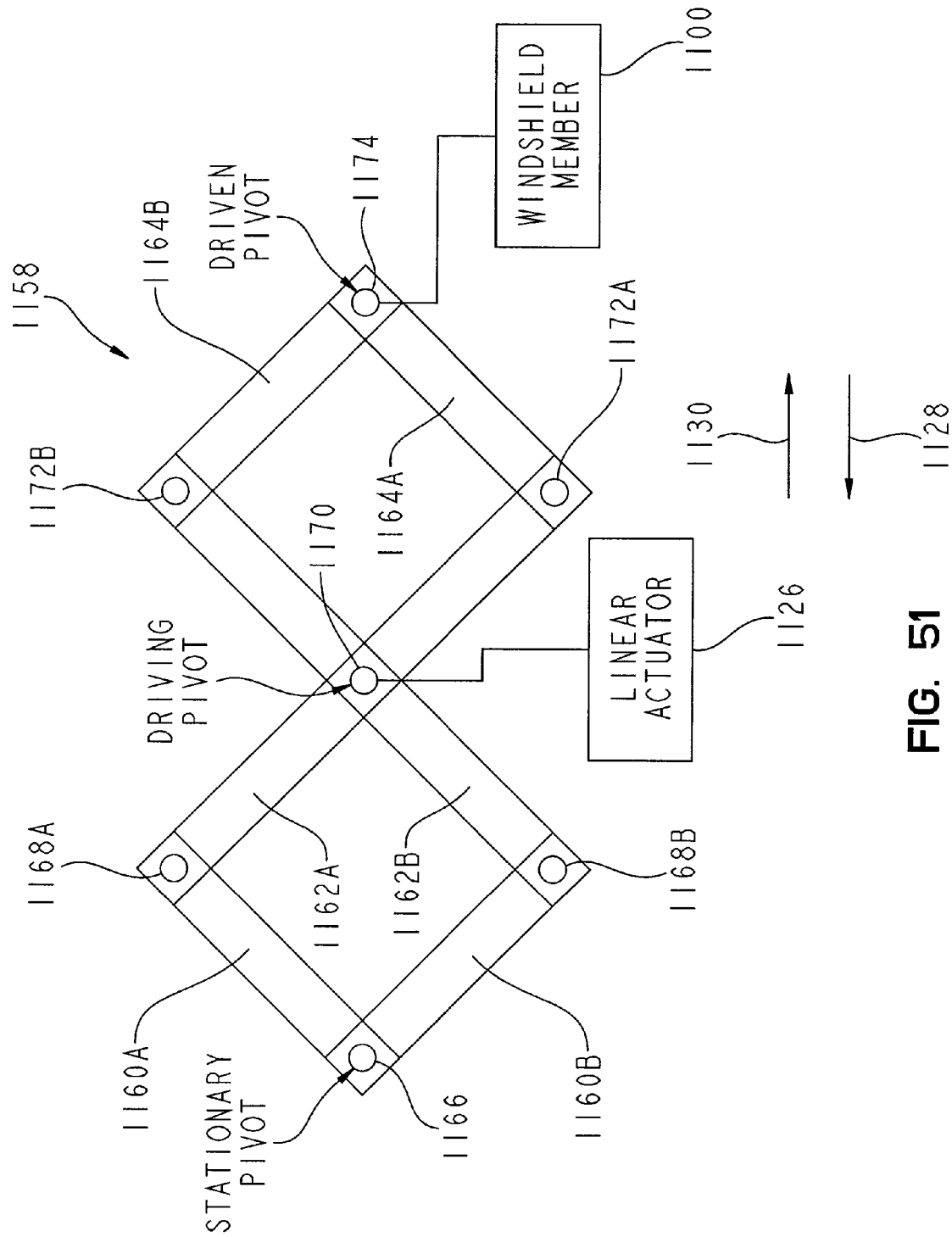
FIG. 51 is a diagrammatic view of a scissor mechanism for the windshield of FIG. 48.

Referring to FIG. 51, in one embodiment, a scissor linkage 1158 is implemented to connect windshield member 1100 to linear actuator 1126. As shown in FIG. 51, three pairs of links 1160A-B, 1162A-B, and 1164A-B form two diamond shapes. Links 1160A-B are rotatably coupled together at a first pivot 1166. Links 1160A-B are rotatably coupled to links 1162A-B, respectively, at pivots 1168A-B. Links 1162A-B are rotatably coupled together at pivot 1170. Links 1162A-B are rotatably coupled to links 1164A-B, respectively, at pivots 1172A-B. Links 1164A-B are rotatably coupled together at pivot 1174.

As shown in FIG. 51, pivot 1166 is held stationary. Pivot 1170 is coupled to linear actuator 1126 and moves in directions 1128 and 1130. Pivot 1174 is coupled to windshield member 1100 and moves in directions 1128 and 1130 in response to the movement of pivot 1170. Scissor linkage 1158 provides a multiplication factor to the movement of pivot 1170. Based on the length of links 1160A-B, 1162A-B, and 1164A-B, the displacement of pivot 1174 in direction 1130 may be greater than the displacement of pivot 1170 in direction 1130. This permits windshield member 1100 to have a greater range of travel. In one embodiment, the ratio of the movement of pivot 1170 to the movement of pivot 1174 is greater than 1:2. In one embodiment, the ration of the movement of pivot 1170 to the movement of pivot 1174 is greater than 1:3. In one embodiment, the ratio of the movement of pivot 1170 to the movement of pivot 1174 is about 1:3.4125. In one embodiment, windshield 1100 has about 203 mm of travel.

In one embodiment, vehicle 100 further includes winglets 1180 (FIGS. 1-3) which are supported by front frame member 182 and are rotatable relative to fairing 131. Winglets 1180 may be rotated outward, as shown in FIG. 3, to direct air away from the operator. Alternatively winglets 1180 may be rotated more parallel to centerline plane 116 of vehicle 100 to direct air towards the chest of the operator.

In one embodiment, vehicle 100 includes a plug and play style network. An exemplary plug and play network is a CAN network. An exemplary CAN network is disclosed in U.S. patent application Ser. No. 11/218,163, titled "CONTROLLER AREA NETWORK BASED SELF-CONFIGURING VEHICLE MANAGEMENT SYSTEM AND METHOD", filed Sep. 1, 2005 ("CAN application"), the disclosure of which is expressly incorporated by reference herein. As explained in the CAN application, the CAN network permits components to be coupled to the network and to configure themselves to the network along with other components on the network being able to recognize the added component.

Figure 52:
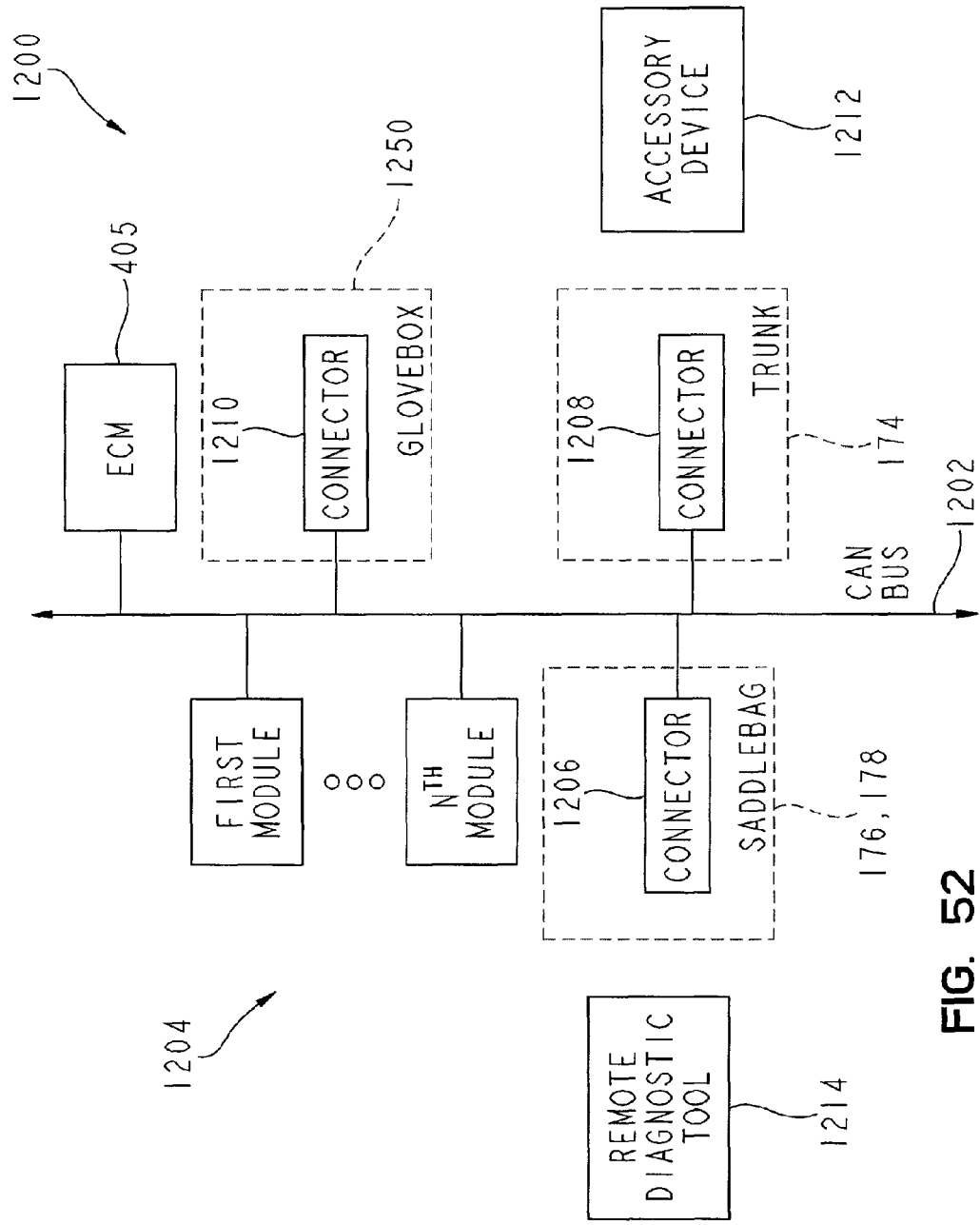
FIG. 52 is a representative view of a CAN network of the vehicle of FIG. 1.

Referring to FIG. 52, a representation of a CAN network 1200 is shown. A CAN bus 1202 is connected to ECM 405 and a plurality of vehicle modules 1204. Exemplary modules 1204 are disclosed in the CAN application. In one embodiment, modules 1204 are connected to CAN bus 1202 through 2 wires for data communication and 2 wires for power.

Figure 53:
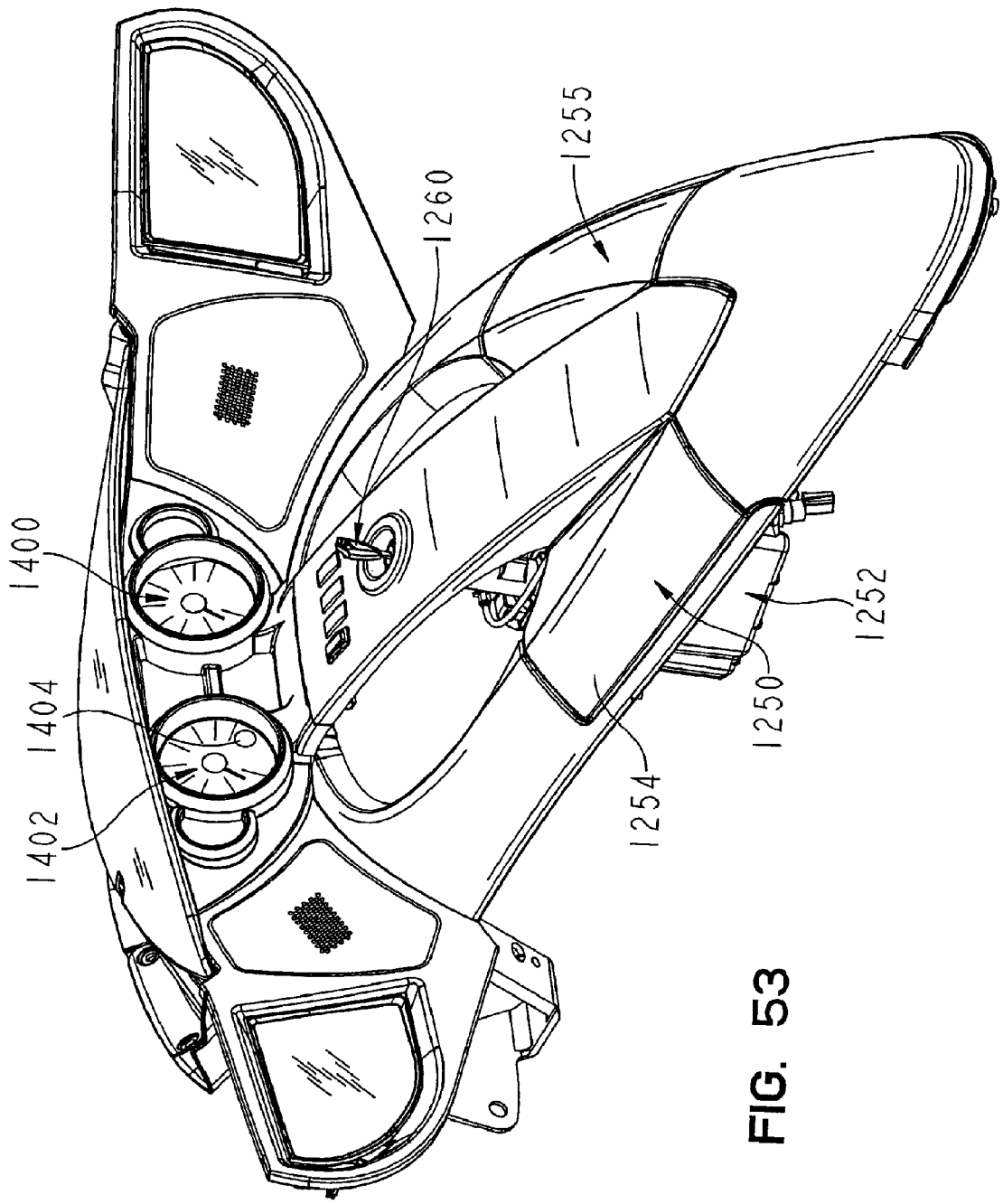
FIG. 53 is a perspective view of a glove box of the vehicle of FIG. 1.
Figure 54:
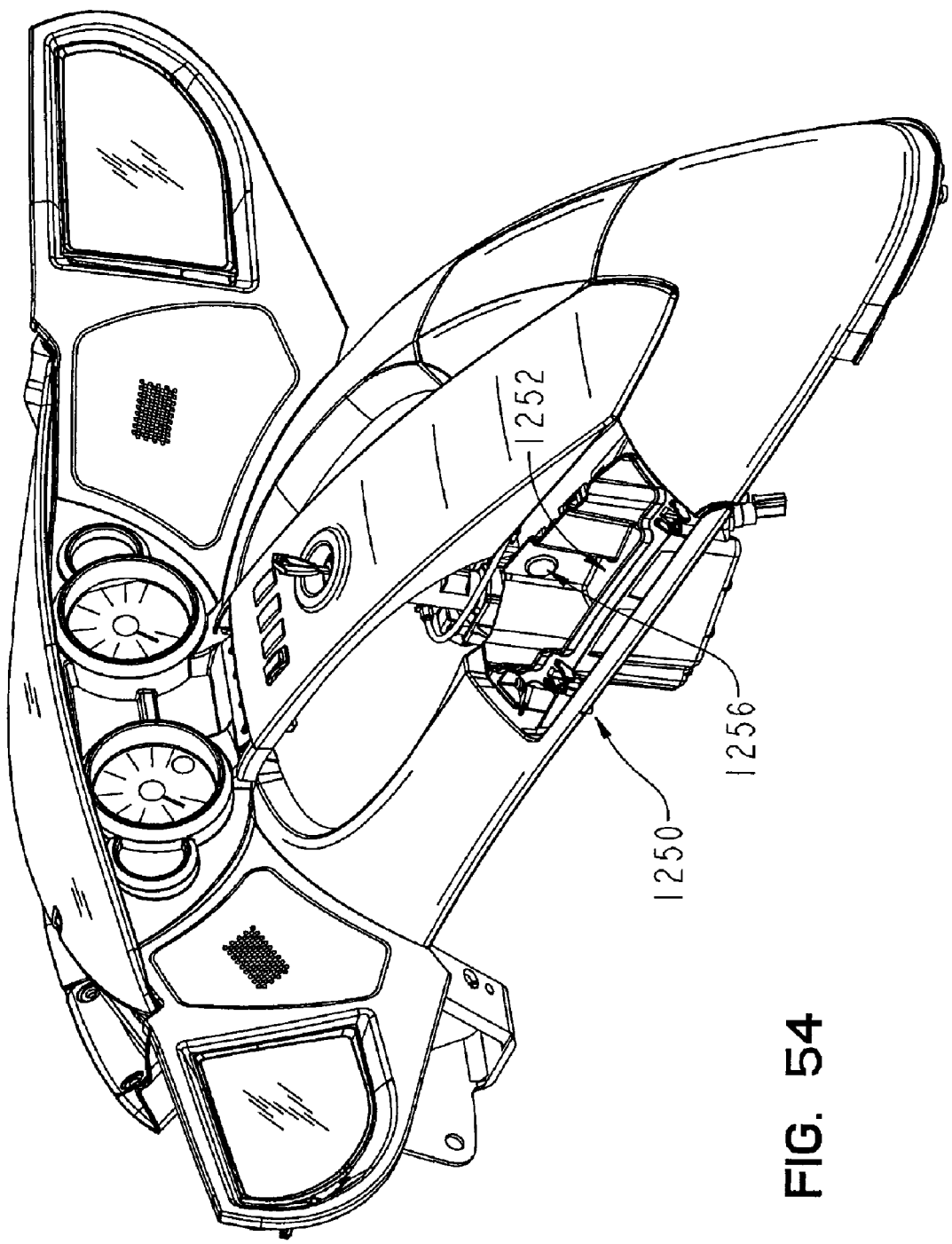
FIG. 54 is a perspective view of the glove box of FIG. 53 with a door to the glove box removed.

As explained in the CAN application, various modules 1204 may simply be plugged into CAN network 1200 and be recognized by CAN network 1200. In one embodiment, additional connectors 1206, 1208, 1210 are provided for connection to CAN network 1200. Connector 1206 is illustratively shown being within one of saddlebag 176, 178. Connector 1208 is illustratively shown being within trunk 174. Connector 1210 is illustratively shown being within a glove box 1250 which is shown in FIGS. 53 and 54. Although connectors 1206, 1208, and 1210 are shown within saddlebag 176, 178, trunk 174, and glove box 1250, it is contemplated that one or more connectors be positioned outside of saddlebag 176, 178, trunk 174, and glove box 1250.

Connectors 1206, 1208, and 1210 may be used to couple to an accessory device 1212. Exemplary accessory devices 1212 include a heated vest, a heated seat, heated grips, a navigation system, an XM receiver, and other suitable accessory devices. By having connectors 1206, 1208, and 1210 present on vehicle 100, an operator is able to upgrade vehicle 100 as time progresses by simply plugging accessory devices 1212 into the available connectors 1206, 1208, and 1210. This upgrading could be for already available components to function just as if they were installed in the factory and for future developed accessories to be used with older modules of vehicle 100.

In one embodiment, connector 1206 is positioned within the storage area 177 of saddlebag 176. In one embodiment, connector 1206 is posited spaced apart from the storage area 177 of saddlebag 176. In one embodiment, connector 1206 is posited adjacent air inlet valve 856. Connector 1206, in one embodiment, is used as a diagnostic port to which a remote diagnostic tool 1214 may be coupled. Additional details regarding remote diagnostic tool 1214 are provided in the CAN application.

In one embodiment, the electrical harnessing on vehicle 100 is configured to assist to troubleshooting problems. Vehicle 100 includes a trunk harness which interfaces with all of the connection points to trunk 174. Vehicle 100 further includes an engine harness which interfaces with all of the connection points to engine 124. Vehicle 100 further includes a chassis harness into which the engine harness and trunk harness are connected. In one embodiment, the separation of the harnesses assists during assembly of vehicle 100. For instance, engine 124 may be assembled and tested through the engine harness at a first manufacturing facility. The approved engine is then sent to a vehicle assembly facility which assembles engine 124 with the other portions of vehicle 100. The engine harness is connected to the chassis harness. Since the engine harness and engine 124 have already been tested, any problems during vehicle assembly may be assumed to be related to the chassis harness instead of the engine harness.

Referring to FIGS. 53 and 54, glove box 1250 includes a storage compartment 1252 and an associated door 1254. Provided in storage compartment 1250 is a power connection 1256 for providing power to accessories, such as cell phones and music players. In one embodiment, power connection 1256 is a POWERLET brand connector available from Coliant Corporation, 5520 Chicago Rd., Warren, Mich. 48092. In one embodiment, power is supplied to power connection 1256 continuously. In one embodiment, power is supplied to power connection 1256 when a ignition key 1260 of vehicle 100 is switch to a non-off position, such as on or accessory.

Storage compartment 1252 is sized to receive various accessories, such as cell phones and music players along with associated cords for connection to power connection 1256. Door 1254 of glove box 1250 is lockable and provides a sealed glove box to protect the contents of glove box 1250 from the environment. In one embodiment, door 1254 is locked through the rotation of key 1260 to a certain position, such as "off".

Also, shown in FIG. 53 is a door 1255 under which is provided fuel cap 322. Door 1255 may be opened by moving key 1260 to a fuel position.

In addition, glove box 1250 includes a data connection (not shown) for a music player. In an exemplary embodiment, the data connection is for an IPOD brand music player available from Apple Computer, Inc. located at Infinite Loop, Cupertino Calif. 95014. In one embodiment, a radio 1290 of vehicle 100 interfaces with the music player through the data connection. Due to using the data connection instead of simply pulling audio from the music player via the headphone jack, the functionality of the music player is controllable through the controls for the radio and information is displayable on display 1292. Examples of displayable information includes song titles, artists, play lists, and additional information. The radio controls may be used to edit play lists, skip songs, and any additional functionality typically controlled through the music player.

In one embodiment, twelve soft keys 1410 (see FIG. 55) are provided on vehicle 100. For, radio 1290 soft keys 1410 represent station presents. For, the music player, in one embodiment, soft keys 1410 correspond as follows: a first soft key selects a music library of the music player and the remaining eleven soft keys correspond to the first eleven play lists stored in the music player. Pressing a tune up key 1456 momentarily will skip to the next track on a current play list. Pressing the tune up button twice in succession, such as a double clicking operation, will skip forward ten tracks in the current play list. Pressing the tune up button continuously while a song is playing will seek forward within the existing track. Pressing a tune down key 1456 momentarily will skip to the previous track on a current play list. Pressing the tune down button twice in succession, such as a double clicking operation, will skip backward ten tracks in the current play list. Pressing the tune down button continuously while a song is playing will seek backward within the existing track. Pressing a mute key 1458 while a song is playing will pause the track.

In one embodiment, a navigation system, such as a GPS system, is connected to CAN network 1200. The navigation system provides voice instructions to the operator. In one embodiment, these voice instructions are provided through the radio 1290. In one embodiment, if radio 1290 is playing additional audio, such as music, the additional audio is muted when the navigation system provides a voice instruction.

In one embodiment, a connector for the navigation system is provided with vehicle 100. An operator to install the navigation system, simply removes a bridge console 1296 and removes a portion of bridge console 1296 pre-marked to correspond to a location for a connector. The navigation system is mounted to the console and connected to the CAN network 1200 through the connector.

Figure 55:
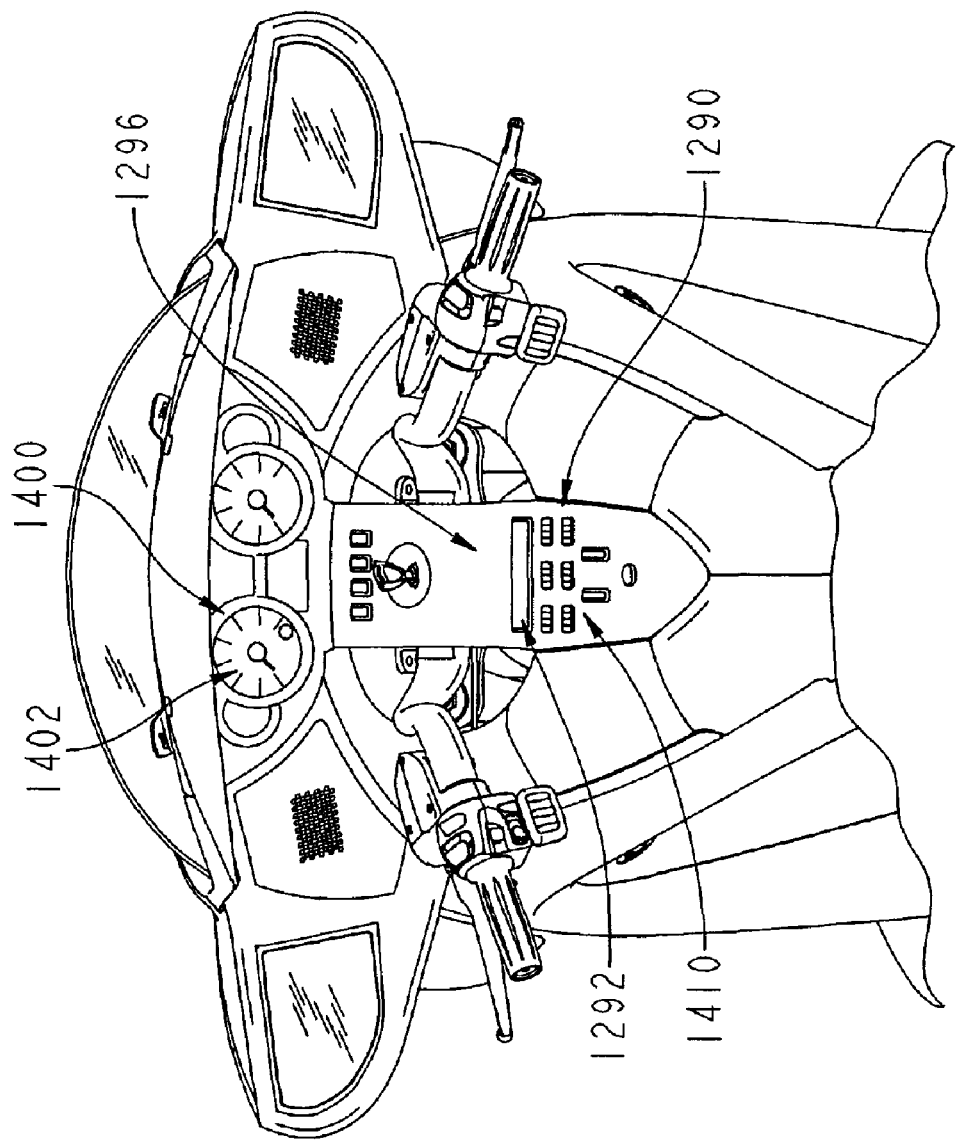
FIG. 55 is a top, perspective view of the vehicle of FIG. 1.

Referring to FIG. 55, an exemplary instrument cluster 1400 is shown. Instrument cluster 1400 includes a speedometer 1402. Speedometer 1402 includes graduations, but does not include the units (miles per hour ("mph") or kilometers per hour ("kph")). As explained in the CAN Application, a configuration for vehicle 100 may be provided for vehicle 100. In regards to speedometer 1402, ECM 405 includes calibration data that corresponds to the area vehicle 100 is going to be sold and based thereon or provided therewith is the units to use with speedometer 1402. So if vehicle 100 is for a Canadian market, speedometer 1402 registers kilometers per hour and if vehicle 100 is for the US market, speedometer 1402 registers miles per hour. In one embodiment, speedometer 1402 includes a backlit "mph" region and a backlit "kph" region and the appropriate region is lit based on the configuration of the ECM. The same principle applies to an odometer of vehicle 100, a clock of vehicle 100, temperature gauges of vehicle 100. Further, in one embodiment, the operator can override the setting and switch between English units and metric units.

In one embodiment, instrument cluster 1400 includes a photocell 1404 (see FIG. 53). Photocell 1404 detects the level of ambient light. ECM 405 based on the level of ambient light adjusts the brightness of the instrument cluster display 1400. In one embodiment, the backlit "mph" region and a backlit "kph" region are set to dim at nighttime and to brighten during the day.

Figure 56:
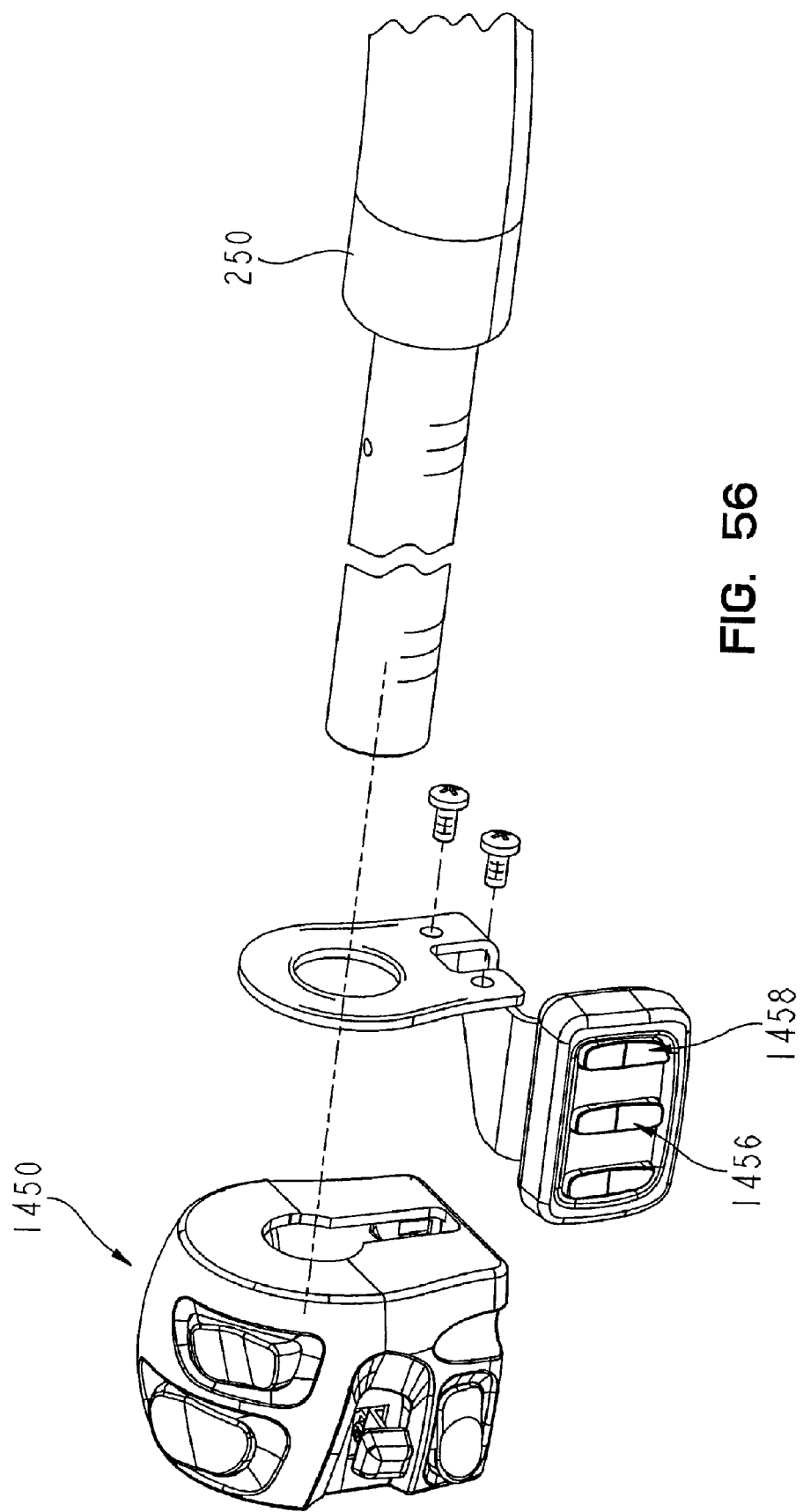
FIG. 56 is detail view of a left, handle bar grip area of FIG. 55.

Referring to FIGS. 32 and 56, a single momentary push-button switch 1452 (see FIG. 32) is located on a switch cube 1450 mounted on the back of handlebar member 250 in order to avoid problems due to corrosion or water intrusion. When pressed, the switch closes to ground and provides a minimum current draw, such as 50 mA. By pressing the switch momentarily the operator may perform a first function, such as select different information screens on the instrument cluster. Exemplary information screens include a vehicle odometer screen, a first trip odometer screen, a second trip odometer screen, an average fuel economy screen, an instantaneous fuel economy screen, an average vehicle speed screen, a fuel range screen, and a trip time screen. By pressing and holding the switch for a first duration of time the operator may perform a second function. An exemplary duration of time is about three seconds or longer. An exemplary second function is resetting data screens, such as the first trip odometer, the second trip odometer, the average fuel economy, and the trip time.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

The invention claimed is:

1. A windshield assembly, comprising:
   a base member;
   a rear windshield supported by the base member;
   a front windshield supported by the base member, positioned forward of the rear windshield, and moveable relative to the rear windshield between a lowered position and a raised position; and
   an actuation device supported by the base member and operatively coupled to the front windshield, the actuation device controlling the movement of the front windshield between the raised position and the lowered position, wherein the front windshield is spaced apart from the rear windshield to provide a flow of air along a back surface of the front windshield, the actuation device including at least one biasing member to bias the front windshield towards the lowered position.

2. The windshield assembly of claim 1, wherein the flow of air along the back surface of the front windshield is increased when the front windshield is in the raised position relative to when the front windshield is in the lowered position.

3. The windshield assembly of claim 2, wherein the increased flow of air along the back surface of the front windshield when the front windshield is in the raised position is due to an increased spacing between the front windshield and the rear windshield in the raised position relative to when the front windshield is in the lowered position.

4. The windshield assembly of claim 3, wherein in the lowered position the front windshield member and the rear windshield member are parallel and in the raised position the front windshield member is tilted relative to the rear windshield member.

5. The windshield assembly of claim 1, further comprising a scissor link system including a stationary pivot, a driving pivot, and a driven pivot, the actuation device being coupled to the driving pivot and the front windshield member being coupled to the driven pivot.

6. The windshield assembly of claim 5, wherein the ratio of movement of the driven pivot to the driving pivot is at least 2:1.

7. The windshield assembly of claim 5, wherein the ratio of movement of the driven pivot to the driving pivot is at least 3:1.

8. The windshield assembly of claim 1, wherein the actuation device is a linear actuation device.

9. The windshield assembly of claim 8, wherein the front windshield in response to a movement of the linear actuation device is both translated and rotated.

10. A windshield assembly, comprising:
    a base member;
    a rear windshield supported by the base member;
    a front windshield supported by the base member, positioned forward of the rear windshield, and moveable relative to the rear windshield between a lowered position and a raised position;
    an actuation device supported by the base member and operatively coupled to the front windshield, the actuation device controlling the movement of the front windshield between the raised position and the lowered position, and
    a scissor link system including a stationary pivot, a driving pivot, and a driven pivot, the actuation device being coupled to the driving pivot and the front windshield member being coupled to the driven pivot, wherein the front windshield is spaced apart from the rear windshield to provide a flow of air along a back surface of the front windshield.

11. The windshield assembly of claim 10, wherein the ratio of movement of the driven pivot to the driving pivot is at least 2:1.

12. The windshield assembly of claim 10, wherein the ratio of movement of the driven pivot to the driving pivot is at least 3:1.

\* \* \* \* \*